(12) United States Patent
Yamaguchi et al.

(10) Patent No.: US 10,475,175 B2
(45) Date of Patent: *Nov. 12, 2019

(54) CONDUCTIVE FILM, DISPLAY DEVICE HAVING THE SAME, AND METHOD OF EVALUATING WIRING PATTERNS OF CONDUCTIVE FILM

(71) Applicant: FUJIFILM Corporation, Tokyo (JP)

(72) Inventors: Yoshitaka Yamaguchi, Ashigara-kami-gun (JP); Kazuchika Iwami, Ashigara-kami-gun (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 264 days.

This patent is subject to a terminal disclaimer.

(21) Appl. No.: 15/487,673

(22) Filed: Apr. 14, 2017

(65) Prior Publication Data

US 2017/0221196 A1    Aug. 3, 2017

Related U.S. Application Data

(63) Continuation of application No. PCT/JP2015/078987, filed on Oct. 14, 2015.

(30) Foreign Application Priority Data

Oct. 15, 2014 (JP) ................................. 2014-211188

(51) Int. Cl.
*G06T 7/00* (2017.01)
*G06F 3/044* (2006.01)
(Continued)

(52) U.S. Cl.
CPC ............ *G06T 7/0004* (2013.01); *G06F 3/044* (2013.01); *G06F 3/047* (2013.01); *G06T 7/90* (2017.01);
(Continued)

(58) Field of Classification Search
CPC .......... G06T 7/0004; G06T 7/90; G06F 3/044; G06F 3/0412; G06F 3/047; G06F 3/041;
(Continued)

(56) References Cited

U.S. PATENT DOCUMENTS 6,417,619 B1 * 7/2002 Yasunori .................. H01J 11/12
174/389
9,052,766 B2 * 6/2015 Dunphy ................ G06F 3/0412
(Continued)

FOREIGN PATENT DOCUMENTS

JP    2009-117683 A    5/2009
JP    2011-216379 A    10/2011
(Continued)

OTHER PUBLICATIONS

Communication dated Mar. 12, 2018, issued by the Korean Intellectual Property Office in corresponding Korean Application No. 10-2017-7010248.
(Continued)

*Primary Examiner* — Fred Tzeng
(74) *Attorney, Agent, or Firm* — Sughrue Mion, PLLC

(57) ABSTRACT

A conductive film is provided on the display unit such that the wiring patterns of the two wiring portions overlap with the pixel array patterns of the display unit. A projected wiring pattern, which is obtained when the wiring patterns of the two wiring portions having three-dimensional shapes are projected onto a plane perpendicular to a point of view, includes a regular wiring pattern which has a mesh shape, or an irregular wiring pattern which has mesh shapes and which is formed by making the regular wiring pattern irregular. An indicator of evaluation of moirés, which is caused by interference between a combined wiring pattern formed of the regular wiring pattern and projected pixel array patterns obtained when the pixel array patterns are
(Continued)

projected onto the same plane, is equal to or less than an evaluation threshold value.

47 Claims, 26 Drawing Sheets

(51) Int. Cl.
*G06T 7/90* (2017.01)
*G06F 3/047* (2006.01)
(52) U.S. Cl.
CPC .............. *G06F 2203/04112* (2013.01); *G06T 2207/10024* (2013.01); *G06T 2207/10056* (2013.01); *G06T 2207/30121* (2013.01)
(58) Field of Classification Search
CPC ...... H01G 9/2068; H01G 9/2031; H05B 3/84; H05K 1/0274
USPC ......................................................... 345/174
See application file for complete search history.

(56) References Cited

U.S. PATENT DOCUMENTS

| | | | | |
|---|---|---|---|---|
| 9,235,282 | B2* | 1/2016 | Adachi | G06F 3/041 |
| 9,250,753 | B2* | 2/2016 | Westhues | G06F 3/044 |
| 9,304,642 | B2* | 4/2016 | Kim | G06F 3/044 |
| 9,400,299 | B2* | 7/2016 | Deng | G06F 3/044 |
| 9,471,165 | B2* | 10/2016 | Koito | G06F 3/0412 |
| 9,832,862 | B2* | 11/2017 | Iwami | H05K 1/0274 |
| 10,055,832 | B2* | 8/2018 | Iwami | G06F 3/044 |
| 10,101,854 | B2* | 10/2018 | Iwami | G06F 3/044 |
| 2003/0094296 | A1* | 5/2003 | Kojima | H05K 9/0096 174/357 |
| 2006/0158467 | A1 | 7/2006 | Larson et al. | |
| 2009/0130433 | A1* | 5/2009 | Takada | B22F 1/0025 428/328 |
| 2010/0117975 | A1 | 5/2010 | Cho | |
| 2011/0102361 | A1* | 5/2011 | Philipp | G06F 3/044 345/174 |
| 2011/0134655 | A1* | 6/2011 | Ohtani | H05B 3/84 362/546 |
| 2011/0291058 | A1* | 12/2011 | Kunishi | G06F 3/044 252/514 |
| 2012/0199189 | A1* | 8/2012 | Jin | H01G 9/2031 136/256 |
| 2012/0318346 | A1* | 12/2012 | Miyashita | H01G 9/2068 136/256 |
| 2013/0028503 | A1* | 1/2013 | Wakui | H05K 9/0086 382/141 |
| 2015/0015980 | A1 | 1/2015 | Iwami | |
| 2015/0342034 | A1 | 11/2015 | Iwami | |
| 2017/0102342 | A1* | 4/2017 | Iwami | B32B 7/02 |
| 2017/0200263 | A1* | 7/2017 | Iwami | G06F 3/041 |
| 2017/0243342 | A1* | 8/2017 | Iwami | G06T 7/0004 |

FOREIGN PATENT DOCUMENTS

| | | |
|---|---|---|
| JP | 2012-163933 A | 8/2012 |
| JP | 2012-163951 A | 8/2012 |
| JP | 2012-164648 A | 8/2012 |
| JP | 2013-214545 A | 10/2013 |
| KR | 10-2007-0105975 A | 10/2007 |
| KR | 10-2010-0052227 A | 5/2010 |
| WO | 2014123009 A1 | 8/2014 |

OTHER PUBLICATIONS

International Search Report for PCT/JP2015/078987 dated Jan. 12, 2016 [PCT/ISA/210].
Communication dated Sep. 11, 2017, from the European Patent Office in counterpart European Application No. 15850592.5.
Communication dated Oct. 3, 2017, from the Japanese Patent Office in counterpart application No. 2014-211188.
Communication, dated Jul. 26, 2018, issued in corresponding EP Application No. 18165701.6, 14 pages in English.
International Preliminary Report on Patentability with translation of Written Opinion dated Apr. 27, 2017, issued by the International Searching Authority in application No. PCT/JP2015/078987.

* cited by examiner

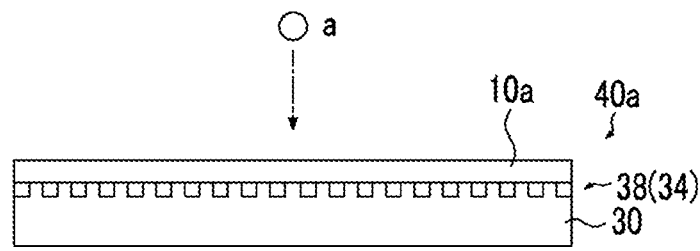
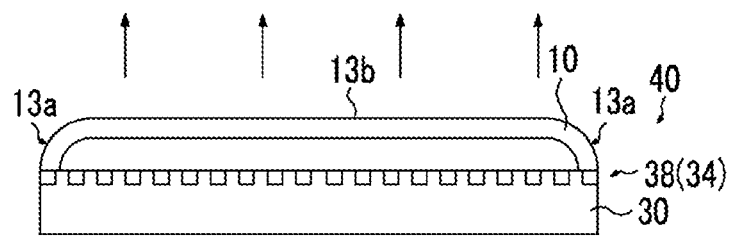
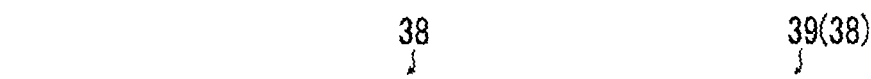
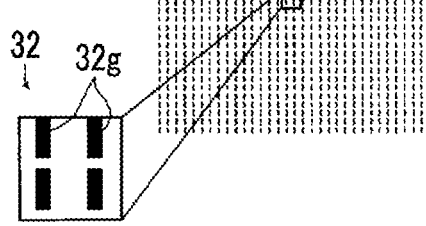

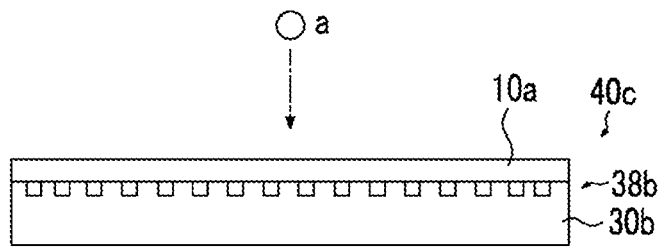
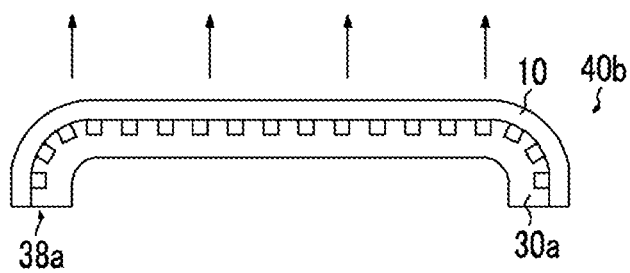
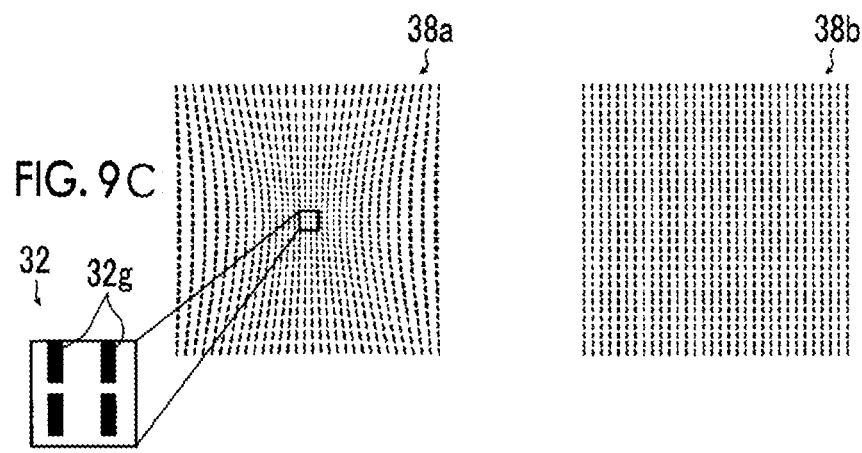

26　17(17a)　26
(25a)　(25)　(25a)

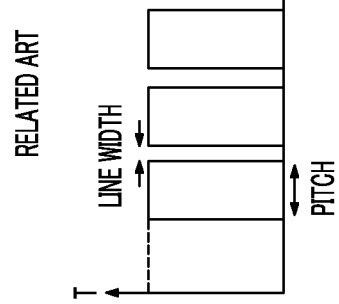
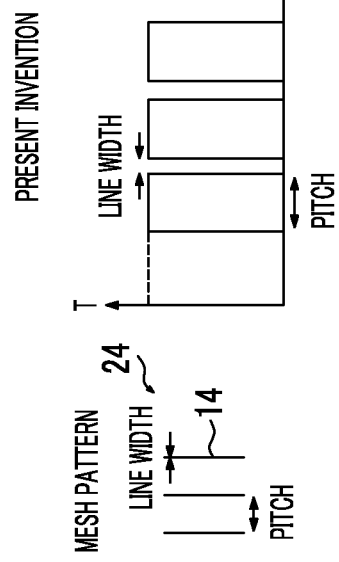
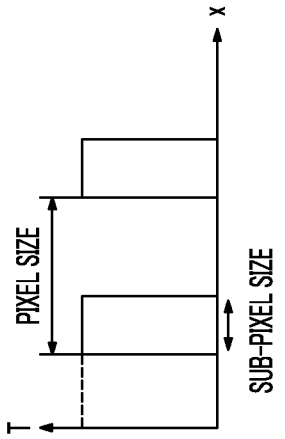
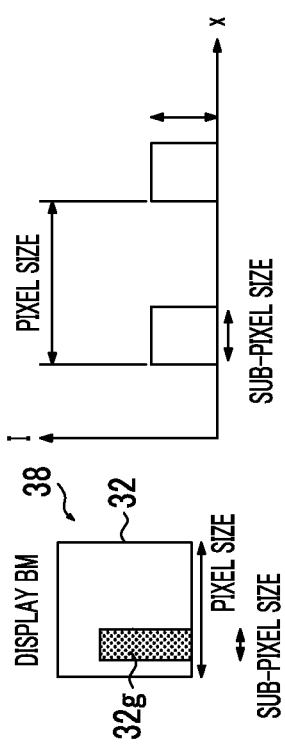

CAPTURED IMAGE

INPUT DATA

FIG. 46A
FIG. 46B
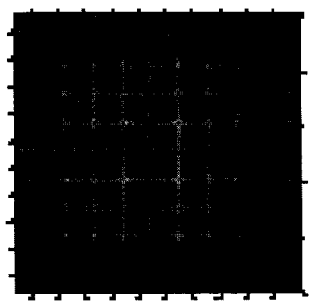
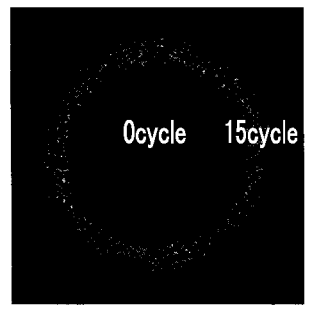
FIG. 47A
FIG. 47B
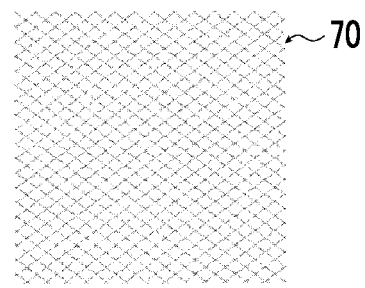
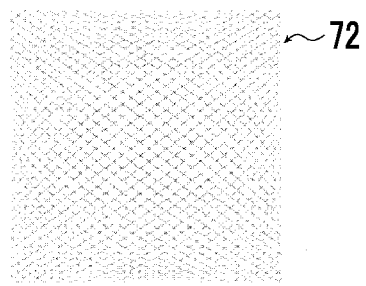

US 10,475,175 B2

CONDUCTIVE FILM, DISPLAY DEVICE HAVING THE SAME, AND METHOD OF EVALUATING WIRING PATTERNS OF CONDUCTIVE FILM

CROSS-REFERENCE TO RELATED APPLICATIONS

This application is a Continuation of PCT International Application No. PCT/JP2015/078987 filed on Oct. 14, 2015, which claims priority under 35 U.S.C. § 119(a) to Japanese Patent Application No. 2014-211188 filed on Oct. 15, 2014. The above application is hereby expressly incorporated by reference, in its entirety, into the present application.

BACKGROUND OF THE INVENTION

1. Field of the Invention

The present invention relates to a conductive film used in a three-dimensional shape state, a display device having the same, and a method of evaluating wiring patterns of the conductive film.

2. Description of the Related Art

As a conductive film provided on a display unit of a display device (hereinafter also referred to as a display) such as a mobile phone, there are conductive films for shielding electromagnetic waves, conductive films for touch panels, and the like (refer to JP2009-117683A, JP2011-216379A, JP2012-163933A, JP2012-163951A, and JP2012-164648A).

JP2009-117683A relating to the application of the present applicant discloses a conductive film in which a second pattern generated by second pattern data is automatically selected. In the second pattern data, a relative distance between the spectrum peaks of the two-dimensional Fourier spectrum (2DFFTSp) of each pattern data of a first pattern, such as a pixel array pattern (for example, a black matrix (hereinafter also referred to as BM) pattern) of a display, and a second pattern, such as an electromagnetic wave shielding pattern, is greater than a predetermined spatial frequency, for example, 8 cm$^{-1}$.

In such a manner, in JP2009-117683A, it is possible to suppress occurrence of moiré, and it is possible to automatically select an electromagnetic wave shielding pattern capable of avoiding an increase in surface resistivity and deterioration in transparency.

On the other hand, JP2011-216379A relating to the application of the present applicant discloses, as a transparent conductive layer that has a mesh pattern having a plurality of polygonal meshes, a transparent conductive layer in which a mesh pattern is formed such that, regarding the centroid spectrum of each mesh, a predetermined spatial frequency, for example, an average intensity close to the band of the spatial frequency higher than the spatial frequency at which the response characteristic of human vision corresponds to 5% of the maximum response is greater than the average intensity close to the band of the spatial frequency lower than the predetermined spatial frequency.

In such a manner, in JP2011-216379A, it is possible to reduce the noise graininess caused by a pattern, and it is possible to provide a transparent conductive layer that is capable of remarkably improving visibility of an observation object and that has stable current conduction performance even after trimming of the edges.

In JP2012-163933A relating to the application of the present applicant, in the conductive pattern formed of the rhomboid mesh using the thin metal lines, a ratio of the lengths of the two diagonal lines of the rhomboid of an opening portion of each mesh is limited to a predetermined range. In JP2012-163951A, in the mesh pattern using thin metal lines, an angle of inclination of the thin metal lines to a direction of pixel array of the display device is limited to a predetermined range. In JP2012-164648A, in a rhomboid mesh pattern using the thin metal lines, an apex angle of the rhomboid of an opening portion of each mesh is limited to a predetermined range. Thereby, the following effects are obtained: moiré is less likely to occur even when the conductive film is attached to the display panel, and production thereof can be performed with high yield.

SUMMARY OF THE INVENTION

Meanwhile, all the conductive films disclosed in JP2009-117683A, JP2011-216379A, JP2012-163933A, JP2012-163951A, and JP2012-164648A have planar shapes. When the film is superposed on a flat display surface of the display, moiré caused by the interference between the wiring pattern of the conductive film and the BM pattern of the display is reduced, and thus it is possible to improve visibility of moiré. However, in a case where the planar conductive film with good visibility of moiré is formed in a three-dimensional shape, for example, in a case of using a three-dimensional shape formed such that the corresponding both sides are curved and the center portion between both sides is flat, due to a change from a planar shape (two-dimensional shape) to a three-dimensional shape, for example, even in a wiring pattern 70 of the conductive film having a planar shape with good visibility of moiré shown in FIG. 47A, a spatial frequency of the wiring pattern is changed. Thus, a projected wiring pattern 72 in a case where observation is performed at the point of view from the front of the display surface of the display as shown in FIG. 47B is obtained. As a result, there is a problem in that, in the curved portion in which the original shape is deformed, moiré is caused by interference between the projected wiring pattern 72 and the BM pattern, as shown in FIG. 48.

Further, in JP2009-117683A, a moiré frequency is controlled on the basis of only frequency information of a conductive film wiring pattern and a BM pattern of a display. Therefore, in perception of moiré of a person who is affected not only by the frequency but also by the intensity, moiré may be visually recognized at a certain intensity. As a result, there is a problem in that visibility of moiré is not sufficiently improved.

Furthermore, in JP2011-216379A, considering the response characteristic of human vision with respect to the centroid spectrum of each mesh of the mesh pattern of the transparent conductive layer, noise feeling of the mesh pattern of the transparent conductive layer perceived visually by humans is reduced. However, there is a problem in that this configuration does not lead to improvement of the visibility of moiré.

In order to solve the above-mentioned problems of the related arts, an object of the present invention is to provide a conductive film, a display device having the same, and a method of evaluating wiring patterns of the conductive film. The conductive film is capable of remarkably improving visibility of moiré and noise (graininess) by suppressing moiré and noise (grainy feeling) when using a three-dimensionally shaped conductive film which is superposed on a planar or three-dimensionally shaped display surface of a display device.

Particularly, an object of the present invention is to provide a conductive film, a display device having the same, and a method of evaluating and determining wiring patterns of the conductive film. The conductive film is capable of remarkably improving visibility of display on a touch panel by suppressing occurrence of moiré and noise, which greatly deteriorate image quality when the conductive film is superposed upon black matrices of the display unit of the display device and the display device is viewed, in a case where a three-dimensionally shaped conductive film having a three-dimensionally shaped wiring pattern is superposed on a planar or the same three-dimensionally shaped display surface of the display unit of the display device and is used as an electrode for the touch panel.

In order to achieve the above-mentioned objects, according to a first aspect of the present invention, a conductive film is provided on a display unit of a display device. The conductive film comprises: a transparent substrate that has a three-dimensional shape; and two wiring portions that have three-dimensional shapes and are arranged on both sides of the transparent substrate or arranged on a single side. At least one wiring portion of the two wiring portions has a mesh-shaped wiring pattern in which a plurality of opening portions formed of a plurality of thin metal lines are arranged. In the display unit, pixels, which include a plurality of sub-pixels emitting light with a plurality of colors that are at least three colors different from each other, are arranged in pixel array patterns. The conductive film is provided on the display unit such that the wiring patterns of the two wiring portions overlap with the pixel array patterns of the display unit. A projected wiring pattern, which is obtained when the wiring patterns of the two wiring portions having three-dimensional shapes are projected onto a plane perpendicular to a point of view, includes a regular wiring pattern which has a mesh shape, or an irregular wiring pattern which has mesh shapes and which is formed by making the regular wiring pattern irregular. An indicator of evaluation of moirés, which is caused by interference between a combined wiring pattern formed of the regular wiring pattern and projected pixel array patterns obtained when the pixel array patterns are projected onto the same plane, is equal to or less than an evaluation threshold value. From the point of view, in frequencies and intensities of the moirés of respective colors of a plurality of colors calculated from a first peak frequency and a first peak intensity of a plurality of first spectrum peaks of two-dimensional Fourier spectra of transmittance image data of the combined wiring pattern and a second peak frequency and a second peak intensity of a plurality of second spectrum peaks of two-dimensional Fourier spectra of luminance image data of the projected pixel array patterns of the respective colors when light beams with the plurality of colors are respectively emitted, the indicator of evaluation of moirés is calculated from evaluation values of the moirés of the respective colors obtained by applying human visual response characteristics in accordance with an observation distance to intensities of the moirés equal to or greater than a first intensity threshold value among intensities of the moirés at frequencies of the moirés equal to or less than a frequency threshold value defined on the basis of a display resolution of the display unit.

In order to achieve the above-mentioned objects, according to a second aspect of the present invention, a conductive film is provided on a display unit of a display device. The conductive film comprises: a transparent substrate that has a three-dimensional shape; and two wiring portions that have three-dimensional shapes and are arranged on both sides of the transparent substrate or arranged on a single side. At least one wiring portion of the two wiring portions has a mesh-shaped wiring pattern in which a plurality of opening portions formed of a plurality of thin metal lines are arranged. In the display unit, pixels, which include a plurality of sub-pixels emitting light with a plurality of colors that are at least three colors different from each other, are arranged in pixel array patterns. The conductive film is provided on the display unit such that the wiring patterns of the two wiring portions overlap with the pixel array patterns of the display unit. A projected wiring pattern, which is obtained when the wiring patterns of the two wiring portions having three-dimensional shapes are projected onto a plane perpendicular to a point of view, is a combined wiring pattern including an irregular wiring pattern which has mesh shapes and has irregularity such that at least shapes of the opening portions thereof are polygonal shapes. An indicator of evaluation of noises, which is caused by interference between the combined wiring pattern and projected pixel array patterns obtained when the pixel array patterns are projected onto the same plane, is equal to or less than an evaluation threshold value. From the point of view, in frequencies and intensities of the noises of respective colors of a plurality of colors calculated from a first peak frequency and a first peak intensity of a plurality of first spectrum peaks of two-dimensional Fourier spectra of transmittance image data of the combined wiring pattern and a second peak frequency and a second peak intensity of a plurality of second spectrum peaks of two-dimensional Fourier spectra of luminance image data of the projected pixel array patterns of the respective colors when light beams with the plurality of colors are respectively emitted, the indicator of evaluation of noises is calculated from evaluation values of the noises of the respective colors obtained by applying human visual response characteristics in accordance with an observation distance to intensities of the noises equal to or greater than a first intensity threshold value among intensities of the noises at frequencies of the noises equal to or less than a frequency threshold value defined on the basis of a display resolution of the display unit.

In order to achieve the above-mentioned objects, according to a third aspect of the present invention, a display device comprises: a display unit in which pixels, which include a plurality of sub-pixels emitting light with a plurality of colors that are different from each other, are arranged in pixel array patterns which are repeated in a certain direction and a direction perpendicular to the certain direction; and the conductive film according to the first or second aspect, the conductive film being provided on the display unit.

Further, in order to achieve the above-mentioned objects, according to a fourth aspect of the present invention, there is provided a method of evaluating wiring patterns of a conductive film that is provided on a display unit of a display device and has a transparent substrate which has a three-dimensional shape and two wiring portions which have three-dimensional shapes and are arranged on both sides of the transparent substrate or arranged on a single side. The method comprises: making at least one wiring portion of the two wiring portions have a mesh-shaped wiring pattern in which a plurality of opening portions formed of a plurality of thin metal lines are arranged; arranging pixels, which include a plurality of sub-pixels emitting light with a plurality of colors that are at least three colors different from each other, are arranged in pixel array patterns, in the display unit; providing the conductive film on the display unit such that the wiring patterns of the two wiring portions overlap with the pixel array patterns of the display unit; projecting the wiring patterns of the two wiring portions having three-dimensional shapes on a plane perpendicular to a point of view, obtaining transmittance image data of a regular wiring pattern, which is included in a projected wiring pattern and has a mesh shape or the regular wiring pattern and an irregular wiring pattern which has mesh shapes and which is formed by making the regular wiring pattern irregular, and acquiring transmittance image data of a combined wiring pattern in which the regular wiring patterns overlap; acquiring luminance image data of projected pixel array patterns of respective colors of a plurality of colors of the display unit by projecting the pixel array patterns of the respective colors on the same plane; calculating a first peak frequency and a first peak intensity of a plurality of first spectrum peaks of two-dimensional Fourier spectra of transmittance image data of the combined wiring pattern and a second peak frequency and a second peak intensity of a plurality of second spectrum peaks of two-dimensional Fourier spectra of luminance image data of the projected pixel array patterns of the respective colors of the plurality of colors, for each color, by performing two-dimensional Fourier transform on the transmittance image data of the combined wiring pattern and the luminance image data of the projected pixel array patterns, from the point of view; calculating frequencies and intensities of moirés of the respective colors of the plurality of colors from the calculated first peak frequency and the calculated first peak intensity of the combined wiring pattern and the calculated second peak frequency and the calculated second peak intensity of the projected pixel array patterns of the respective plurality of colors; selecting moirés having frequencies equal to or less than a frequency threshold value and intensities equal to or greater than a first intensity threshold value defined on the basis of a display resolution of the display unit, among the calculated frequencies and intensities of the moirés of the respective colors; acquiring evaluation values of moirés of the respective colors by applying human visual response characteristics in accordance with an observation distance to the intensities of moirés at the respective frequencies of the selected moirés of the respective colors; calculating an indicator of evaluation of the moirés from the acquired evaluation values of the moirés of the respective colors; and evaluating the conductive film that has the unprojected mesh-shaped wiring pattern of at least one wiring portion of the two wiring portions constituting the combined wiring pattern of which the calculated indicator of evaluation of the moirés is equal to or less than a predetermined value.

Furthermore, in order to achieve the above-mentioned objects, according to a fifth aspect of the present invention, there is provided a method of evaluating wiring patterns of a conductive film that is provided on a display unit of a display device and has a transparent substrate which has a three-dimensional shape and two wiring portions which have three-dimensional shapes and are arranged on both sides of the transparent substrate or arranged on a single side. The method comprises: making at least one wiring portion of the two wiring portions have a mesh-shaped wiring pattern in which a plurality of opening portions formed of a plurality of thin metal lines are arranged; arranging pixels, which include a plurality of sub-pixels emitting light with a plurality of colors that are at least three colors different from each other, are arranged in pixel array patterns, in the display unit; providing the conductive film on the display unit such that the wiring patterns of the two wiring portions overlap with the pixel array patterns of the display unit; projecting the wiring patterns of the two wiring portions having three-dimensional shapes on a plane perpendicular to a point of view, obtaining transmittance image data of an irregular wiring pattern, which is at least included in projected wiring patterns and which has mesh shapes and has irregularity such that at least shapes of the opening portions thereof are polygonal shapes, and acquiring transmittance image data of a combined wiring pattern including the irregular wiring pattern; acquiring luminance image data of projected pixel array patterns of respective colors of a plurality of colors of the display unit by projecting the pixel array patterns of the respective colors on the same plane; calculating a first peak frequency and a first peak intensity of a plurality of first spectrum peaks of two-dimensional Fourier spectra of transmittance image data of the combined wiring pattern and a second peak frequency and a second peak intensity of a plurality of second spectrum peaks of two-dimensional Fourier spectra of luminance image data of the projected pixel array patterns of the respective colors of the plurality of colors, for each color, by performing two-dimensional Fourier transform on the transmittance image data of the combined wiring pattern and the luminance image data of the projected pixel array patterns, from the point of view; calculating frequencies and intensities of noises of the respective colors of the plurality of colors from the calculated first peak frequency and the calculated first peak intensity of the combined wiring pattern and the calculated second peak frequency and the calculated second peak intensity of the projected pixel array patterns of the respective plurality of colors; selecting noises having frequencies equal to or less than a frequency threshold value and intensities equal to or greater than a first intensity threshold value defined on the basis of a display resolution of the display unit, among the calculated frequencies and intensities of the noises of the respective colors; acquiring evaluation values of noises of the respective colors by applying human visual response characteristics in accordance with an observation distance to the intensities of noises at the respective frequencies of the selected noises of the respective colors; calculating an indicator of evaluation of the noises from the acquired evaluation values of the noises of the respective colors; and evaluating the conductive film that has the unprojected mesh-shaped wiring pattern of at least one wiring portion of the two wiring portions constituting the combined wiring pattern of which the calculated indicator of evaluation of the noises is equal to or less than a predetermined value.

Here, in the first, third, or fourth aspect, it is preferable that a display surface of the display unit has a three-dimensional shape, and the pixel array patterns have three-dimensional shapes.

It is preferable that the projected wiring pattern is formed of the single or two regular wiring patterns, and the regular wiring pattern is a regular rhomboid wiring pattern of which the opening portions have rhomboid shapes, the evaluation threshold value is −3.17.

It is preferable that the projected wiring pattern is formed of the single or two irregular wiring patterns, or the irregular wiring pattern and the regular wiring pattern, the regular wiring pattern is a regular rhomboid wiring pattern of which the opening portions have rhomboid shapes, and the irregular wiring pattern has a degree of irregularity equal to or less than a threshold value of irregularity with respect to the rhomboid shape of the regular wiring pattern.

It is preferable that the evaluation threshold value is −2.80, the threshold value of irregularity is 10%, and the irregular wiring pattern has a degree of irregularity which is greater than 0% and equal to or less than 10% of a pitch of the rhomboid shape of the regular wiring pattern.

It is preferable that the evaluation threshold value is −2.80, the threshold value of irregularity is 3.0%, and the irregular wiring pattern has a degree of irregularity which is greater than 0% and equal to or less than 3.0% of an angle of the rhomboid shape of the regular wiring pattern.

It is preferable that the projected wiring pattern is forming of the single or two irregular wiring patterns, or the irregular wiring pattern and the regular wiring pattern, the regular wiring pattern is a regular polygonal wiring pattern of which the opening portions have polygonal shapes, and the irregular wiring pattern is a wavy wiring pattern which has a degree of irregularity within an amplitude threshold value by making sides of the polygonal shapes of the regular wiring pattern as wavy lines.

It is preferable that the evaluation threshold value is −3.00, and the amplitude threshold value is equal to or greater than 2.0% and equal to or less than 20% of a pitch of the regular polygonal wiring pattern.

It is preferable that the polygonal shape is a rhomboid shape.

It is preferable that the projected wiring pattern of the two wiring portions is formed of the two irregular wiring patterns.

It is preferable that the projected wiring pattern of the two wiring portions is formed of the irregular wiring pattern and the regular wiring pattern.

It is preferable that at least one wiring portion of the two wiring portions includes an electrode portion and a non-electrode portion, and one wiring pattern of the electrode portion and the non-electrode portion is the irregular wiring pattern, and the other wiring pattern is the regular wiring pattern.

It is preferable that a wiring pattern of one wiring portion of the two wiring portions is the irregular wiring pattern, and a wiring pattern of the other wiring portion is made of indium tin oxide, and the projected wiring pattern of the two wiring portions is formed of only one irregular wiring pattern.

It is preferable that the plurality of first spectrum peaks has a peak intensity that is equal to or greater than a first threshold value which is selected from a plurality of spectrum peaks obtained by performing two-dimensional Fourier transform on the transmittance image data of the combined wiring pattern, and for each of the plurality of colors, the plurality of second spectrum peaks has a peak intensity that is equal to or greater than a second threshold value which is selected from a plurality of spectrum peaks obtained by performing two-dimensional Fourier transform on the luminance image data of the projected pixel array pattern.

It is preferable that a frequency of a moiré corresponding to each color is given as a difference between the first peak frequency and the second peak frequency corresponding to each color, and an intensity of the moiré corresponding to each color is given as a product between the first peak intensity and the second peak intensity corresponding to each color.

It is preferable that an evaluation value of the moiré is calculated by weighting a visual transfer function, which corresponds to the observation distance as the visual response characteristics, to the frequency and the intensity of the moiré through convolution integration.

It is preferable that the visual transfer function VTF is given by the following Expression (1).

$$VTF = 5.05 e^{-0.138\,k}(1 - e^{0.1\,k}) \quad (1)$$

$$k = \pi d u / 180$$

Here, k is a spatial frequency (cycle/deg) defined by a solid angle, u shown in the above-mentioned Expression (1) is a spatial frequency (cycle/mm) defined by a length, and d is defined by an observation distance (mm).

It is preferable that the indicator of evaluation of the moirés is calculated using a largest evaluation value among the evaluation values of the plurality of the moirés in which a frequency of one of the moirés is weighted in accordance with the observation distance for each color.

It is preferable that the indicator of evaluation of the moirés is a largest sum among sums for the plurality of colors, the sums being obtained by adding the frequencies of all the moirés to the largest evaluation value selected with respect to the frequency of one of the moirés for each color.

It is preferable that the first intensity threshold value is −4.5 as a common logarithm, and the frequency threshold value is a spatial frequency which is obtained from the resolution of the display unit, and a moiré, which is selected in order to apply the visual response characteristics, has an intensity which is equal to or greater than −3.8.

It is preferable that assuming that a display pixel pitch of the display unit is Pd μm, the spatial frequency obtained from the resolution of the display unit is a highest frequency of the moirés which is given as 1000/Pd cycle/mm.

In the second, third, or fifth aspect, it is preferable that a display surface of the display unit has a three-dimensional shape, and the pixel array patterns have three-dimensional shapes.

It is preferable that the evaluation threshold value is −2.80.

It is preferable that the projected wiring pattern of the two wiring portions is formed of the two irregular wiring patterns.

It is preferable that the projected wiring pattern of the two wiring portions is formed of the irregular wiring pattern and the regular polygonal wiring pattern of which the opening portions have polygonal shapes.

It is preferable that at least one wiring portion of the two wiring portions includes an electrode portion and a non-electrode portion, and one wiring pattern of the electrode portion and the non-electrode portion is the irregular wiring pattern, and the other wiring pattern is a regular wiring pattern of which the opening portions have polygonal shapes.

It is preferable that a wiring pattern of one wiring portion of the two wiring portions is the irregular wiring pattern, and a wiring pattern of the other wiring portion is made of indium tin oxide, and the projected wiring pattern of the two wiring portions is formed of only one irregular wiring pattern.

It is preferable that the plurality of first spectrum peaks has a peak intensity that is equal to or greater than a first threshold value which is selected from a plurality of spectrum peaks obtained by performing two-dimensional Fourier transform on the transmittance image data of the combined wiring pattern, and for each of the plurality of colors, the plurality of second spectrum peaks has a peak intensity that is equal to or greater than a second threshold value which is selected from a plurality of spectrum peaks obtained by performing two-dimensional Fourier transform on the luminance image data of the projected pixel array pattern.

It is preferable that a frequency and an intensity of a noise corresponding to each color is calculated through convolution operation of the first peak frequency and the first peak intensity and the second peak frequency and the second peak intensity corresponding to each color.

It is preferable that the frequency of the noise corresponding to each color is given as a difference between the first peak frequency and the second peak frequency corresponding to each color, and the intensity of the noise corresponding to each color is given as a product between the first peak intensity and the second peak intensity corresponding to each color.

It is preferable that an evaluation value of the noise is calculated by weighting a visual transfer function, which corresponds to the observation distance as the visual response characteristics, to the frequency and the intensity of the noise through convolution integration.

It is preferable that the visual transfer function VTF is given by the following Expression (1).

It is preferable that the indicator of evaluation of the noises is calculated using a largest evaluation value among the evaluation values of the plurality of the noises in which a frequency of one of the noises is weighted in accordance with the observation distance for each color.

It is preferable that the indicator of evaluation of the noises is a largest sum among sums for the plurality of colors, the sums being obtained by adding the frequencies of all the noises to the largest evaluation value selected with respect to the frequency of one of the noises for each color.

It is preferable that the first intensity threshold value is −4.5 as a common logarithm. Further, it is preferable that the frequency threshold value is a spatial frequency which is obtained from the resolution of the display unit, that is, a spatial frequency which corresponds to an inverse of a pitch of a single pixel.

It is preferable that assuming that a display pixel pitch of the display unit is Pd μm the spatial frequency obtained from the resolution of the display unit is a highest frequency of the noises which is given as 1000/Pd cycle/mm.

In the first, second, third, fourth, or fifth aspect, it is preferable that the luminance image data of the projected pixel array patterns of the respective colors is obtained by converting normalized luminance data from the pixel array patterns to the projected pixel array patterns, where the normalized luminance data is obtained by normalizing the luminance image data obtained by converting captured image data of the colors, which is obtained by capturing images of the pixel array patterns of the respective colors displayed on a display screen of the display unit, into luminance values, when the light beams with the plurality of colors are separately emitted.

It is preferable that images of the pixel array patterns of the respective colors displayed on the display screen of the display unit are displayed on the display unit when the light beams with the plurality of colors are separately emitted at a maximum intensity which is settable for each color.

It is preferable that when the plurality of colors is three colors such as red, green, and blue, the captured image data of the images of the pixel array patterns of the respective colors such as red, green, and blue is image data that is obtained through imaging performed through white balance adjustment based on a white color of a Macbeth chart.

It is preferable that the luminance image data of the images of the projected pixel array patterns of the respective colors of the plurality of colors is obtained by converting data, which is obtained by giving the luminance data in which a measured luminance value is normalized through a product between a resolution of the display unit and an area having a value of a mask image, from the pixel array patterns to the projected pixel array patterns, where the mask image is created from the captured image data which is obtained by capturing the image of the pixel array pattern of a current color displayed on the display screen of the display unit through a microscope, when the light beams of the respective colors of the plurality of colors are separately emitted in the display unit, and the luminance image data is obtained by normalizing a reference luminance of the display unit of the display device to 1.0.

It is preferable that when the plurality of colors is three colors such as red, green, and blue, the measured luminance value is a luminance value which is obtained from spectrum data of each color of red, green, and blue by separately performing display for each color of red, green, and blue and performing measurement through a spectrometer, and the mask image is an image that is obtained by binarizing the captured image data which is obtained through imaging of the microscope.

It is preferable that the two wiring portions are respectively formed on both side surfaces of the transparent substrate.

It is preferable that the conductive film further comprises a second transparent substrate that is different from a first transparent substrate when the transparent substrate is defined as the first transparent substrate, one wiring portion of the two wiring portions is formed on one surface of the first transparent substrate, and the other wiring portion of the two wiring portions is formed on one surface of the second transparent substrate, on the other surface side of the first transparent substrate.

It is preferable that the two wiring portions are respectively formed with insulation layers interposed therebetween on single sides of the transparent substrates.

It is preferable that from at least two points of view of front observation and oblique observation, the evaluation value is obtained for each color of the plurality of colors, and the indicator of evaluation is a largest evaluation value among evaluation values of respective colors obtained in the at least two points of view.

It is preferable that the pixel array patterns are black matrix patterns.

As described above, according to the present invention, when using the three-dimensionally shaped conductive film which is superposed on a planar or three-dimensionally shaped display surface of a display device, it is possible to remarkably improve visibility of moiré and noise (graininess) by suppressing moiré and noise (grainy feeling).

That is, according to preferred embodiments of the present invention, evaluation values of moirés or noises of the respective colors of the plurality of colors, which are obtained through frequency analysis of the projected wiring pattern and the projected pixel array pattern of the display device in a state where the three-dimensionally shaped wiring pattern of the three-dimensionally shaped conductive film is projected onto the plane perpendicular to the point of view, are calculated from the frequencies/intensities of the moirés or noises of the respective colors. A numerical value of the indicator of evaluation of the moiré or noise calculated from the calculated evaluation value of the moiré or noise for each color is limited such that excellent visibility is obtained. Therefore, it is possible to obtain excellent visibility without deterioration in image quality caused by occurrence of the moiré or noise.

BRIEF DESCRIPTION OF THE DRAWINGS

FIGS. 5A and 5B are explanatory views for explaining projection from the three-dimensionally shaped wiring pattern shown in FIG. 4A to the projected planar wiring pattern shown in FIG. 4B, and are respectively schematic cross-sectional views illustrating a display device, which has a planar display unit and the three-dimensionally shaped conductive film shown in FIG. 1, and a projected display device which is obtained by projecting the display device onto a plane perpendicular to a predetermined point of view and which has a projected display unit and a projected conductive film both having planar shapes.

FIGS. 6A and 6B are respectively plan views schematically illustrating examples of the pixel array pattern of the planar display unit shown in FIG. 5A and the projected pixel array pattern of the projected planar display unit shown in FIG. 5B, and FIG. 6C is a partially enlarged view of the pixel array pattern shown in FIG. 6A, and shows only one sub-pixel.

FIGS. 8A and 8B are respectively schematic cross-sectional views illustrating a display device, which has a display unit and a conductive film both having three-dimensional shapes, according to another embodiment of the present invention, and a projected display device which is obtained by projecting the display device onto a plane perpendicular to a predetermined point of view and which has a projected display unit and a projected conductive film both having planar shapes.

FIGS. 9A and 9B are respectively plan views schematically illustrating other examples of the pixel array pattern of the planar display unit shown in FIG. 8A and the projected pixel array pattern of the projected planar display unit shown in FIG. 8B, and FIG. 9C is a partially enlarged view of the pixel array pattern shown in FIG. 9A, and shows only one sub-pixel.

FIG. 31A is a schematic diagram illustrating an example of a structure of the mesh wiring pattern (mesh pattern) shown in FIG. 14, FIG. 31B is a schematic diagram illustrating an example of a structure of the pixel array pattern of the display unit shown in FIG. 2, FIG. 31C is an example of a graph of a transmittance (T) of the mesh wiring pattern in the present invention, FIG. 31D is an example of a graph of an intensity (I) of a representative sub-pixel of the display unit, and FIGS. 31E and 31F are examples of graphs of transmittances (T) of the representative sub-pixels of the mesh wiring pattern and the display unit in the related arts.

FIG. 32B is a partially enlarged view of the pixel array patterns of FIG. 32A.

FIGS. 46A and 46B are respectively diagrams illustrating intensity characteristics of two-dimensional Fourier spectra of respective transmittance image data pieces of the pixel array pattern shown in FIG. 35(A1) and the random mesh pattern shown in FIG. 27.

FIGS. 47A and 47B are respectively schematic diagram of planes schematically illustrating a planar wiring pattern in a plane state of the conductive film, which is optimized on a plane, and a projected wiring pattern which is three-dimensionally projected in a used state.

DESCRIPTION OF THE PREFERRED EMBODIMENTS

Hereinafter, a conductive film according to the present invention, a display device having the same, and a method of evaluating the conductive film will be described in detail with reference to most preferred embodiments shown in the accompanying drawings.

The conductive film of the present invention has a three-dimensional shape, and is provided on a display unit of a planar shape or a three-dimensional shape of a display device.

Hereinafter, the conductive film according to the present invention will be described as a representative example of a conductive film for a three-dimensionally shaped touch panel. The present invention is not limited to this. The conductive film may be any conductive film if it is a conductive film that is provided on the display unit with various light emission intensities of the display device and has wiring portions having three-dimensionally shaped wiring patterns which are disposed on both sides of a transparent substrate having a three-dimensional shape or disposed on a single side thereof with an insulation layer interposed therebetween and which include at least one wiring pattern formed of cells (opening portions) having predetermined shapes. For example, as a matter of course, the present invention may be applied to a conductive film for shielding electromagnetic waves and the like.

The display unit of the display device on which the conductive film according to the present invention is superposed is not particularly limited. However, examples thereof include a liquid crystal display (LCD), a plasma display panel (PDP), organic light emitting (EL) diode (OLED) and an organic electro-luminescence display (OELD) using organic electro-luminescence (OEL), an inorganic electro-luminescence (EL) display, electronic paper, and the like.

Before description of the conductive film according to the present invention, a display device comprising the conductive film of the present invention will be described.

Figure 1:
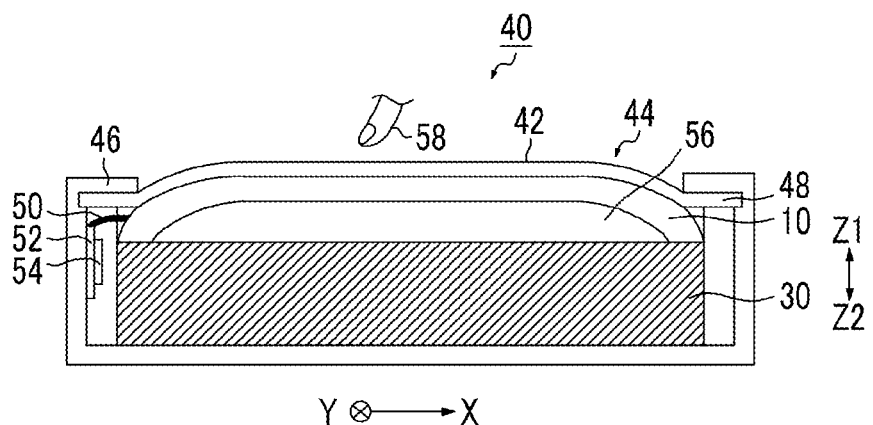
FIG. 1 is a schematic cross-sectional view of one example of a display device, in which a conductive film of the present invention is incorporated, according to an embodiment of the present invention.

FIG. 1 is a schematic cross-sectional view of a display device according to a first embodiment of the present invention in which the three-dimensionally shaped conductive film of the present invention is incorporated. Although a projection type capacitance type touch panel in which the conductive film of the present invention is incorporated will be described as a representative example, it is needless to say that the present invention is not limited thereto.

As shown in FIG. 1, the display device 40 includes the planar display unit 30 that can display a color image and/or a monochrome image, a touch panel 44 that is formed of a conductive film 10 according to the first embodiment of the present invention and detects a contact position on an input surface 42 (located on the side as directed by the arrow Z1), and a housing 46 in which the display unit 30 and the touch panel 44 are housed. A user is able to access the touch panel 44 through a large opening portion provided in one surface (on the side as directed by the arrow Z1) of the housing 46.

The touch panel 44 comprises not only the conductive film 10, a cover member 48 stacked on one surface (on the side as directed by the arrow Z1) of the conductive film 10, a flexible substrate 52 electrically connected to the conductive film 10 through a cable 50, and a detection control unit 54 disposed on the flexible substrate 52.

The conductive film 10 is bonded to one surface (on the side directed by the arrow Z1) of the display unit 30 through an adhesive layer 56. The conductive film 10 is disposed on the display screen such that one main surface side (first wiring portion 16a side: refer to FIG. 3) thereof faces the viewing side and the other main surface side (second wiring portion 16b side: refer to FIG. 3) thereof faces the display unit 30.

The cover member 48 functions as the input surface 42 by covering one surface of the conductive film 10. In addition, by preventing a contact member 58 (for example, a finger or a stylus pen) from coming into direct contact with the conductive film 10, it is possible to suppress the occurrence of a scratch, adhesion of dust, and the like, and thus it is possible to stabilize conductivity of the conductive film 10.

The material of the cover member 48 may be, for example, glass or a resin film. One surface (on the side as directed by the arrow Z2) of the cover member 48 may be coated with silicon oxide or the like, and may be adhered to one surface (on the side as directed by the arrow Z1) of the conductive film 10. Further, in order to prevent damage due to rubbing or the like, the conductive film 10 and the cover member 48 may be configured to be bonded to each other.

The flexible substrate 52 is an electronic substrate having flexibility. In the example shown in this diagram, the flexible substrate 52 is fixed to an inner wall of the housing 46, while the position of the substrate may be varied. The detection control unit 54 constitutes an electronic circuit that catches a change in the capacitance between the contact member 58 and the conductive film 10 and detects the contact position (or the approach position) when the contact member 58 as a conductor is brought into contact with (or comes closer to) the input surface 42.

Figure 2:
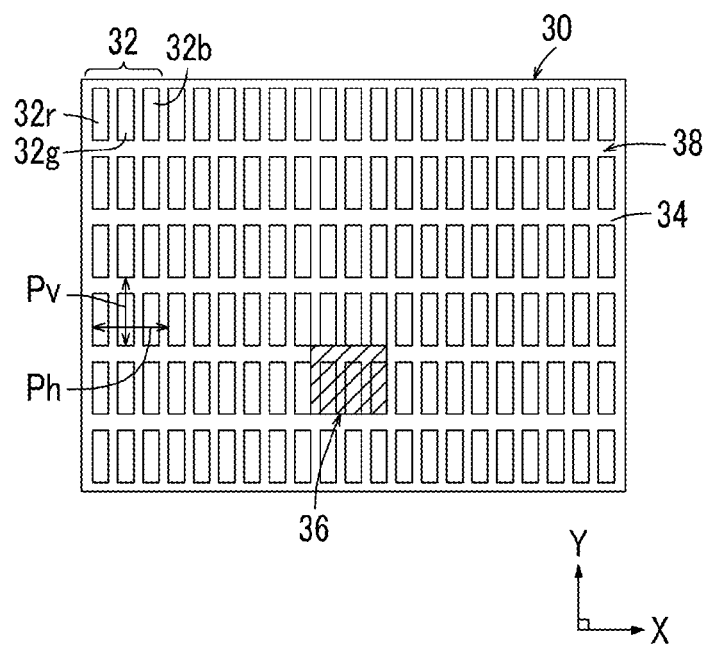
FIG. 2 is a schematic explanatory view illustrating an example of a pixel array pattern of a part of a display unit of the display device shown in FIG. 1.

FIG. 2 is a plan view for schematic description for an example of a pixel array pattern of a part of a display unit of the display device shown in FIG. 1.

As the part thereof is shown in FIG. 2, the display unit 30 has a plurality of pixels 32 arranged in a matrix shape to constitute a predetermined pixel array pattern 38. Each pixel 32 has a configuration in which three sub-pixels (a red sub-pixel 32r, a green sub-pixel 32g, and a blue sub-pixel 32b) are arranged in a horizontal direction. Each sub-pixel 32b has a rectangular shape which is long in the vertical direction. The arrangement pitch (horizontal pixel pitch Ph) of the pixels 32 in the horizontal direction and the arrangement pitch (vertical pixel pitch Pv) of the pixels 32 in the vertical direction are substantially equal to each other. That is, a shape (refer to a region 36 indicated by hatching), which is forming of a single pixel 32 and a black matrix (BM) 34 (pattern material) surrounding the single pixel 32, is a square shape. Further, an aspect ratio of the single pixel 32 is not 1, and satisfies the following expression: a length thereof in the horizontal (transverse) direction>a length thereof in the vertical (longitudinal) direction.

As can be clearly seen from FIG. 2, the pixel array pattern formed of the sub-pixels 32r, 32g, and 32b of each of the plurality of pixels 32 is defined by a BM pattern 38 of BMs 34 respectively surrounding the sub-pixels 32r, 32g, and 32b. Moiré or noise, which occurs when the conductive film 10 is superposed on the display unit 30, is caused by interference between the BM pattern 38 of the BMs 34 of the display unit 30 and a wiring pattern 24 of the conductive film 10. Therefore, precisely, the BM pattern 38 is an inverted pattern of the pixel array pattern, but here, these patterns are regarded as the same patterns.

For example, the conductive film 10 may be disposed on a display panel of the display unit 30 having the BM pattern 38 formed by the BMs 34. In this case, the wiring pattern 24 (a combined wiring pattern of the wiring patterns 24a and 24b) of the conductive film 10, is optimized in terms of visibility of moiré and noise with respect to the BM (pixel array) pattern 38, in a state of a projected planar wiring pattern 23 which is projected onto a plane perpendicular to a point of view a. Therefore, interference in spatial frequency between the array cycle of the pixels 32 and the wiring array of thin metal lines 14 of the conductive film 10 becomes negligible, and occurrence of moiré or noise is suppressed. As a result, the conductive film is excellent in terms of visibility of moiré and noise. Here, in the present invention, the visibility of moiré/noise is defined by a degree at which moiré/noise is not visually perceived.

It should be noted that the display unit 30 shown in FIG. 2 may be formed as a display panel such as a liquid crystal panel, a plasma panel, an organic EL panel, or an inorganic EL panel, and an emission intensity thereof may be different in accordance with a resolution.

As will be described in detail later, the display unit (hereinafter also referred to as a display) 30 of the display device 40, on which the conductive film 10 of the present invention is superposed, is not particularly limited if the display unit has the following characteristics. Pixels thereof, each of which includes a plurality of sub-pixels emitting light with a plurality of colors including at least mutually different three colors such as red, green, and blue, are arranged in the pixel array pattern (hereinafter also referred to as the BM pattern) 38, and the luminances (brightnesses) of respective sub-pixels (color filters) 32r, 32g, and 32b based on the emission intensity (luminance) of the pixels are not particularly limited if the luminances can be taken into consideration in terms of evaluation of the visibility of moiré/noise due to the superposition of the conductive film 10. For example, in the same manner as that of the related arts, the display unit 30 may have the following characteristics. The repetition cycles and the intensities (shapes, sizes), that is, the sub-pixel array pattern (the shapes, sizes, and cycles of the sub-pixels) of the sub-pixels (color filters) are all the same for a plurality of colors such as RGB, and the display unit has a BM pattern typified by G sub-pixels 32g. Further, like the above-mentioned OELD, the display unit 30 may be a display having a BM pattern that includes sub-pixel array patterns which are not the same for a plurality of colors, that is, which are different with respect to at least two colors.

In a manner similar to that of a high resolution smartphone, a tablet terminal, or the like, the display of the display device subjected to the present invention may be a display which has a high emission intensity. In a manner similar to that of a low resolution desktop PC, a television (TV), or the like, the display may be a display having a low emission intensity. In a manner similar to that of a medium resolution laptop or the like, the display may be a display having approximately a medium emission intensity.

The display device of the present invention is basically configured as described above.

Figure 3:
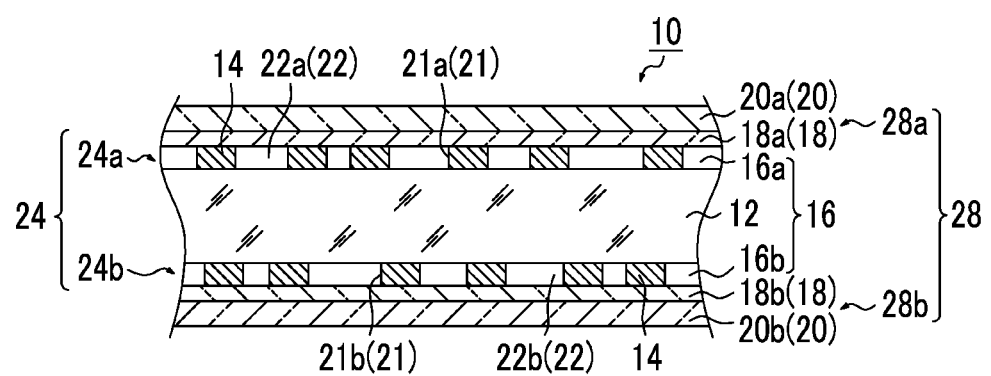
FIG. 3 is a partial cross-sectional view schematically illustrating an example of the conductive film, which is incorporated in the display device shown in FIG. 1, according to a first embodiment of the present invention.
Figure 4A:
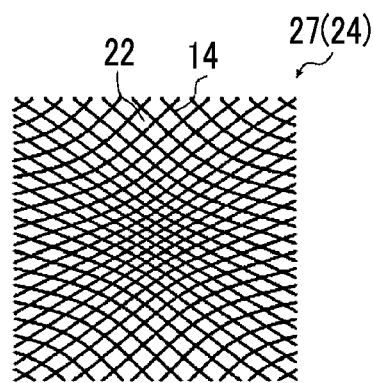
FIGS. 4A and 4B are respectively plan views schematically illustrating examples of a three-dimensionally shaped wiring pattern of a wiring portion of the three-dimensionally shaped conductive film shown in FIG. 3 and a projected planar wiring pattern which is obtained by projecting the three-dimensionally shaped wiring pattern onto a plane perpendicular to a predetermined point of view.
Figure 4B:
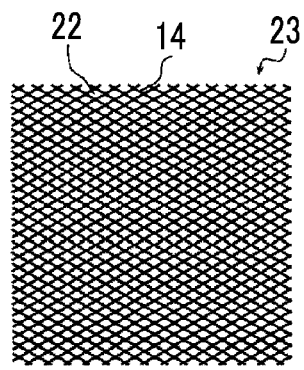
Figure 7A:
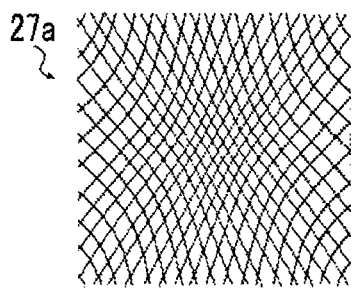
FIGS. 7A, 7C, and 7E each are a plan view schematically illustrating another example of a three-dimensionally shaped wiring pattern of a wiring portion of the three-dimensionally shaped conductive film shown in FIG. 3, and FIGS. 7B, 7D, and 7F each are a plan view schematically illustrating another example of a projected planar wiring pattern which is obtained by projecting the three-dimensionally shaped wiring pattern onto a plane perpendicular to a predetermined point of view.

FIG. 3 is a schematic partial cross-sectional view illustrating an example of a partial planar part of the conductive film according to the first embodiment of the present invention. FIGS. 4A and 4B are respectively plan views schematically illustrating examples of a three-dimensionally shaped wiring pattern of a wiring portion of the three-dimensionally shaped conductive film shown in FIG. 3 and a projected planar wiring pattern which is obtained by projecting the three-dimensionally shaped wiring pattern onto a plane perpendicular to a predetermined point of view. FIGS. 5A and 5B are explanatory views for explaining projection from the three-dimensionally shaped wiring pattern shown in FIG. 4A to the projected planar wiring pattern shown in FIG. 4B, and are respectively schematic cross-sectional views illustrating a display device, which has a planar display unit and the three-dimensionally shaped conductive film shown in FIG. 1, and a projected display device which is obtained by projecting the display device onto a plane perpendicular to a predetermined point of view and which has a projected display unit and a projected conductive film both having planar shapes. FIGS. 6A and 6B are respectively plan views schematically illustrating examples of the pixel array pattern of the planar display unit shown in FIG. 5A and the projected pixel array pattern of the projected planar display unit shown in FIG. 5B, and FIG. 6C is a partially enlarged view of the pixel array pattern shown in FIG. 6A, and shows only one sub-pixel. FIGS. 7A, 7C, and 7E each are a plan view schematically illustrating another example of a three-dimensionally shaped wiring pattern of a wiring portion of the three-dimensionally shaped conductive film shown in FIG. 3, and FIGS. 7B, 7D, and 7F each are a plan view schematically illustrating another example of a projected planar wiring pattern.

As shown in the drawings, the conductive film 10 of the present embodiment is provided on the display unit of the display device. The conductive film 10 is, for example, a conductive film that has a wiring pattern which is excellent in terms of suppression of occurrence of moiré/noise in the black matrix (BM) of the display unit, particularly, a wiring pattern which is optimized in terms of visibility of moiré/noise in the BM pattern when the wiring pattern overlaps with the BM pattern. The conductive film 10 has: a transparent substrate 12; the first wiring portion 16a that is formed on one surface (an upper surface in FIG. 3) of the transparent substrate 12, is formed of a plurality of thin lines made of metal (hereinafter referred to as thin metal lines) 14, and functions as a first electrode portion; a first protective layer 20a that is bonded to substantially the entire surface of the first wiring portion 16a through a first adhesive layer 18a so as to cover the thin metal lines 14; a second wiring portion (electrode) 16b that is formed on the other surface (a lower surface in FIG. 3) of the transparent substrate 10, is formed of a plurality of thin metal lines 14, and functions as a second electrode portion; and a second protective layer 20b that is bonded to substantially the entire surface of the second wiring portion 16b through a second adhesive layer 18b.

Hereinafter, the first wiring portion 16a and the second wiring portion 16b are collectively referred to as simply wiring portions 16, the first adhesive layer 18a and the second adhesive layer 18b are collectively referred to as simply adhesive layers 18, and the first protective layer 20a and the second protective layer 20b are collectively referred to as simply protective layers 20.

The transparent substrate 12 is formed of a material having an insulation property and having a high light-permeability, and examples thereof include a resin, glass, and silicon. Examples of the resin include polyethylene terephthalate (PET), polymethyl methacrylate (PMMA), polypropylene (PP), polystyrene (PS), and the like.

The thin metal lines 14 are not particularly limited as long as they are thin lines made of metal having high conductivity, and include thin lines made of a line material such as gold (Au), silver (Ag) or copper (Cu). While it is more preferable indeed in terms of visibility if the thin metal lines 14 have a smaller line width, the line width has only to be equal to or less than 30 μm, for instance. For application to a touch panel, the line width of the thin metal lines 14 is preferably equal to or greater than 0.1 μm and equal to or less than 15 more preferably equal to or greater than 1 μm and equal to or less than 9 μm, and still more preferably equal to or greater than 2 μm and equal to or less than 7 μm.

Each wiring portion 16 (16a, 16b) has a plurality of thin metal lines 14 having the wiring pattern 24 (24a, 24b) which is formed of mesh wires 21 (21a, 21b) arranged in a mesh shape. Specifically, as shown in FIGS. 4A and 4B, the wiring pattern 24 (24a, 24b) is a mesh pattern in which opening portions (cells) 22 (22a, 22b) are arranged in a predetermined shape formed by intersecting the plurality of thin metal lines 14 with each other.

As shown in FIGS. 4A and 4B, FIGS. 7A, 7C, and 7E, and FIGS. 7B, 7D, and 7F, each wiring portion 16 (16a, 16b) is composed of a wiring layer 28 (28a, 28b) that has the wiring pattern 24 (24a, 24b) formed in a mesh shape by the thin metal lines 14 and the opening portions (cells) 22 (22a, 22b) between the thin metal lines 14 adjacent to each other. In the example shown in FIGS. 4A and 4B, the wiring patterns 24a and 24b are shown as a wiring pattern 27 in FIG. 4A. As shown in FIG. 4B, when the projected onto a plane perpendicular to a predetermined point of view (a: refer to FIG. 5B), the wiring pattern 27 shown in FIG. 4A becomes a pattern 23 which is regular, and the projected wiring pattern 23 has rhomboid opening portions 22.

As described above, the first protective layer 20a is bonded to the substantially entire surface of the wiring layer 28a formed of the first wiring portion 16a through the first adhesive layer 18a so as to cover the thin metal lines 14 of the first wiring portion 16a. Further, the second protective layer 20b is bonded to the substantially entire surface of the wiring layer 28b formed of the second wiring portion 16b through the second adhesive layer 18b so as to cover the thin metal lines 14 of the second wiring portion 16b.

Here, examples of materials of the adhesive layers 18 (the first adhesive layer 18a and the second adhesive layer 18b) include a wet lamination adhesive, a dry lamination adhesive, a hot melt adhesive, and the like. The material of the first adhesive layer 18a and the material of the second adhesive layer 18b may be the same or may be different.

The protective layers 20 (the first protective layer 20a and the second protective layer 20b) each are made of a high transmissive material including resin, glass, and silicon, similarly to the transparent substrate 12. The material of the first protective layer 20a and the material of the second protective layer 20b may be the same or may be different.

It is preferable that both a refractive index n1 of the first protective layer 20a and a refractive index n2 of the second protective layer 20b are values equal or approximate to a refractive index n0 of the transparent substrate 12. In this case, both the relative refractive index nr1 of the transparent substrate 12 with respect to the first protective layer 20a and the relative refractive index nr2 of the transparent substrate 12 with respect to the second protective layer 20b are values approximate to 1.

In this specification, the refractive index means a refractive index for the light at a wavelength of 589.3 nm (sodium D ray). For example, in regard to resins, the refractive index is defined by ISO 14782: 1999 (corresponding to JIS K 7105) that is an international standard. Further, the relative refractive index nr1 of the transparent substrate 12 with respect to the first protective layer 20a is defined as nr1=(n1/n0), and the relative refractive index nr2 of the transparent substrate 12 with respect to the second protective layer 20b is defined as nr2=(n2/n0).

Here, the relative refractive index nr1 and the relative refractive index nr2 are preferably in a range equal to or greater than 0.86 and equal to or less than 1.15, and more preferably in a range equal to or greater than 0.91 and equal to or less than 1.08.

By limiting the ranges of the relative refractive index nr1 and the relative refractive index nr2 as the above-mentioned range and controlling a member-to-member light transmittance between the transparent substrate 12 and the protective layers 20 (20a, 20b), visibility of moiré/noise can be further improved, and thus the conductive film can be improved.

Here, as shown in FIGS. 1 and 5A, the conductive film 10 is used in a state where the film is provided in a predetermined three-dimensional convex shape on the display unit 30 of the display device 40. As shown in FIG. 5A, in a state where the conductive film 10 is provided in a predetermined three-dimensional shape on the display unit 30, the conductive film 10 has a wiring pattern 27(24) which has three-dimensionally shape shown in FIG. 4A in plan view. However, as shown in FIG. 5A, if the display device 40 in a state where the conductive film 10 is provided in a predetermined three-dimensional shape on the display unit 30 is projected onto a plane perpendicular to one point of view indicated by the arrow a, as shown in FIG. 5B, the display device 40 becomes a projected display device 40a in a state where the conductive film 10 is provided as a projected conductive film 10a on the display unit 30 in a planar shape. As a result, the three-dimensionally shaped wiring pattern 27 shown in FIG. 4A in plan view can be viewed as the projected planar wiring pattern 23 as shown in FIG. 4B, in the projected planar conductive film 10a.

In the display device 40, the display unit 30 has a planar shape. Therefore, the projection from the planar display unit 30 of the display device 40 to the planar display unit 30 of the projected display device 40a is an identical projection (mapping), and does not change. Therefore, the BM pattern 38 of the display unit 30 before projection shown in FIG. 6A is the same as the BM pattern 38 of the display unit 30 after projection shown in FIG. 6B, which has not changed. It should be noted that the BM pattern 38 is a pattern in which sub-pixels, for example, G sub-pixels 32g shown in FIG. 6C are arranged. The G sub-pixels 32g of the four pixels 32 shown in FIG. 6C are sub-pixels of four pixels in the central portion of the BM pattern 38 of the planar display unit 30 shown in FIG. 6A, and can be used as a unit of a pixel array of the BM pattern 38. Here, only the G sub-pixels 32g are shown, but it is apparent that R sub-pixels and B sub-pixels, which are not shown, are also arranged.

Here, in the present invention, the combined wiring pattern of the projected regular planar wiring pattern 23 of one or both of the wiring portions 16a and 16b of the projected planar conductive film 10a of the projected planar display device 40a can be defined as a combined wiring pattern which is excellent in terms of suppressing occurrence of moiré, that is, a combined wiring pattern which allows the indicator of evaluation of moiré to be equal to or less than a predetermined threshold value at which moiré is not visually perceived, relative to a pattern (BM pattern 38) of the black matrices (BM) 34 of the display unit 30. As will be described later in detail, in the projected typical wiring pattern having a planar shape, the combined wiring pattern can be defined as a wiring pattern which allows the indicator to be within a predetermined range of −3.17 or less. Consequently, the planar projective conductive film 10a of the projected planar display device 40a can be defined as a planar conductive film that has the projected wiring pattern 23 which is a combined wiring pattern optimized in terms of visibility of moiré with respect to the BM pattern 38 when superposed on the BM pattern 38 having the planar shape.

As can be seen from FIGS. 4A and 4B, it is apparent that, when viewed from one point of view a, the three-dimensionally shaped wiring pattern 24 shown in FIG. 4A is irregular as compared with the projected wiring pattern 23 which has planar regular rhomboid shapes shown in FIG. 4B. As a result, it is apparent that, if the projected typical wiring pattern 23 having a planar shape shown in FIG. 4B is optimized in terms of visibility of moiré when formed as the combined wiring pattern, the three-dimensionally shaped wiring pattern 24 shown in FIG. 4A becomes further suitable in terms of visibility of moiré when formed as the combined wiring pattern.

Consequently, the conductive film 10 in the display device 40 is a three-dimensionally shaped conductive film that has a three-dimensionally shaped wiring pattern 24 formed as the combined wiring pattern which is optimized in terms of visibility of moiré with respect to the BM pattern 38 even in state where the conductive film 10 is three-dimensionally superposed on the BM pattern 38.

As described above, when the three-dimensionally shaped conductive film of the present invention is projected to have a planar shape, the combined wiring pattern, which includes the projected typical wiring pattern having a planar shape projected from the three-dimensionally shaped wiring pattern, is optimized in terms of visibility of moiré with respect to the BM pattern of the display unit. Therefore, it can be said that, even in the display device in which the three-dimensionally shaped conductive film is provided on the display unit 30, the conductive film is excellent in that moiré is not visually perceived, that is, excellent in terms of visibility of moiré.

It should be noted that the conductive film 10 may be any of the following conductive films: a conductive film that is molded in a three-dimensional shape so as to have the wiring pattern 24 which is provided on the display unit 30 and finished to have a three-dimensional shape in advance, with respect to one point of view indicated by the arrow a in FIG. 5B; and a conductive film that has flexibility capable of causing three-dimensional deformation such that the wiring pattern 24 is formed in a planar shape so as to have the projected planar wiring pattern 23 which is projected onto the plane perpendicular to the point of view a before use and is formed with respect to one point of view indicated by the arrow a in FIG. 5B in order to be provided on the display unit 30 in use. In addition, it is preferable that, in a case where the planar conductive film 10 as the projected conductive film 10a is provided in a three-dimensional shape in use, the transparent substrate 12 of the conductive film 10 is made of a flexible material, for example, a resin material. On the other hand, in a case where the conductive film 10 is molded in a three-dimensional shape in advance, the material thereof may be a resin material, and may be a material such as glass or silicon.

In the conductive film of the present invention, an indicator of evaluation of moiré caused by interference between the BM pattern 38 and the combined wiring pattern at one point of view a is within a range of a predetermined threshold value or less in which moiré is not visually perceived. The combined wiring pattern includes the projected planar wiring pattern 23 which is obtained by projecting the three-dimensionally shaped wiring pattern 24 of the three-dimensionally shaped conductive film 10 onto the plane perpendicular to one point of view a. However, an indicator of evaluation of moiré, a predetermined threshold value and a range of a predetermined threshold value or less, at which and in which moiré is not visually perceived, and optimization of the visibility of moiré will be described later.

Here, as shown in FIG. 5A, the conductive film 10 is formed to have a three-dimensional shape that has curved portions 13a, which are respectively curved with predetermined curvatures, and a planar portion 13b, which is parallel to a display surface of the display unit 30 between the curved portions 13a on both side thereof, at both corresponding edge portions of the display surface of the display unit 30. However, the three-dimensional shape of the conductive film 10 is not limited to this, and may have any three-dimensional shape if the shape corresponds to a shape of the display surface of the display unit 30. It should be noted that, in the example shown in FIG. 3, the three-dimensional shape is not shown in a direction perpendicular to the paper surface, but the curved portions 13a may be provided at both corresponding edge portions in the direction perpendicular to the paper surface, and on the contrary, may have the same cross-section shape in the direction perpendicular to the paper surface. In this case, it is preferable that the display surface of the display unit 30 is rectangular. However, the shape is not particularly limited, and may be an elliptical shape or a circular shape, and may be a shape other than those.

Here, as shown in FIGS. 5A and 5B, one point of view, from which the display surface of the display unit 30 having the three-dimensionally shaped conductive film 10 provided thereon is observed, is described as the point of view a. The point of view a is indicated by the arrow a for observing the display surface from the display surface of the display unit 30 or the planar portion 13b of the conductive film 10 parallel to the display surface, preferably from a point on the straight line which extends toward the outside in a direction perpendicular to the display surface or the planar portion 13b, that is, from the front. However, the present invention is not limited to this, and the observation may be performed from a point of view different from the point of view a. For example, the point of view may be a point of view from which the curved portions 13a of the conductive film 10 having the same three-dimensional shape are observed as the front.

In the present invention, the three-dimensionally shaped wiring pattern 24, which is formed in a mesh shape including the opening portions 22 between adjacent thin metal lines 14, is, for example, a three-dimensionally shaped wiring pattern 27 shown in FIG. 4A in plan view. However, the pattern is projected onto the plane perpendicular to the point of view a, and becomes the projected planar wiring pattern 23 as shown in FIG. 4B. The indicator of evaluation of moiré, which is caused by interference between the BM pattern 38 and the combined wiring pattern including the projected planar wiring pattern 23, is within the range of a predetermined threshold value or less in which moiré is not visually perceived or is unlikely to be visually perceived. Therefore, also in the case of the three-dimensionally shaped wiring pattern 24, moiré is not visually perceived or is unlikely to be visually perceived due to the interference between the wiring pattern 24 and the BM pattern 38.

Consequently, in the following description of the wiring pattern of the conductive film and the BM pattern of the display unit, in a case where a three-dimensional shape structure and the like are described, the conductive film and the wiring pattern are described on the basis of three-dimensional shapes. However, in a case where the indicator of evaluation of moiré and the like are described, the conductive film are described as the projected planar conductive film, and the wiring pattern are described as the projected planar wiring pattern.

Specifically, the wiring portion 16 of the projected conductive film 10a has the projected planar wiring pattern 23 (refer to FIG. 4B) in which the plurality of thin metal lines 14 are arranged in a mesh shape. In the projected wiring pattern 23, the mesh shape of each opening portion 22 is a rhomboid. However, the present invention is not limited to this. If the projected wiring pattern 23 of which the visibility of moiré is optimized with respect to the predetermined BM pattern 38 to be described later can be configured, the shape may be anything if it is a polygonal shape having at least three sides, may be the same mesh shape, and may be a different mesh shape. Examples of the shape include the same polygons or different polygons including triangles such as an equilateral triangle and an isosceles triangle, quadrilaterals such as a square, a parallelogram, and a rectangle, pentagons, hexagons (including a regular hexagon), and the like. That is, the projected wiring pattern, of which visibility of moiré is optimized with respect to the predetermined BM pattern 38, may be a projected wiring pattern, which is formed by regular arrangement of the opening portions 22, and may be a projected wiring pattern which is randomized by arrangement of the opening portions 22 having different shapes.

Further, disconnection (break) may be inserted into the projected wiring, pattern 23 (wiring pattern 24) as described later.

As the shape of the mesh-shaped wiring pattern having such breaks, it is possible to employ a shape of a mesh-shaped wiring pattern of a conductive film described in JP2012-276175 relating to the present application of the applicant.

In the above-mentioned example, the projected wiring pattern 23 is a typical wiring pattern having regular rhomboid shapes. However, the present invention is not limited to this. The pattern may be a pattern that is formed by making the projected regular typical wiring pattern 23 irregular (random). For example, the pattern may be a pattern that is formed with a degree of irregularity for making a pitch or an angle of the rhomboid shape of each opening portion 22 equal to or less than a predetermined threshold value. In addition, the pattern may be a pattern that is formed such that sides of the rhomboid shape of the opening portion 22 are made to be irregular by making the sides as wavy lines within a predetermined amplitude threshold value.

In such an example, in order to improve visibility of moiré (to the extent that moiré is not visually perceived), the indicator of evaluation of moiré of the combined wiring pattern including the projected regular typical wiring pattern 23 is set to be equal to or less than a predetermined threshold value at which moiré is not visually perceived or unlikely to be visually perceived (hereinafter it may be typically said that the moiré is not visually perceived). Although details will be described later, in the case of making irregularity, it is effective for improving visibility, and therefore the indicator is set within a range of −2.80 or less. However, the present invention is not limited to this. In order to improve the visibility of noise (to the extent that noise is not visually perceived), the indicator of evaluation of noise of the combined wiring pattern, which includes the random projected wiring pattern that is formed of Voronoi polygons, Delaunay triangles, or the like, is set to be equal to or less than a predetermined threshold value at which noise is not visually perceived. Although details will be described later, even in this case, there is randomicity, and therefore the indicator may be set within a range of −2.80 or less.

Figure 7B:
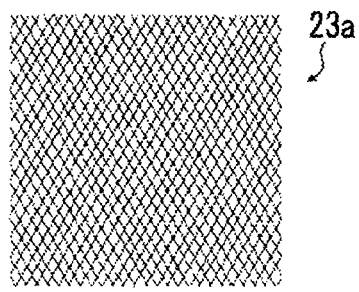
Figure 7C:
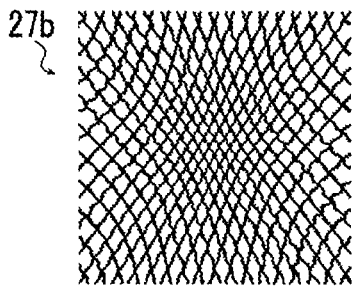

The three-dimensionally shaped wiring pattern 27a shown in FIG. 7A becomes a planar wiring pattern 23a shown in FIG. 7B when projected onto the plane perpendicular to the point of view a. The planar wiring pattern 23a is a pattern which is formed by making shapes of the opening portions (cells) 22 of the projected regular typical wiring pattern 23 shown in FIG. 4B, that is, a mesh shape irregular in a range of a predetermined threshold value, for example, 10% or less, specifically, a range greater than 0% and equal to or less than 10%, with respect to, for example, the pitches of the rhomboid shapes. Here, making irregularity is not limited to the pitches of the cells 22, and may be applied to angles of the cells 22.

Figure 7D:
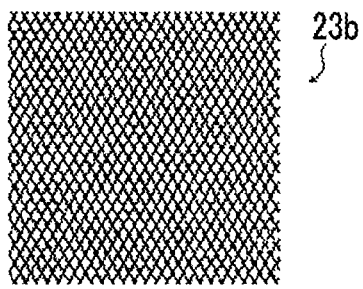
Figure 7E:
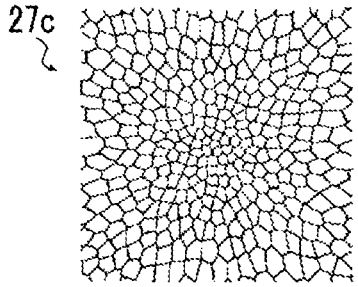

The three-dimensionally shaped wiring pattern 27b shown in FIG. 7C becomes a planar wiring pattern 23b shown in FIG. 7D when projected onto the plane perpendicular to the point of view a. The planar wiring pattern 23b is formed by changing the thin metal lines 14 into wavy lines each having a predetermined amplitude threshold value, for example specifically, an amplitude in a range of 2.0% or more and 20% or less of the pitch of the cell. The thin metal lines 14 constitute sides of the cells 22 of the projected regular typical wiring pattern 23 shown in FIG. 4B, that is, constitute a mesh.

Figure 7F:
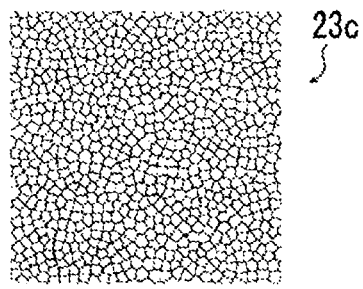

Further, the three-dimensionally shaped wiring pattern 27c shown in FIG. 7E becomes a planar wiring pattern 23c shown in FIG. 7F when projected onto the plane perpendicular to the point of view a. The planar wiring pattern 23c has a wiring pattern that has the cells 22 formed of Voronoi polygons depending on a Voronoi diagram (Voronoi division method) on the basis of a plurality of seed points, which are generated at a plurality of positions at arbitrary intervals in a single planar region, and is superposed on the BM pattern 38. In this case, the indicator of evaluation of noise is within a range of a predetermined threshold value or less.

In the above-mentioned example, the display unit 30 of the display device 40 has a planar shape. However, it is needless to say that the present invention is not limited to this, and the display unit may be a three-dimensionally shaped display unit, and particularly, may be a display unit of which the display surface has a three-dimensional shape.

FIG. 8A is a schematic cross-sectional view illustrating a display device, which has a display unit and a conductive film having three-dimensional convex shapes, according to another embodiment of the present invention. FIG. 8B is a schematic cross-sectional view illustrating a projected display device which is obtained by projecting the display device shown in FIG. 8A onto a plane perpendicular to a predetermined point of view and which has a projected display unit and a projected conductive film both having planar shapes.

In a display device 40b shown in FIG. 8A, the conductive film 10 and a display unit 30a both have three-dimensional convex shapes. The three-dimensionally shaped conductive film 10 having the same predetermined convex shape is provided on the three-dimensionally shaped display unit 30a of which the display surface has a predetermined convex shape. Accordingly, the display device 40b is different from the display device 40 shown in FIG. 5A in that the display unit 30a has a three-dimensional shape. However, the shape of the conductive film 10, which is provided on the display unit 30a, is the same in that the film has a three-dimensional shape the same as that of FIG. 5A.

However, the display device 40b becomes a projected display device 40c, which has a projected display unit 30b and a projected conductive film 10a both having planar shapes, in a state where the display device 40b is projected onto the plane perpendicular to the point of view a.

Accordingly, in a three-dimensional shape state shown in FIG. 8A, the conductive film 10 may have three-dimensionally shaped wiring patterns 27, 27a, 27b, and 27c shown in FIGS. 4A, 7A, 7C, and 7E in plan view. Further, as shown in FIG. 8B, in a state where the conductive film 10 is projected onto the plane perpendicular to the point of view a, the projected conductive film 10a has a planar shape as shown in FIG. 5B, and may have projected planar wiring patterns 23, 23a, 23b, and 23c shown in FIGS. 4B, 7B, 7D, and 7F.

On the other hand, the three-dimensionally shaped display unit 30a of the display device 40b shown in FIG. 8A becomes a projected planar display unit 30b as shown in FIG. 8B, in a state where the display unit 30a is projected onto the plane perpendicular to the point of view a. Hence, a three-dimensionally shaped BM pattern 38a of the display unit 30a, which is not projected as shown in FIG. 9A, is changed into a projected planar BM pattern 38b of the projected display unit 30b, which is obtained after projection shown in FIG. 9B, through projection onto the plane. It should be noted that G sub-pixels 32g of four pixels 32 shown in FIG. 9C are sub-pixels of four pixels of a planar portion or a substantially planar portion at the center of the three-dimensional convex BM pattern 38a of the three-dimensional convex BM pattern 38a of the three-dimensional convex display unit 30a shown in FIG. 9A, and are a unit of pixel array of the BM pattern 38a and the projected planar BM pattern 38b.

As a result, in the present invention, in order to evaluate visibilities of moiré and noise of the three-dimensionally shaped wiring pattern 24 (27, 27a, 27b, and 27c) shown in FIGS. 4A, 7A, 7C, and 7E and the three-dimensionally shaped BM pattern 38a shown in FIG. 9A, the indicator of evaluation of moiré or noise, which is obtained when the projected planar wiring pattern 23 or 23c shown in FIG. 4B or 7F overlaps with the projected planar BM pattern 38b shown in FIG. 9B, is calculated. Then, a conductive film, which has the three-dimensionally shaped wiring pattern 24 having an evaluation threshold value or less, can be evaluated as the conductive film of the present invention.

Figure 10B:
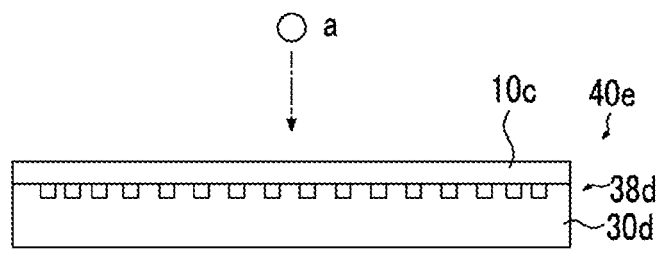
FIGS. 10A and 10B are respectively schematic cross-sectional views illustrating a display device, which has a display unit and a conductive film both having three-dimensional shapes, according to another embodiment of the present invention, and a projected display device which is obtained by projecting the display device onto a plane perpendicular to a predetermined point of view and which has a projected display unit and a projected conductive film both having planar shapes.
Figure 10A:
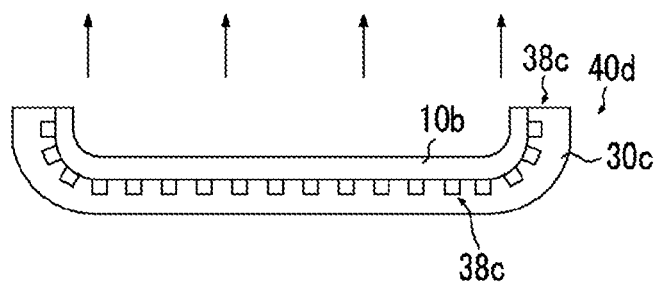

FIG. 10A is a schematic cross-sectional view illustrating a display device, which has a display unit and a conductive film having three-dimensional shapes, according to another embodiment of the present invention. FIG. 10B is a schematic cross-sectional view illustrating a projected display device which is obtained by projecting the display device shown in FIG. 10A onto a plane perpendicular to a predetermined point of view and which has a projected display unit and a projected conductive film both having planar shapes.

A display device 40d shown in FIG. 10A is different from the display device 40b shown in FIG. 8A in that the display device 40b has a convex shape but the display device 40d has a concave shape. However, a conductive film 10b and a display unit 30c both have three-dimensional concave shapes. On the three-dimensionally shaped display unit 30c of which the display surface have a predetermined concave shape, the three-dimensionally shaped conductive film 10b having the same predetermined concave shape is provided.

Therefore, the display device 40d becomes a projected display device 40e, which has a projected display unit 30d and a projected conductive film 10c both having planar shapes, in a state where the display device 40d is projected onto the plane perpendicular to the point of view a.

Figure 11A:
FIGS. 11A and 11B are respectively plan views schematically illustrating other examples of the pixel array pattern of the planar display unit shown in FIG. 10A and the projected pixel array pattern of the projected planar display unit shown in FIG. 10B.

At this time, the three-dimensionally shaped display unit 30c of the display device 40d shown in FIG. 10A becomes a projected planar display unit 30d as shown in FIG. 10B, in a state where the display unit 30c is projected onto the plane perpendicular to the point of view a. Hence, a three-dimensionally shaped BM pattern 38c of the display unit 30c, which is not projected as shown in FIG. 11A, is changed into a projected planar BM pattern 38d of the projected display unit 30d, which is obtained after projection shown in FIG. 11B, through projection onto the plane. It should be noted that G sub-pixels 32g of four pixels 32 shown in FIG. 11C are sub-pixels of four pixels of a planar portion or a substantially planar portion at the center of the three-dimensional convex BM pattern 38c of the three-dimensional concave BM pattern 38c of the three-dimensional concave display unit 30c shown in FIG. 11A, and are a unit of pixel array of the BM pattern 38c and the projected planar BM pattern 38d.

Figure 11B:
Figure 11C:
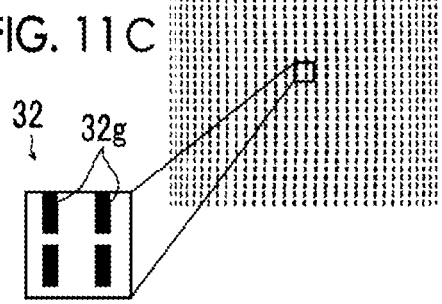
FIG. 11C is a partially enlarged view of the pixel array pattern shown in FIG. 11A, and shows only one sub-pixel.

As a result, in the present invention, although not shown in the drawing, in order to evaluate visibilities of moiré and noise of the three-dimensionally shaped wiring pattern of the conductive film 10b and the three-dimensionally shaped BM pattern 38c shown in FIG. 11A, the indicator of evaluation of moiré or noise, which is obtained when the projected planar wiring pattern 23 or 23c shown in FIG. 4B or 7F overlaps with the projected planar BM pattern 38d shown in FIG. 11B, is calculated. Then, a conductive film, which has the three-dimensionally shaped wiring pattern 24 having an evaluation threshold value or less, can be evaluated as the conductive film of the present invention.

In the conductive film 10 of the embodiment shown in FIG. 3, the wiring portions 16 (16a and 16b) on both the upper and lower sides of the transparent substrate 12 each are formed as an electrode portion having the plurality of thin metal lines 14. However, the present invention is not limited to this, and at least one of the first or second wiring portion 16a or 16b may be formed of an electrode portion and a non-electrode portion (dummy electrode portion).

Figure 12:
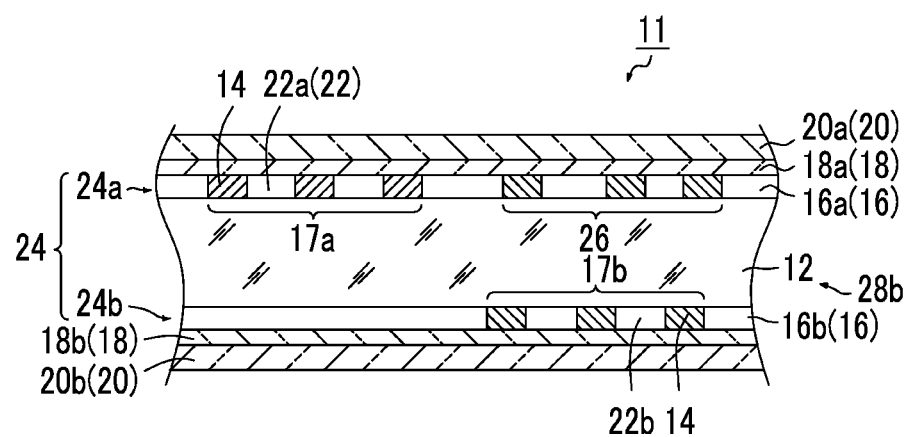
FIG. 12 is a schematic partial cross-sectional view of an example of a conductive film according to a second embodiment of the present invention.

FIG. 12 is a schematic partial cross-sectional view of an example of a conductive film according to a second embodiment of the present invention. It should be noted that the three-dimensionally shaped wiring pattern of the conductive film according to the second embodiment is the same as the three-dimensionally shaped wiring pattern of the conductive film of the first embodiment mentioned above, and accordingly, will be omitted herein.

As shown in the drawing, the conductive film 11 according to the second embodiment has: the first wiring portion 16a that is formed of a first electrode portion 17a and the dummy electrode portion 26 which are formed on one surface (on the upper side in FIG. 12) of the transparent substrate 12; the second wiring portion 16b that is formed of the second electrode portion 17b which is formed on the other surface (on the lower side in FIG. 12) of the transparent substrate 12; the first protective layer 20a that is bonded to the substantially entire surface of the first wiring portion 16a, which is formed of the first electrode portion 17a and the dummy electrode portion 26, through the first adhesive layer 18a; and the second protective layer 20b that is boned to the substantially entire surface of the second wiring portion 16b, which is formed of the second electrode portion 17b, through the second adhesive layer 18b.

In the conductive film 11, the first electrode portion 17a and the dummy electrode portion 26 each are formed of the plurality of thin metal lines 14 and both thereof are formed as the wiring layer 28a on one surface (on the upper side in FIG. 12) of the transparent substrate 12, and the second electrode portion 17b is forming of the plurality of thin metal lines 14 and is formed as the wiring layer 28b on the other surface (on the lower side in FIG. 12) of the transparent substrate 12. Here, the dummy electrode portion 26 is formed on one surface (on the upper side in FIG. 12) of the transparent substrate 12 similarly to the first electrode portion 17a, and has the plurality of thin metal lines 14 similarly arranged at positions corresponding to the plurality of thin metal lines 14 of the second electrode portion 17b formed on the other surface (on the lower side in FIG. 12), as shown in the drawing.

The dummy electrode portion 26 is separated from the first electrode portion 17a by a predetermined distance, and is in the state of being electrically insulated from the first electrode portion 17a.

In the conductive film 11 according to the present embodiment, the dummy electrode portion 26 formed of the plurality of thin metal lines 14 corresponding to the plurality of thin metal lines 14 of the second electrode portion 17b formed on the other surface (on the lower side in FIG. 12) of the transparent substrate 12 is formed on one surface (on the upper side in FIG. 12) of the transparent substrate 12. Therefore, scattering due to the thin metal lines on the one surface (on the upper side in FIG. 12) of the transparent substrate 12 can be controlled, and it is thus possible to improve visibility of electrode.

Here, the first electrode portion 17a and the dummy electrode portion 26 of the wiring layer 28a have the wiring pattern 24a having a mesh shape which is formed by the thin metal lines 14 and opening portions 22. The second electrode portion 17b of the wiring layer 28b has a wiring pattern 24b having a mesh shape which is formed by the thin metal lines 14 and opening portions 22, similarly to the first electrode portion 17a. As described above, the transparent substrate 12 is formed of an insulating material, and the second electrode portion 17b is in the state of being electrically insulated from the first electrode portion 17a and the dummy electrode portion 26.

In addition, the first and second electrode portions 17a and 17b and the dummy electrode portion 26 each can be formed of the same material as the wiring portions 16 of the conductive film 10 shown in FIG. 3 in the same manner.

The first protective layer 20a is bonded to the substantially entire surface of the wiring layer 28a formed of the first electrode portion 17a and the dummy electrode portion 26 through the first adhesive layer 18a so as to cover the thin metal lines 14 of the first electrode portion 17a and the dummy electrode portion 26 of the first wiring portion 16a.

Further, the second protective layer 20b is bonded to the substantially entire surface of the wiring layer 28b formed of the second electrode portion 17b through the second adhesive layer 18b so as to cover the thin metal lines 14 of the second electrode portion 17b of the second wiring portion 16b.

It should be noted that the first and second adhesive layers 18a and 18b and the first and second protective layers 20a and 20b of the conductive film 11 shown in FIG. 12 are those of the conductive film 10 shown in FIG. 3, and a description thereof will be omitted.

In the conductive film 11 of the present embodiment, the second wiring portion 16b having the second electrode portion 17b does not have the dummy electrode portion. However, the present invention is not limited to this, and in the second wiring portion 16b, the dummy electrode portion, which is electrically insulated from the second electrode portion 17b at a predetermined interval away from the first electrode portion 17a and is formed of the thin metal lines 14, may be disposed at a position corresponding to the first electrode portion 17a of the first wiring portion 16a.

In the conductive film 11 of the present embodiment, the dummy electrode portion 26 is provided on the first wiring portion 16a, and such a dummy electrode portion is provided on the second wiring portion 16b. Thereby, the dummy electrode portions may be disposed to correspond to respective mesh wires of the first electrode portion 17a of the first wiring portion 16a and the second electrode portion 17b of the second wiring portion 16b. Therefore, scattering due to the thin metal lines on the one surface (on the upper or lower side in FIG. 12) of the transparent substrate 12 can be controlled, and it is thus possible to improve visibility of electrode.

In the conductive films 10 and 11 of the first and second embodiments shown in FIGS. 3 and 12, the wiring portions 16 (16a and 16b) are respectively formed on both upper and lower sides of the transparent substrate 12. However, the present invention is not limited to this, and in a manner similar to that of a conductive film 11A of a third embodiment of the present invention shown in FIG. 13, the following structure may be adopted: the wiring portion 16 formed of the plurality of thin metal lines 14 may be formed on one surface (the upper surface in FIG. 13) of the transparent substrate 12, and two conductive film elements, in which the protective layers 20 are bonded to substantially the entire surfaces of the wiring portions 16 through the adhesive layers 18 so as to cover the thin metal lines 14, overlap with each other.

Figure 13:
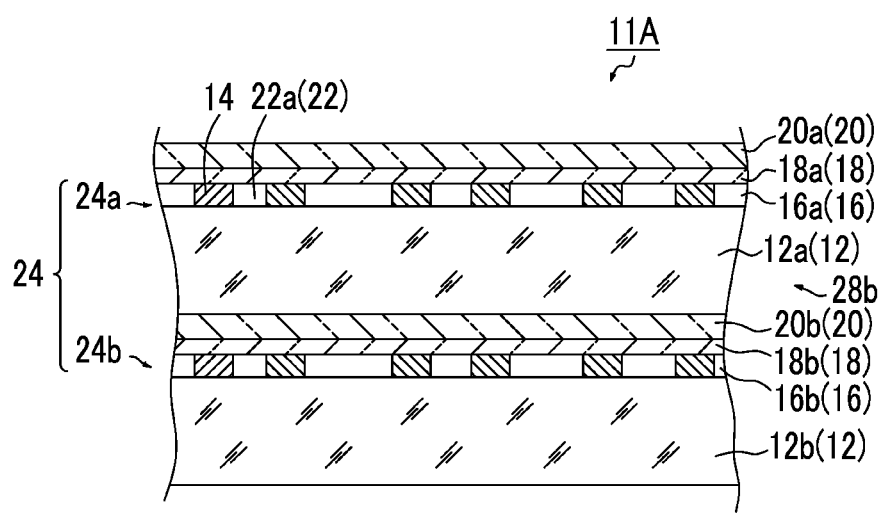
FIG. 13 is a schematic partial cross-sectional view of an example of a conductive film according to a third embodiment of the present invention.

The conductive film 11A of the third embodiment of the present invention shown in FIG. 13 has: a lower transparent substrate 12b in FIG. 13; the second wiring portion 16b that is formed of the plurality of thin metal lines 14 formed on the upper surface of the transparent substrate 12b; the second protective layer 20b that is bonded onto the second wiring portion 16b through the second adhesive layer 18b; an upper transparent substrate 12a that is bonded onto and disposed on the second protective layer 20b through for example an adhesive or the like; the first wiring portion 16a that is formed of the plurality of thin metal lines 14 formed on the upper surface of the transparent substrate 12a; and the protective layer 20a that is bonded onto the first wiring portion 16a through the adhesive layer 18a.

Next, in the conductive films 10, 11, and 11A of the first, second, and third embodiments shown in FIGS. 3, 12, and 13, the wiring pattern 24 (24a and 24b), which is formed of a plurality of thin metal lines 14 constituting the wiring portions 16 (16a and 16b), has a three-dimensional shape. However, for optimization of the wiring pattern 24 based on evaluation of visibilities of moiré and noise caused by interference between the wiring pattern 24 and the BM pattern 38, a projected planar wiring pattern which is projected onto a plane, such as the projected wiring pattern 23, 23a, 23b, or 23c, is used. Therefore, in the following description, it is assumed that the wiring pattern 24 (24a and 24b) is a projected planar wiring pattern which is projected onto a plane, as a planar wiring pattern such as the projected wiring pattern 23, 23a, 23b, or 23c.

Figure 14:
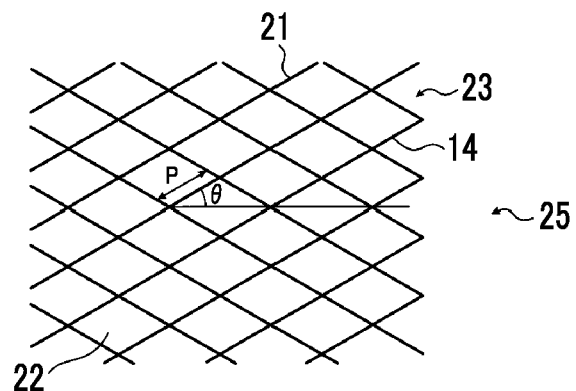
FIG. 14 is a plan view schematically illustrating a typical wiring pattern which has regularly arranged rhomboids in the wiring portion of the conductive film shown in FIG. 3.

In an embodiment of the present invention, it is preferable that, as shown in FIG. 14, one or both wiring patterns 24 of the wiring patterns 24a and 24b each are a regular rhomboid wiring pattern in which the plurality of opening portions 22 having the same rhomboid shapes is regularly repeated, that is, a so-called typical wiring pattern 25. It should be noted that the typical wiring pattern 25 is a partially enlarged view of the projected wiring pattern 23 shown in FIG. 4B.

Figure 15:
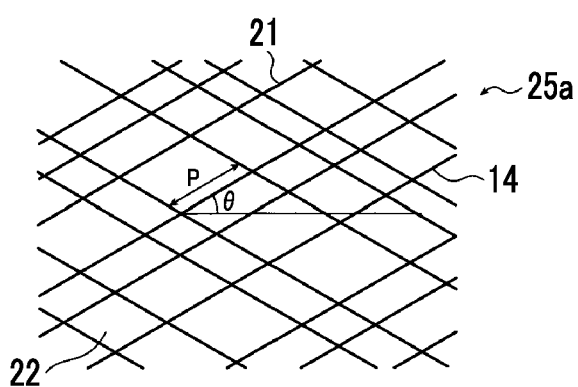
FIG. 15 is a plan view schematically illustrating an example of a wiring pattern that is obtained by making the typical wiring pattern, which is shown in FIG. 14, irregular.

Further, as shown in FIG. 15, in another embodiment of the present invention, one or both wiring patterns 24 may be an irregular wiring pattern, that is, a so-called random pattern 25a (refer to FIG. 7B) that is made to be irregular by consecutively connecting the plurality of opening portions 22, which has parallelogram shapes having mutually different pitches (that is, sizes) with a predetermined angle maintained in plan view, in two directions forming the predetermined angle. It should be noted that the random pattern 25a is a partially enlarged view of the projected wiring pattern 23a shown in FIG. 7B.

Here, the random pattern 25a shown in FIG. 15 is made to be irregular (random) in a predetermined range with the angles maintained with respect to the pitches of the rhomboid shapes of the opening portions 22 of the typical wiring pattern 25 shown in FIG. 14.

Here, in the random pattern 25a, the predetermined range of the irregularity applied to the rhomboid shapes of the opening portions 22 of the typical wiring pattern 25 with angles maintained is preferably greater than 0% and equal to or less than 10%, more preferably in a range of 2% to 10%, and yet more preferably in a range 2% to 8%.

Further, in the random pattern 25a, the irregularity applied to the pitches of the rhomboid shapes of the opening portions 22 of the regular typical wiring pattern 25 are not particularly limited, and may be any form as long as the irregularity satisfies the above-mentioned range. For example, a distribution in the irregularity may be a normal distribution, and may be a uniform distribution.

Figure 16:
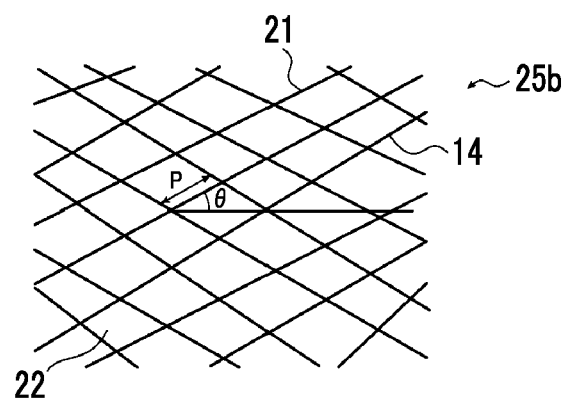
FIG. 16 is a plan view schematically illustrating another example of a wiring pattern that is obtained by making the typical wiring pattern, which is shown in FIG. 14, irregular.

In another embodiment of the present invention, as shown in FIG. 16, one or both wiring patterns 24 each are an irregular wiring pattern, that is, a so-called random pattern 25b in which the opening portions 22, each having a quadrilateral shape deformed from a rhomboid of which one of two sides facing each other in plan view is inclined with respect to the other thereof and the two sides are not parallel to each other, are consecutively connected in predetermined two directions. Consequently, the wiring pattern 24 may be a random pattern in which the angles of the plurality of opening portions 22 having quadrilateral shapes adjacent to each other are changed and not maintained, and as a result, may be a random pattern 25b in which pitches or lengths of the sides are changed and not maintained in accordance with the change of the angles.

It should be noted that, as shown in FIG. 16, the wiring pattern 24 is a wiring pattern which is made to be irregular so as to have quadrangles in which the angles of the mesh shape of the plurality of opening portions 22 adjacent to each other are different and thus pitches or lengths of the sides are different, that is, the so-called random pattern 25b.

Here, the random pattern 25b shown in FIG. 16 is made to be irregular (random) in a predetermined range with respect to the angles of the rhomboid shapes of the opening portions 22 of the typical wiring pattern 25 shown in FIG. 14.

Here, in the random pattern 25b, the predetermined range of the irregularity applied to the angles of the rhomboid shapes of the opening portions 22 of the typical wiring pattern 25 is preferably greater than 0% and equal to or less than 3%, more preferably in a range of 0.2% to 3%, and yet more preferably in a range 0.5% to 3%.

Further, in the random pattern 25b, the irregularity applied to the angles of the rhomboid shapes of the opening portions 22 of the regular typical wiring pattern 25 are not particularly limited, and may be any form as long as the irregularity satisfies the above-mentioned range. For example, a distribution in the irregularity may be a normal distribution, and may be a uniform distribution.

Figure 17:
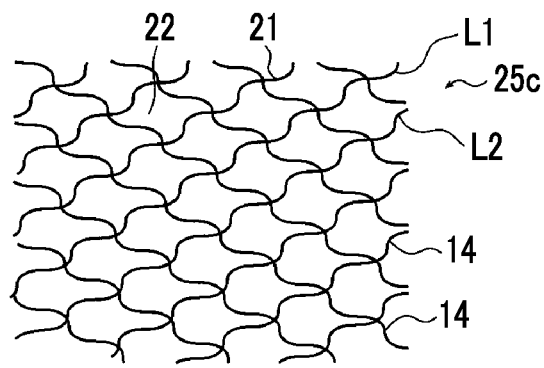
FIG. 17 is a plan view schematically illustrating an example of a wavy wiring pattern which is obtained by making thin metal lines of the wiring portion of the conductive film, which is shown in FIG. 3, as wavy lines.

In another embodiment of the present invention, as shown in FIG. 17, one or both wiring patterns 24 each may be a wiring pattern which is made to be irregular by making as wavy lines the sides which constitute the opening portions 22 each having a polygonal shape as a rhomboid shape in the example shown in the drawing, that is, the plurality of thin metal lines 14, that is, may be a random pattern 25c which is randomized by making the thin metal lines 14 as wavy lines. It should be noted that the random pattern 25c is a partially enlarged view of the projected wiring pattern 23b shown in FIG. 7D.

The random pattern 25c is a wiring pattern in which the center lines of the wavy line of the wavy thin metal lines 14 forms polygonal shapes and the opening portions 22 having rhomboid shapes in the example shown in the drawing are consecutively connected in the predetermined two directions in which the thin metal lines 14 intersect with each other.

The random pattern 25c shown in FIG. 17 is a wiring pattern in which the mesh shape of the plurality of adjacent opening portions 22 is made to be irregular by making the thin metal lines 14 as wavy lines, that is, a so-called random pattern 25c.

The random pattern 25c shown in FIG. 17 is obtained by making the thin metal lines 14, which constitute the typical wiring pattern 25 shown in FIG. 14, as wavy lines so as to make the mesh irregular (random) in a predetermined range.

By making the wiring pattern 24 as the random pattern 25c which is randomized by making the mesh as wavy lines as described above, an intensity of moiré can be attenuated.

Figure 18:
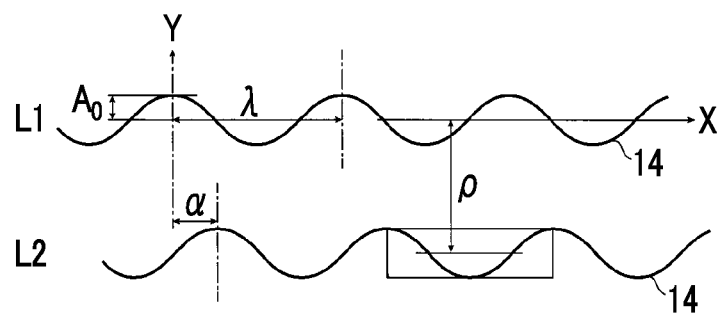
FIG. 18 is an explanatory view for explaining wavy lines of the thin metal lines constituting the wavy wiring pattern of the wiring portion of the conductive film shown in FIG. 3.

Here, in the above-mentioned random pattern 25c, the mesh wires 21 are formed of the wavy thin metal lines 14 shown in FIG. 18. In FIG. 18, for description of the wavy lines, two wavy lines L1 and L2 of the thin metal lines 14, which extend in a single direction, are shown. The wavy lines L1 and L2 shown in FIG. 18 are obtained by changing the straight lines of the thin metal lines 14 of the regular typical wiring pattern 25 shown in FIG. 14 into wavy lines. The wavy lines L1 and L2 of the thin metal lines 14 of the random pattern 25c shown in FIG. 17 are arranged with a phase difference given in the extending direction.

As shown in FIG. 18, the wavy lines L1 and L2 each can be represented by or can be approximated to a trigonometric function, for example, a sine wave. Thus, the following definitions can be given: an amplitude of the sine wave is $A_0$; a wavelength thereof is $\lambda$; and a phase thereof is $\alpha$.

In FIG. 18, for example, if the wavy line L1 is set as a reference and is represented by a sine wave, the wavy line L1 can be represented by $Y=A_0 \sin(2\pi/\lambda)X$. The wavy line L2 can be represented by $Y=A_0 \sin\{(2\pi/\lambda)(x-\alpha)\}$, where $\alpha$ is the phase.

Here, the amplitude $A_0$ corresponds to a coefficient of the sine wave. Further, the wavelength $\lambda$ corresponds to a length of a period. Furthermore, the phase $\alpha$ corresponds to an amount of deviation (shift) between drawing start points of the wavy lines L1 and L2 adjacent to each other.

Randomicity (irregularity) of the wavy line of the thin metal lines 14 shown as described above can be defined by a ratio (percentage %) of the amplitude $A_0$, the wavelength $\lambda$, and the phase $\alpha$ to a pitch P of the regular typical wiring pattern 25 shown in FIG. 14. For example, in a case where a degree of randomicity of 10% of each of the wavelength $\lambda$, the phase (for each line) $\alpha$, and the amplitude (for each wavelength) $A_0$ is given to a diamond mesh pattern of 100 μm, the respective degrees change within ranges of 90 to 110 μm, 90 to 110 μm, and 0 to 10 μm.

In the present invention, the random pattern 25c, which is obtained by making the thin metal lines 14 as wavy lines with respect to the regular typical wiring pattern 25 shown in FIG. 14, in the case of the amplitude $A_0$ of the wavy line, it is preferable that the degree of randomicity satisfies a range within an amplitude threshold value, preferably equal to or less than 20%, and more preferably equal to or greater than 2.0% and equal or less than 20%. It can be said that the conductive film 10 having the random pattern 25c, which satisfies the range of randomicity, is excellent in terms of visibility of moiré since moiré is not visually perceived when the film is superposed on the BM pattern 38 of the display unit 30.

It should be noted that, in the present invention, the degree of randomicity of the wavy lines is not particularly limited as long as the degree of randomicity satisfies the above-mentioned range, and any type thereof may be used.

Although details will be described later, when the conductive film 10 of the present invention is the combined wiring pattern 24 of the upper and lower wiring patterns 24a and 24b in the projected wiring pattern, the conductive film 10 has a typical wiring pattern that has opening portions (cells) 22 having regular polygonal shapes optimized in terms of visibility of moiré at a predetermined luminance (luminance image data) of the BM pattern 38 of the display unit 30. For example, the typical wiring pattern is a typical wiring pattern 25 that has regular rhomboid cells 22. Alternatively, the conductive film has a wiring pattern that has arbitrary polygonal shapes, such as parallelogram shapes, optimized by making the regular polygonal shapes of the cells 22 of the typical wiring pattern, for example, rhomboid shapes irregular (random) even when not optimized in terms of visibility of moiré. Examples of the typical wiring pattern include random patterns 25a, 25b, and 25c. Here, the irregularity (randomicity), for example, may be provided to pitches of the polygonal shapes (for example, rhomboids) of the cells 22 of the typical wiring pattern 25 with angles thereof maintained, may be provided to angles thereof, and may be provided by making the sides (the thin metal lines 14 constituting the sides) of the polygons, for example, rhomboids as wavy lines.

It should be noted that, in the present invention, the wiring pattern, which is formed of opening portions (cells) 22 having polygonal shapes optimized in terms of visibility of moiré with respect to the BM pattern at a predetermined luminance, is defined as a single wiring pattern or a group of two or more typical wiring patterns, in which moiré is not visually perceived in human vision with respect to the BM pattern 38 with a predetermined luminance, when formed as the combined wiring pattern 24, or a random wiring pattern which is made to be irregular (hereinafter simply referred to a random pattern).

First, the typical wiring pattern 25 is a polygonal (for example, rhomboid) wiring pattern which is optimized in terms of visibility of moiré at the predetermined luminance (luminance image data) of the BM pattern 38 of the display unit 30, when formed as the combined wiring pattern 24.

The typical wiring pattern 25 is a wiring pattern which allows an indicator of evaluation of moiré to be equal to or less than a predetermined evaluation threshold value and preferably equal to or less than −3.17 as a common logarithm. The indicator is calculated from synthetic image data of the combined wiring pattern 24 obtained from the transmittance image data and luminance image data of the BM pattern 38 for each color when light beams with the plurality of colors are separately emitted in the display 40. In addition, the combined wiring pattern 24 is a wiring pattern which is obtained by using the typical wiring pattern 25 in one or both of the upper and lower wiring patterns 24*a* and 24*b* and making the patterns overlap with each other.

The typical wiring pattern 25 itself may be a polygonal (for example, rhomboid) wiring pattern which is superposed on a display screen of the display 40 with a predetermined emission intensity, which is able to sufficiently prevent moiré from occurring and to improve visibility, and which is optimized in terms of visibility of moiré with respect to the BM pattern 38 at the predetermined luminance of the display unit 30.

Next, the random patterns 25*a*, 25*b*, and 25*c* each are a polygonal (for example, parallelogram) wiring pattern which is optimized by making the typical wiring pattern irregular even when any of the patterns is not optimized in terms of visibility of moiré.

The random patterns 25*a*, 25*b*, and 25*c* each are a wiring pattern which allows an indicator of evaluation of moiré to be equal to or less than a predetermined evaluation threshold value, preferably equal to or less than −2.80 as a common logarithm, and more preferably equal to or less than −3.17. The indicator is calculated from synthetic image data of the combined wiring pattern 24 obtained from the transmittance image data of the typical wiring pattern which is not randomized (before it randomized) and luminance image data of the BM pattern 38 for each color when light beams with the plurality of colors are separately emitted in the display 40. Consequently, in the random patterns 25*a*, 25*b*, and 25*c*, it is more preferable that the typical wiring pattern, which is not randomized, is the typical wiring pattern 25 which is optimized in terms of visibility of moiré.

In the present invention, due to the randomization of the combined wiring pattern 24, an evaluation threshold value of an indicator of evaluation of moiré, which is necessary for the combined wiring pattern 24 formed of the random pattern 25*a*, 25*b*, or 25*c*, can be set to −2.80 lower than −3.17 which is an evaluation threshold value of an indicator of evaluation of moiré, which is necessary for the combined wiring pattern 24 formed of the typical wiring pattern 25. As a result, it is possible to obtain a qualified state, which is suitable for providing irregularity, similar to an optimized state as a not randomized state.

As described above, in the qualified state similar to the optimized state, it is especially preferable that for example, the pitches or the angles of the cells 22 of the typical wiring (mesh) pattern are made to be irregular in a predetermined manner, or the sides (thin metal lines 14) of the cells 22 are made to be irregular in a predetermined manner of making the sides as the wavy lines. In such a manner, it is possible to generate a robust wiring pattern.

In the present invention, the typical polygonal wiring pattern in the qualified state similar to the optimized state in terms of visibility of moiré with respect to the BM pattern at the predetermined luminance of the display unit, especially preferably, in the optimized state is made to be irregular in the predetermined manner. The reason for this is that the typical polygonal wiring pattern in the qualified state similar to the optimized state, especially preferably, in the optimized state already has quite or sufficiently favorable image quality, but image quality can be further improved by providing irregularity (randomicity), and thus favorable image quality is achieved in any case.

Further, in the typical wiring pattern 25 and the random patterns 25*a*, 25*b*, and 25*c*, disconnections (brakes) may be inserted into sides (mesh wires 21) of the thin metal lines 14 constituting the opening portions 22. As the shape of the mesh-shaped wiring pattern having such breaks, it is possible to employ a shape of a mesh-shaped wiring pattern of a conductive film described in JP2012-276175 relating to the present application of the applicant.

In the conductive film 10 of the embodiment shown in FIG. 3, in FIG. 3, the plurality of thin metal lines 14 of the first wiring portion 16*a* on the upper side (viewing side) of the transparent substrate 12, and the plurality of thin metal lines 14 of the second wiring portion 16*b* on the lower side (display side), respectively have, as the wiring patterns 24*a* and 24*b*, the typical wiring pattern 25 shown in FIG. 4B and FIG. 14 or the random pattern 25*a*, 25*b* or 25*c* made to be irregular as shown in FIGS. 7B and 15, FIG. 16, or FIGS. 7D and 17, in the projected wiring pattern.

Figure 19:
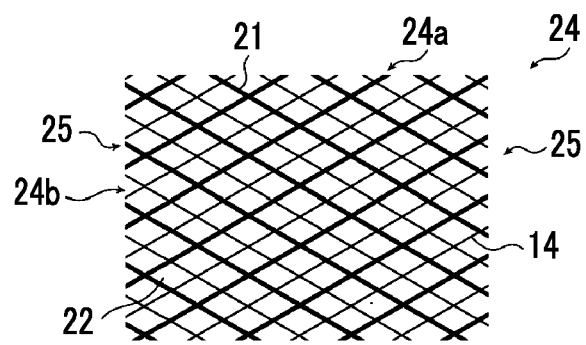
FIG. 19 is a plan view schematically illustrating an example of a combined wiring pattern which is combined by overlapping the upper and lower wiring patterns of the wiring portions of the conductive film shown in FIG. 3.

Consequently, in a case where both pluralities of thin metal lines 14 of both wiring portions 16*a* and 16*b* each have, as the wiring patterns 24*a* and 24*b*, the typical wiring pattern 25 shown in FIG. 14, as shown in FIG. 19, the combined wiring pattern 24 is formed of the wiring patterns 24*a* and 24*b* overlapping with each other.

In FIG. 19 and FIGS. 20 to 25 to be described later, in order to facilitate understanding, the plurality of thin metal lines 14 constituting the upper wiring pattern 24*a* is indicated by the heavy lines, and the plurality of thin metal lines 14 constituting the lower wiring pattern 24*b* is indicated by the thin lines. Here, it is needless to say that widths of the heavy lines and the thin lines may not be real line widths of the thin metal lines 14, may be equal thereto, and may be different therefrom.

Figure 20:
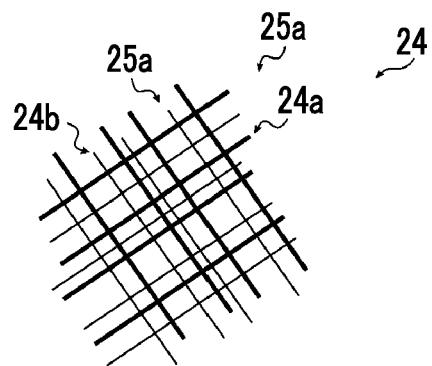
FIG. 20 is a plan view schematically illustrating an example of a combined wiring pattern which is combined by overlapping the upper and lower wiring patterns of the wiring portions of the conductive film shown in FIG. 3.
Figure 22:
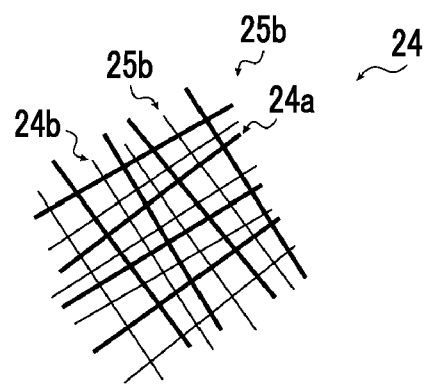
FIG. 22 is a plan view schematically illustrating an example of a combined wiring pattern which is combined by overlapping the upper and lower wiring patterns of the wiring portions of the conductive film according to another embodiment of the present invention.
Figure 24:
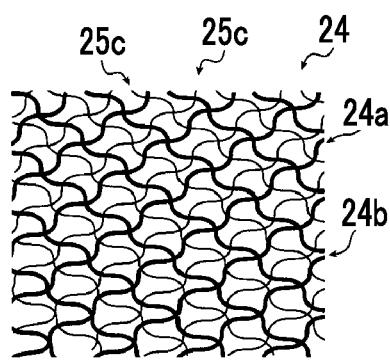
FIG. 24 is a plan view schematically illustrating an example of a combined wiring pattern which is combined by overlapping the upper and lower wiring patterns of the wiring portions of the conductive film according to another embodiment of the present invention.

Further, in a case where both pluralities of thin metal lines 14 each have, as the wiring patterns 24*a* and 24*b*, any one of the random patterns 25*a*, 25*b*, and 25*c* respectively shown in FIGS. 15 to 17, as shown in FIG. 20, 22, or 24, the irregular combined wiring pattern 24 is formed by making the upper and lower irregular wiring patterns 24*a* and 24*b* overlap with each other.

In each above-mentioned example shown in FIGS. 19, 20, 22, and 24, the first and second wiring portions 16*a* and 16*b* each are formed of the plurality of thin metal lines having any one of the typical wiring pattern 25, the typical wiring pattern 25, and the irregular random patterns 25a, 25b, and 25c shown in FIGS. 14 to 17. However, the present invention is not limited to this, and as shown in FIGS. 15 to 17, at least a part of any one wiring portion 16 may have a plurality of thin metal lines having any one of the irregular (randomized) random patterns 25a, 25b, and 25c.

As described above, any one of the random patterns 25a, 25b, and 25c is formed of the entirety or a part of the thin metal lines of the wiring portion 16 (wiring portion 16a or 16b) on the upper or lower side of the conductive film, and the mesh-shaped combined wiring pattern, in which the wiring patterns of both wiring portions 16 overlap and are combined, is randomized. As a result, it is possible to randomize the light transmitted through the mesh-shaped wiring pattern, and it is possible to improve visibility of moiré which is caused by interference between the display and the regular wiring pattern.

Figure 21:
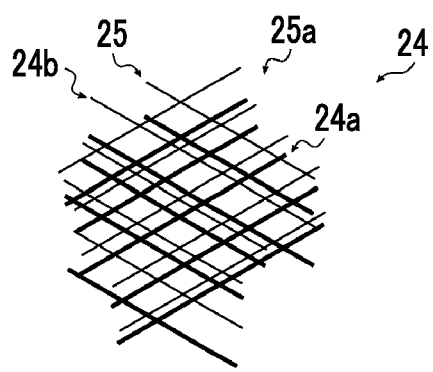
FIG. 21 is a plan view schematically illustrating an example of a combined wiring pattern which is combined by overlapping the upper and lower wiring patterns of the wiring portions of the conductive film according to another embodiment of the present invention.
Figure 23:
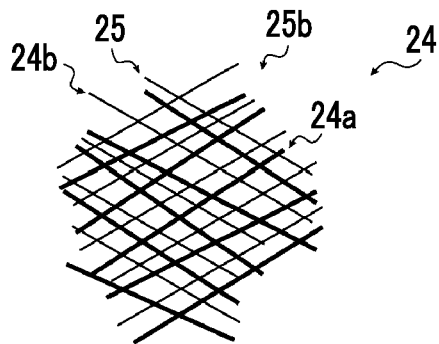
FIG. 23 is a plan view schematically illustrating an example of a combined wiring pattern which is combined by overlapping the upper and lower wiring patterns of the wiring portions of the conductive film according to another embodiment of the present invention.
Figure 25:
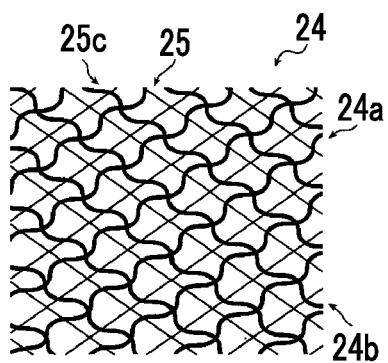
FIG. 25 is a plan view schematically illustrating an example of a combined wiring pattern which is combined by overlapping the upper and lower wiring patterns of the wiring portions of the conductive film according to another embodiment of the present invention.

For example, as shown in FIGS. 21, 23 and 25, the first and second wiring portions 16a and 16b each may be formed of a plurality of thin metal lines having a different wiring pattern. In the examples shown in FIGS. 21, 23 and 25, the first wiring portion 16a on the upper side of the transparent substrate 12 is formed of the plurality of thin metal lines 14 having the random patterns 25a, 25b, and 25c shown in FIGS. 15, 16, and 17, and the second wiring portion 16b on the lower side of the transparent substrate 12 is formed of the plurality of thin metal lines 14 having the regular typical wiring pattern 25 shown in FIG. 14. On the contrary, the first wiring portion 16a may be formed of the plurality of thin metal lines 14 having the typical wiring pattern 25, and the second wiring portion 16b may be formed of the plurality of thin metal lines 14 having any one of the random patterns 25a, 25b, and 25c. In such a manner, the combined wiring pattern, in which the typical wiring pattern 25 and any of the irregular random patterns 25a, 25b, and 25c overlap with each other, can be made to be irregular.

In the above-mentioned examples, the combined wiring pattern of different wiring patterns is formed by making the typical wiring pattern 25 overlap with any of the random patterns 25a, 25b, and 25c. However, there may be different types of irregularity between two random patterns which are made to be irregular in different manners. For example, the random patterns 25a and 25b, of which the cells 22 have different shapes, may be formed by making the random patterns 25b and 25c or the random patterns 25c and 25a overlap with each other. Further, there may be the same types of irregularity between the random patterns which are made to be irregular in different manners. For example, two random patterns, between which sizes of the irregularity, for example, one or both of the pitches and the angles of the cells 22 are different, may be used, and two random patterns, between which at least one of amplitudes, wavelengths (periods), or phases of the wavy lines when the cells 22 are made to be wavy, may be used.

Figure 26:
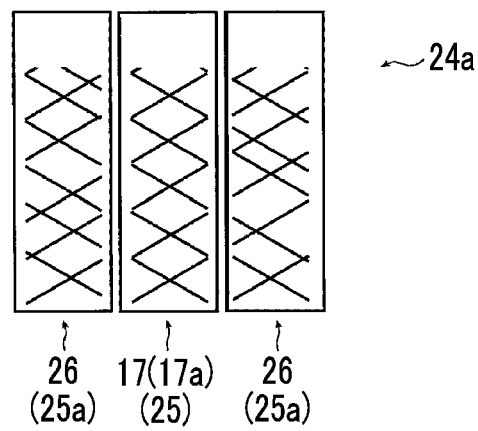
FIG. 26 is a plan view schematically illustrating an example of the upper wiring pattern of the wiring portion of the conductive film according to another embodiment of the present invention.

As shown in FIG. 26, the plurality of thin metal lines 14 of either one of the first or second wiring portions 16a and 16b may be divided into dummy electrode portions (non-electrode portions) 26 and the electrode portion 17 constituting the wiring layer 28, by using the disconnections (brakes), as described above. Then, either one of the electrode portion 17 or the dummy electrode portion 26 may be formed of the plurality of thin metal lines 14 having the regular typical wiring pattern 25 shown in FIG. 14, and the other one may be formed of the plurality of thin metal lines 14 having the irregular random pattern 25a shown in FIG. 15. Such a configuration may be applied to the conductive film 11 of a second embodiment of the present invention shown in FIG. 12 to be described later. In such a manner, it is possible to make irregular a combined wiring pattern in which a combination between the typical wiring pattern 25 and the random pattern 25a overlaps with the typical wiring pattern 25 or the random pattern 25a, or a combined wiring pattern in which a combination between the typical wiring pattern 25 and the random pattern 25a overlaps with the typical wiring pattern 25 or the random pattern 25a.

In FIG. 26, the first wiring portion 16a on the upper side of the transparent substrate 12 is divided into an electrode portion 17a and two dummy electrode portions 26 on the right and left sides thereof, by using disconnections (brakes). The two dummy electrode portions 26 each are formed of the plurality of thin metal lines 14 having the random pattern 25a shown in FIG. 15. The electrode portion 17a is formed of the plurality of thin metal lines 14 having the typical wiring pattern 25 shown in FIG. 14. However, it is apparent that a configuration opposite to the above-mentioned configuration may be adopted.

Instead of the random pattern 25a, two dummy electrode portions 26 may be formed of the plurality of thin metal lines 14 having either one of the random pattern 25b or 25c. Further, instead of the typical wiring pattern 25, the electrode portion 17a may be formed of the plurality of thin metal lines 14 having a random pattern which is made to be irregular in a different manner (type, size, or the like) from that of the random patterns off the two dummy electrode portions 26.

In the above-mentioned examples shown in FIGS. 19 to 25, the first wiring portion 16a and the second wiring portion 16b each are formed of the plurality of thin metal lines 14. However, the present invention is not limited to this, instead of the plurality of thin metal lines 14, one wiring portion may be formed of wires which are patterned by a transparent conductive layer such as ITO (Iridium Tin Oxide (tin-doped indium oxide)).

For example, in the examples shown in FIGS. 19, 21, 23, and 25 and examples opposite thereto, wires patterned by ITO may be used instead of the plurality of thin metal lines 14 having one regular typical wiring pattern 25 of the first wiring portion 16a and the second wiring portion 16b.

Further, as shown in FIG. 26, one of the first wiring portion 16a and the second wiring portion 16b may be divided into an electrode portion 17a and two dummy electrode portions 26 on the right and left sides thereof, by using disconnections (brakes), and one of the electrode portion 17a and the dummy electrode portions 26 may be formed of the plurality of thin metal lines 14 having the random pattern. In this case, wires patterned by ITO may be used instead of the plurality of thin metal lines 14 constituting the other wiring portion.

In another embodiment of the present invention, in order to suppress noise which is visually perceived due to overlapping between an irregular mesh-shaped random pattern (hereinafter referred to as a random mesh pattern) and a display pixel array (BM) pattern, a conductive film having a random mesh pattern for combination may be provided on the display. Here, the random mesh pattern used in the present embodiment can be defined as an irregular pattern which has at least two types of different opening shapes and in which numbers of vertices of the opening shapes are at least two types of different numbers of vertices of the opening shapes.

Meanwhile, in a combination in which noise visually perceived by the display and the random mesh pattern is quantified and the quantitative value is equal to or less than a threshold value, noise is not visually perceived. Accordingly, in the present embodiment, the random mesh pattern can be defined as described above, but it is necessary to quantify the BM pattern and the random mesh pattern of the display and quantify the visually perceived noise from quantitative values thereof.

Hence, in the present embodiment, first, the irregular mesh pattern, which has a plurality of different features, is assumed, and a transmittance image is created. Next, a convolution operation is performed on the fast Fourier transform (FFT) spectrum obtained from this transmittance image and the FFT spectrum obtained from the display. Here, the integrated value obtained by applying the visual transfer function to the obtained calculation result corresponds to the quantitative value of visibility of noise, and at this stage, the quantitative value of visibility of noise and the noise simulation image can be obtained. By evaluating the obtained image, visibility of noise allowable as visibility can be determined, and the conductive film of the present invention and the evaluation method thereof can be provided.

Figure 27:
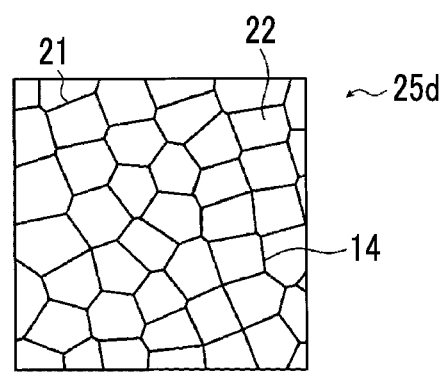
FIG. 27 is a plan view schematically illustrating an example of a random mesh-shaped wiring pattern, which is formed of Voronoi polygons, in the wiring portion of the conductive film shown in FIG. 3.

In the present embodiment, as shown in FIG. 27, one or both wiring patterns 24 of the wiring patterns 24a and 24b may be a wiring pattern that is made to be irregular by forming opening portions, which are formed of the plurality of thin metal lines, in random polygonal shapes, that is, a random mesh pattern 25d. The random mesh pattern 25d is a wiring pattern excellent in visibility of noise. However, any random mesh pattern may be used if the shapes of the opening portions 22 formed of the thin metal lines 14 are random polygonal shapes which have two or more types of different opening shapes and two or more types of different numbers of vertices of the opening shapes. It should be noted that the random mesh pattern 25d is a partially enlarged view of the projected wiring pattern 23c shown in FIG. 7F.

In the example shown in FIG. 3, the wiring pattern 24 has, as the wiring patterns 24a and 24b, the random mesh pattern 25d, as shown in FIG. 27.

Figure 28:
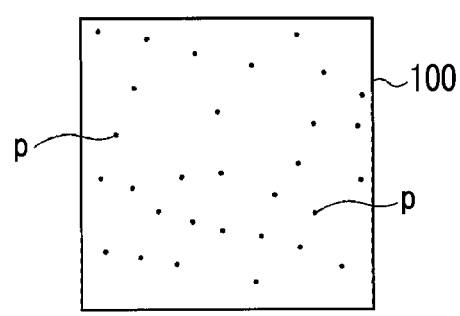
FIG. 28 is a schematic explanatory view of an example of a dot cut-out image showing seed points (dots) generated at arbitrary intervals in a single planar area in order to generate the Voronoi polygons forming the random mesh pattern shown in FIG. 27.

Here, the random mesh pattern 25d, which is an irregular wiring pattern shown in FIG. 27, has a wiring shape that has the opening portions 22 formed of Voronoi polygons depending on a Voronoi diagram (Voronoi division method) on the basis of a plurality of seed points p, which are present at a plurality of positions at arbitrary intervals in a single planar region 100 as shown in FIG. 28.

FIG. 28 shows a dot cut-out image in which dots are generated as a plurality of seed points p at a plurality of positions randomly selected with arbitrary intervals in a single planar area 100 in order to generate the Voronoi polygons forming the random mesh pattern shown in FIG. 27.

In the random mesh pattern 25d shown in FIG. 27, areas of a plurality of random polygonal shapes respectively surrounding the plurality of seed points p shown in FIG. 28, that is, areas of a plurality of Voronoi polygons are defined in accordance with the Voronoi diagram (Voronoi division method). Here, the areas of the plurality of Voronoi polygons divided by the Voronoi diagram are shown as a set of points closest to the seed points p. Here, as a distance function, the Euclid distance is used, but various functions may be used.

In the present invention, as the used random mesh pattern, a random mesh pattern (not shown in the drawing), which has a wiring shape having the opening portions 22 formed of Delaunay triangles determined in accordance with the Delaunay diagram (Delaunay triangulation method) on the basis of the plurality of seed points shown in FIG. 28, may be used. The Delaunay triangulation method is a method of defining the triangular areas by connecting the adjacent seed points among the plurality of seed points p. Thereby, for example, it is possible to define each of the areas of the plurality of Delaunay triangles of which the vertices are some of the plurality of seed points.

Further, the random mesh pattern used in the present invention is not limited to a random mesh pattern in which the shapes of the opening portions (cells) are Voronoi polygons, Delaunay triangles or the like, and any pattern may be used if the pattern is a random mesh pattern. For example, the pattern may be a random mesh pattern in which pitches, angles, or the like of the regular typical pattern of regular polygons such as rhomboids are randomized to be equal to or less than several %, for example, 10%.

Although details will be described later, when the conductive film 10 of the present invention has the combined wiring pattern 24 of the upper and lower wiring patterns 24a and 24b, the conductive film 10 of the present invention has a random mesh pattern optimized in terms of visibility of noise at a predetermined luminance (luminance image data) of the BM pattern 38 of the display unit 30. In the present invention, the random mesh pattern, which is optimized in terms of visibility of noise with respect to the BM pattern at the predetermined luminance, is defined as a single wiring pattern or a group of two or more wiring patterns making noise not perceived by human visual sensation with respect to the BM pattern 38 at the predetermined luminance when the rhomboid wiring pattern is formed as the combined wiring pattern 24.

Accordingly, the random mesh pattern 25d shown in FIG. 27 is a random mesh pattern that is optimized in terms of visibility of noise at the predetermined luminance (luminance image data) of the BM pattern of the display unit when formed as a combined wiring pattern 24, and is a random mesh pattern which allows an indicator of evaluation of noise to be equal to or less than a predetermined evaluation threshold value. The indicator is calculated from synthetic image data of the combined wiring pattern 24, in which upper and lower wiring patterns 24a and 24b overlap with each other, as transmittance image data of the random mesh pattern 25d and luminance image data of the BM pattern of each color obtained when light beams with the plurality of colors of the display are respectively emitted. The random mesh pattern 25d itself is a random mesh pattern which is superimposed on a display screen of the display with a predetermined emission intensity, is able to sufficiently prevent noise from occurring and to improve visibility, and is optimized in terms of visibility of noise with respect to the BM pattern at the predetermined luminance of the display unit.

In the random mesh pattern 25d optimized in such a manner, as described above, disconnections (brakes) may be inserted into sides (mesh wires 21) of the thin metal lines 14 constituting the opening portions 22.

Figure 29:
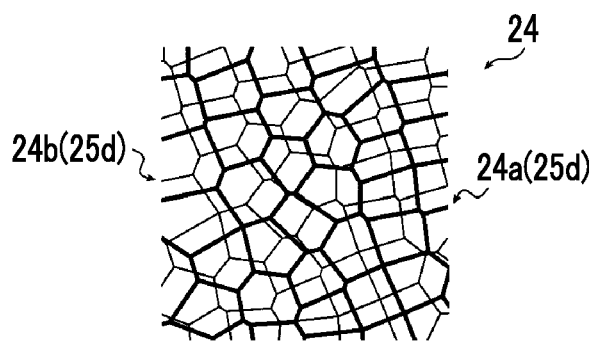
FIG. 29 is a plan view schematically illustrating an example of a combined wiring pattern which is combined by overlapping the upper and lower wiring patterns of the wiring portions of the conductive film shown in FIG. 3.
Figure 30:
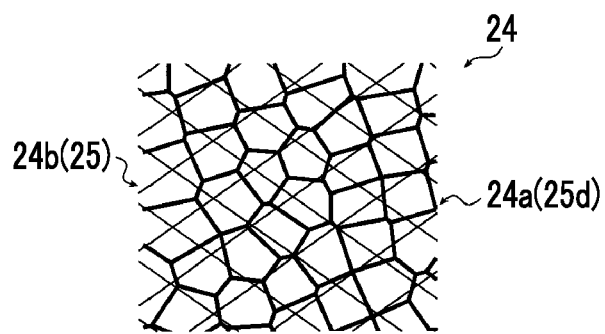
FIG. 30 is a plan view schematically illustrating an example of a combined wiring pattern which is combined by overlapping the upper and lower wiring patterns of the wiring portions of the conductive film according to another embodiment of the present invention.

In the conductive film 10 of the embodiment shown in FIG. 3, in FIG. 3, the plurality of thin metal lines 14 of the first wiring portion 16a on the upper side (viewing side) of the transparent substrate 12, and the plurality of thin metal lines 14 of the second wiring portion 16b on the lower side (display side), respectively have, as the wiring patterns 24a and 24b, the irregular random mesh pattern 25d shown in FIG. 27. As shown in FIG. 29, the combined wiring pattern 24, which is made to be irregular by overlapping the irregular wiring patterns 24a and 24b on the upper and lower sides, is formed. In FIG. 29 and FIG. 30 to be described later, in order to facilitate understanding, the plurality of thin metal lines 14 constituting the upper wiring pattern 24a is indicated by the heavy lines, and the plurality of thin metal lines 14 constituting the lower wiring pattern 24b is indicated by the thin lines. Here, it is needless to say that widths of the heavy lines and the thin lines may not be real line widths of the thin metal lines 14, may be equal thereto, and may be different therefrom.

That is, in the example shown in FIG. 3, the first and second wiring portions 16a and 16b each are formed of a plurality of thin metal lines having such the irregular random mesh pattern 25d shown in FIG. 27. However, the present invention is not limited to this, and at least a part of either one wiring portion 16 thereof may have a plurality of thin metal lines having the irregular random mesh pattern 25d shown in FIG. 27.

As described above, the irregular (randomized) random mesh pattern 25d is formed of the entirety or a part of the thin metal lines of the wiring portion 16 (wiring portion 16a or 16b) on the upper or lower side of the conductive film, and the mesh-shaped wiring pattern, in which the wiring patterns of both wiring portions 16 overlaps and are combined, is randomized. As a result, it is possible to randomize the light transmitted through the mesh-shaped wiring pattern, and it is possible to improve visibility of noise which is caused by interference between the display and the wiring pattern.

For example, as shown in FIG. 30, the first and second wiring portions 16a and 16b each are formed of a plurality of thin metal lines having a different wiring pattern. In the example shown in FIG. 30, the first wiring portion 16a on the upper side of the transparent substrate 12 is formed of the plurality of thin metal lines 14 having the irregular random mesh pattern 25d shown in FIG. 27, and the second wiring portion 16b on the lower side of the transparent substrate 12 is formed of the plurality of thin metal lines 14 having the regular typical wiring pattern 25 formed of rhomboid opening portions shown in FIG. 14, as described above. On the contrary, the first wiring portion 16a may be formed of the plurality of thin metal lines 14 having the typical wiring pattern 25, and the second wiring portion 16b may be formed of the plurality of thin metal lines 14 having the random mesh pattern 25d. In such a manner, the combined wiring pattern, in which the random mesh pattern 25d and the regular typical wiring pattern 25 overlap with each other, can be made to be irregular.

As the electrode patterns of two dummy electrode portions (non-electrode portions) 26 into which the electrode 17 is divided on both sides thereof by the brakes shown in FIG. 26, instead of the random pattern 25a shown in FIG. 15, the random mesh pattern 25d shown in FIG. 27 may be used. Alternatively, the typical wiring pattern 25 shown in FIG. 14 may be changed, and then as the electrode pattern of the electrode portion 17 shown in FIG. 26, instead of the typical wiring pattern 25 shown in FIG. 14, the random mesh pattern 25d shown in FIG. 27 may be used.

In the example shown in FIG. 30, in a manner similar to that of the above-mentioned cases shown in FIGS. 21, 23, and 25, one wiring portion may be formed of wires which are patterned by a transparent conductive layer such as ITO (Indium Tin Oxide (tin-doped indium oxide)), instead of the plurality of thin metal lines 14.

For example, in the example shown in FIG. 30 and an example opposite thereto, wires patterned by ITO may be used instead of the plurality of thin metal lines 14 having one regular typical pattern 25 of the first wiring portion 16a and the second wiring portion 16b.

Further, as described above, one of the first wiring portion 16a and the second wiring portion 16b may be divided into an electrode portion 17a and two dummy electrode portions 26 on the right and left sides thereof, by using disconnections (brakes), and one of the electrode portion 17a and the dummy electrode portions 26 may be formed of the plurality of thin metal lines 14 having a random mesh pattern. In this case, wires patterned by ITO may be used instead of the plurality of thin metal lines 14 constituting the other wiring portion.

The above-mentioned conductive films 10, 11, and 11A of the first, second, and third embodiments of the present invention are applied to, for example, a touch panel (44: refer to FIG. 1) of a display unit 30 (display) schematically shown in FIG. 2. However, from at least one point of view, for example, from the point of view a, when both the conductive film and the display unit are projected onto the plane perpendicular to the point of view a, there is provided a wiring pattern which is optimized in terms of visibility of moiré with respect to a luminance value of the pixel array (BM) pattern of each color depending on the emission intensity of the display when formed as the combined wiring pattern. Examples of the wiring pattern include a regular typical wiring pattern, or an irregular wiring (random) pattern which is obtained by making the typical wiring pattern irregular, or an irregular wiring (random mesh) pattern which is optimized in terms of visibility of noise.

In the present invention, the wiring pattern (for example, the typical wiring pattern, the random pattern, or the random mesh pattern), which is optimized in terms of visibility of moiré or visibility of noise with respect to the luminance value of the BM pattern of each color depending on the emission intensity of the display when formed as the combined wiring pattern, is defined as a single wiring pattern or a group of two or more wiring patterns (for example, the typical wiring pattern, the random pattern, or the random mesh pattern) making moiré or noise not perceived by human visual sensation when formed as the combined wiring pattern, with respect to the BM pattern of the current color even when any color light beam of the light beams with respective colors of the plurality of the sub-pixels of the display is emitted alone, from at least one point of view.

That is, the optimized wiring pattern (for example, the typical wiring pattern, the random pattern, or the random mesh pattern) is defined as a group of wiring patterns making moiré or noise not perceived by human visual sensation with respect to a BM pattern of a color in which moiré or noise is most likely to occur, for example, a color having a highest luminance value at the time of lighting on for each color of a plurality of colors such as RGB, that is, with respect to a BM pattern having a worst value, when formed as the combined wiring pattern. In the present invention, also a group of two or more wiring patterns (for example, the typical wiring pattern, the random pattern, or the random mesh pattern) optimized may be ranked, from a wiring pattern making moiré or noise most difficult to be perceived to a wiring pattern making noise somewhat difficult to perceive, so as to determine one wiring pattern which makes moiré or noise most difficult to perceive.

Here, in the present invention, in terms of optimization of visibility of moiré or visibility of noise of the mesh wiring pattern, a reason why the luminance value of the BM pattern of each color depending on the emission intensity of the display is used is, for example, as follows. It is assumed that the conductive film has a mesh wiring pattern with line widths and pitches of the thin metal lines shown in FIG. 31A, and the display has a BM pattern in which one pixel is typified by one sub-pixel as shown in FIG. 31B. In this case, considering one pixel of the display, transmittance image data of the mesh wiring pattern is as shown in FIGS. 31C and 31E. In both the present invention and the related art such as JP2009-117683A, parts corresponding to the line widths of the thin metal lines do not transmit light, and thus 0 can be set, and gaps between the thin metal lines transmit light, and thus 1.0 can be set. As a result, both can be represented as binary data, and each value is completely constant. However, since the BM of the display does not transmit light, a transmittance thereof is 0, but since each sub-pixel (color filter) transmits light, an intensity of the light, for example, a luminance value thereof changes depending on the emission intensity of the display as shown in FIG. 31D. In contrast, transmittance image data of array pattern of the sub-pixels (color filters), that is, the BM pattern of the display according to the related art such as JP2009-117683A is as shown in FIG. 31F. The sub-pixel (color filter) of the display transmits light, and thus 1.0 is set. The BM of the display does not transmit light, and thus 0 is set. Therefore, the emission intensity of the display is not considered.

Meanwhile, as in a high resolution smartphone, if the emission intensity is strong, moiré or noise visually perceived is strong, and if the emission intensity is weak, moiré or noise visually perceived is weak. Therefore, as in the related art, indicators of evaluation of moirés or noises obtained in displays having different emission intensities, that is, quantitative values thereof cannot be compared on the basis of the transmittance image data only. As a result, it is not possible to correctly evaluate the visibility of moiré or noise.

Hence, in the present invention, emission intensities of different displays are evaluated and normalized on the basis of an emission intensity of a reference display. Thereby, it is possible to optimize the visibility of moiré or the visibility of noise of the wiring pattern which can be applied to various displays having different emission intensities.

Next, in the present invention, a wiring pattern is optimized as a combined wiring pattern in terms of visibility of moiré with respect to the BM (pixel array) pattern in a state where light with each color of the plurality of colors is emitted alone. The wiring pattern is defined as a typical wiring pattern which has optimized polygons, for example, rhomboids. Alternatively, the wiring pattern is defined as a wiring pattern which is obtained by making irregular pitches or angles of the polygons (rhomboids) of the opening portions (cells) of the typical wiring pattern having polygonal shapes, for example, rhomboid shapes in the qualified state similar to the optimized state, or a wiring pattern which is randomized by making sides of polygons (rhomboids) as wavy lines. Accordingly, in the present invention, it can be said that the wiring (mesh) pattern, which is obtained by making pitches irregular, is a random pattern in which pitches of a plurality of adjacent opening portions are different with angles thereof maintained. In addition, it can be said that the wiring pattern, which is obtained by making angles irregular, is a random pattern in which angles and pitches or side lengths of a plurality of adjacent opening portions are different. In addition, it can be said that the wiring pattern, which is made to be irregular by making lines wavy, is a random pattern in which shapes of a plurality of adjacent polygons formed by the center lines of the wavy lines are the same as shapes of the opening portions of the typical wiring pattern.

Further, in the present invention, a wiring pattern, which is optimized as a combined wiring pattern in terms of visibility of noise with respect to the BM (pixel array) pattern in a state where light with each color of the plurality of colors is emitted alone, is defined as an optimized irregular wiring (random mesh) pattern having a mesh shape of polygons.

Optimization of visibility of moiré of the typical wiring pattern and visibility of moiré and visibility of noise of the irregular (random) wiring pattern, which are essential in the present invention, at the luminance value of the BM pattern of each color depending on the emission intensity of the display will be described later.

The conductive film according to the present invention basically has the above-mentioned configuration.

Next, a configuration and emission intensities of the sub-pixels of the pixel array (BM) pattern of the display, to which the conductive film of the present invention shown in FIG. 2 is applied, will be described.

The BM pattern and the emission intensity of the display, which can be applied to the present invention, is not particularly limited, and may be the same as the BM pattern and the emission intensity of a known display. For example, as shown in FIGS. 32A, 32B, 33A, 33B, and 33C, a display such as OLED having different cycles and intensities of the respective colors of RGB may be used. A display, which is formed of RGB sub-pixels having the same shapes as shown in FIG. 2 or FIGS. 34A and 34B and in which an intensity variation of the sub-pixels is large, or a display, in which an intensity variation of the sub-pixels is small and only a G sub-pixel (channel) having a highest intensity is considered, may be used. In particular, a display such as a smartphone or a tablet having a high intensity may be used.

Figure 32A:
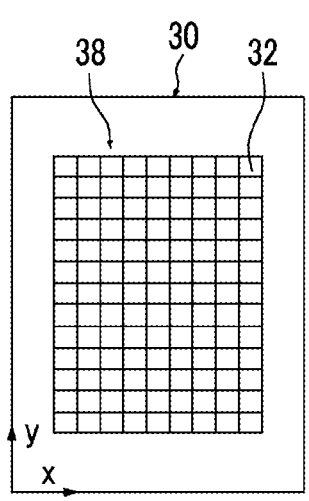
FIGS. 32A and 32B are respectively schematic explanatory diagrams illustrating an example of a part of pixel array patterns of a display unit using the conductive film according to the present invention.
Figure 32B:
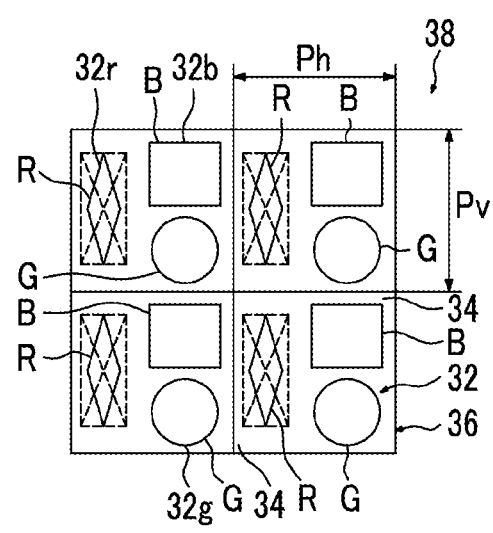

FIGS. 32A and 32B are respectively a schematic explanatory diagram illustrating an example of a part of pixel array patterns of a display unit using the conductive film according to the present invention, and a partially enlarged view of the part.

As shown in FIG. 32A, the display unit 30 has a plurality of pixels 32 arranged in a matrix shape to constitute a predetermined pixel array pattern. As shown in FIG. 32A, each pixel 32 has a configuration in which three sub-pixels (a red sub-pixel 32r, a green sub-pixel 32g, and a blue sub-pixel 32b) are arranged in a horizontal direction.

In the present invention, it is necessary for the pixel array pattern of the display unit to satisfy any of the following three conditions: a condition in which at least two sub-pixels among a plurality of sub-pixels in a single pixel, the three sub-pixels in the example shown in the drawing, have different shapes; a condition in which cycles of sub-pixel array patterns formed by arrays each corresponding to at least two sub-pixels among a plurality of (three) sub-pixels in a single pixel are different; or a condition in which a plurality of (three) sub-pixels in a single pixel is not lined up in one direction. In addition, in the present invention, the cycles of the sub-pixel array patterns, that is, the cycles of the sub-pixels (color filters) also include a cycle of sub-pixels in a single pixel.

In the example shown in FIG. 32B, each sub-pixel 32r has a rhomboid shape that is vertically long in the y (vertical) direction in the drawing, and is disposed on the left side of each square-shaped pixel 32 in the drawing, each sub-pixel 32g has a circular shape, and is disposed on the lower right side of the pixel 32 in the drawing, and each sub-pixel 32b has a rectangular shape (square shape), and is disposed on the upper right side of the pixel 32 in the drawing. In the display unit 30 shown in FIGS. 32A and 32B, a pixel array pattern 38 corresponds to a case where forms of three sub-pixels 32r, 32g, and 32b within a single pixel are different such that intensities thereof are different, and corresponds to a case where a plurality of (three) sub-pixels in a single pixel is not lined up in a single direction.

In the example shown in the drawing, the arrangement pitch (horizontal pixel pitch Ph) of the pixels 32 in the horizontal direction and the arrangement pitch (vertical pixel pitch Pv) of the pixels 32 in the vertical direction are substantially equal to each other, and are referred to as a pixel pitch Pd. That is, a region, which is formed of the three sub-pixels 32r, 32g, and 32b of a single pixel 32, and a pixel region 36, which is formed of a black matrix (BM) 34 (pattern material) surrounding the sub-pixels 32r, 32g, and 32b, have square shapes. It should be noted that the pixel region 36 corresponds to a single pixel 32, and therefore the pixel region 36 is hereinafter also referred to as a pixel.

It should be noted that the pixel pitch Pd (the horizontal or vertical pixel pitch Ph or Pv) may have any value if it is a pitch corresponding to a resolution of the display unit 30, and may be, for example, a pitch in a range of 84 µm to 264 µm.

In the examples shown in the drawing, the shapes of the sub-pixels 32r, 32g, and 32b within one pixel are respectively a rhomboid, a circle, and a rectangle. However, the present invention is not limited to this, and the shape may be any shape if there is provided the pixel array pattern 38. In the pixel array pattern 38, three sub-pixels having the same forms shown in FIG. 33A are lined up in the horizontal direction of the drawing, each pixel 32 is repeated in the horizontal direction and the vertical direction, and the cycles and intensities of the sub-pixels (color filters) are the same for the three sub-pixels of RGB.

Figure 33A:
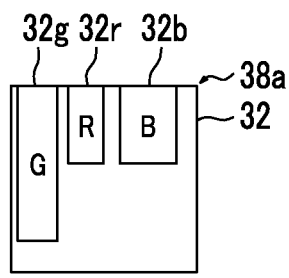
FIGS. 33A to 33C are respectively schematic explanatory diagrams illustrating examples of constituent units of pixel array patterns in which at least either shapes or cycles of three sub-pixels applied to the present invention are different.
Figure 33B:
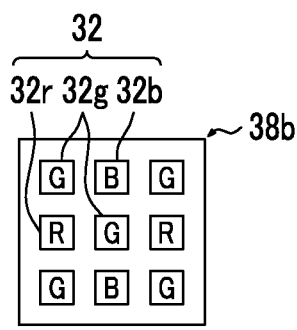
Figure 33C:
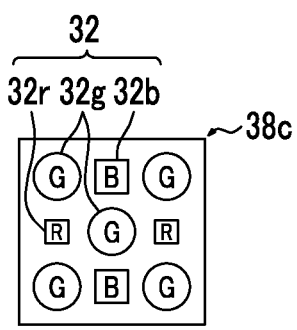
Figure 34A:
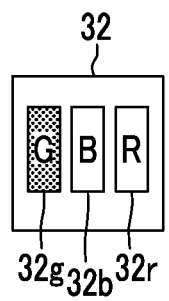
FIGS. 34A and 34B are respectively explanatory diagrams schematically illustrating examples of variations of intensities of three sub-pixels in the pixels of the pixel array pattern of the display unit shown in FIG. 2.
Figure 34B:
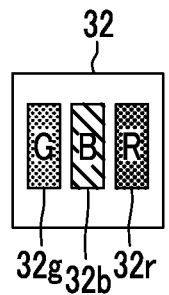

Alternatively, the sub-pixels (color filters) 32r, 32g, and 32b having opening shapes called a pin tile structure shown in FIGS. 33A to 33C may be used. In addition, there may be provided sub-pixel array patterns each of which is formed of the sub-pixels 32r, 32g, and 32b.

As shown in FIG. 33A, the forms of the three sub-pixels 32r, 32g, and 32b of the pixel 32 may be different (the shapes may be rectangles, but the sizes thereof may be different). This case corresponds to the case where the intensities thereof are different. In this case, it can be said that the cycles of the sub-pixels are the same.

That is, in the example shown in FIG. 33A, the pixel array pattern 38a is formed such that each pixel is formed of the three sub-pixels 32r, 32g, and 32b having different forms. Any of the cycles of the respective sub-pixel array patterns of the three sub-pixels 32r, 32g, and 32b is the same as the cycle of the pixel array pattern 38a.

It should be noted that in the present invention, the condition, in which the forms of the sub-pixels are different, is defined to include not only a case where the shapes of the sub-pixels are different but also a case where the sizes of the sub-pixels are different.

As shown in FIG. 33B, even when the forms of the three sub-pixels 32r, 32g, and 32b are the same, a repetition cycle (the cycle of the sub-pixel array pattern) of the sub-pixels 32g may be different from repetition cycle of the sub-pixels 32r and 32b. In this example, the cycle of the sub-pixels 32g is a half of the cycle of the sub-pixels 32r and 32b. In this case, it can be said that the intensities of the sub-pixels are the same.

That is, in the example shown in FIG. 33B, a pixel array pattern 38b is formed such that each pixel 32 is formed of four sub-pixels including the two sub-pixels 32g and the sub-pixels 32r and 32b. Either of the cycles of the respective sub-pixel array patterns of the sub-pixels 32r and 32b is the same as the cycle of the pixel array pattern 38a. The cycle of the sub-pixel array pattern of the sub-pixels 32g is a half of the cycle of the pixel array pattern 38a.

As shown in FIG. 33C, the repetition cycle (the cycle of the sub-pixel patterns) and the form (both the shape and the size) of the sub-pixels 32g may be different from those of the sub-pixels 32r and 32b. This case corresponds to the case where both the cycles and the intensities of the sub-pixels are different.

That is, in the example shown in FIG. 33C, in a manner similar to the example shown in FIG. 33B, a pixel array pattern 38c is formed such that each pixel 32 is formed of four sub-pixels including the two sub-pixels 32g and the sub-pixels 32r and 32b. Either of the cycles of the respective sub-pixel array patterns of the sub-pixels 32r and 32b is the same as the cycle of the pixel array pattern 38a. The cycle of the sub-pixel array pattern of the sub-pixels 32g is a half of the cycle of the pixel array pattern 38a.

FIG. 34A shows a BM structure of a pixel in which an intensity variation of GBR sub-pixels is large and which is formed of RGB sub-pixels having the same shapes. FIG. 34B shows a BM structure of a pixel in which an intensity variation of GBR sub-pixels is small and which is formed of RGB sub-pixels having the same shapes. Considering only a G sub-pixel having a highest intensity, a wiring pattern of the conductive film can be designed.

Figure 35:
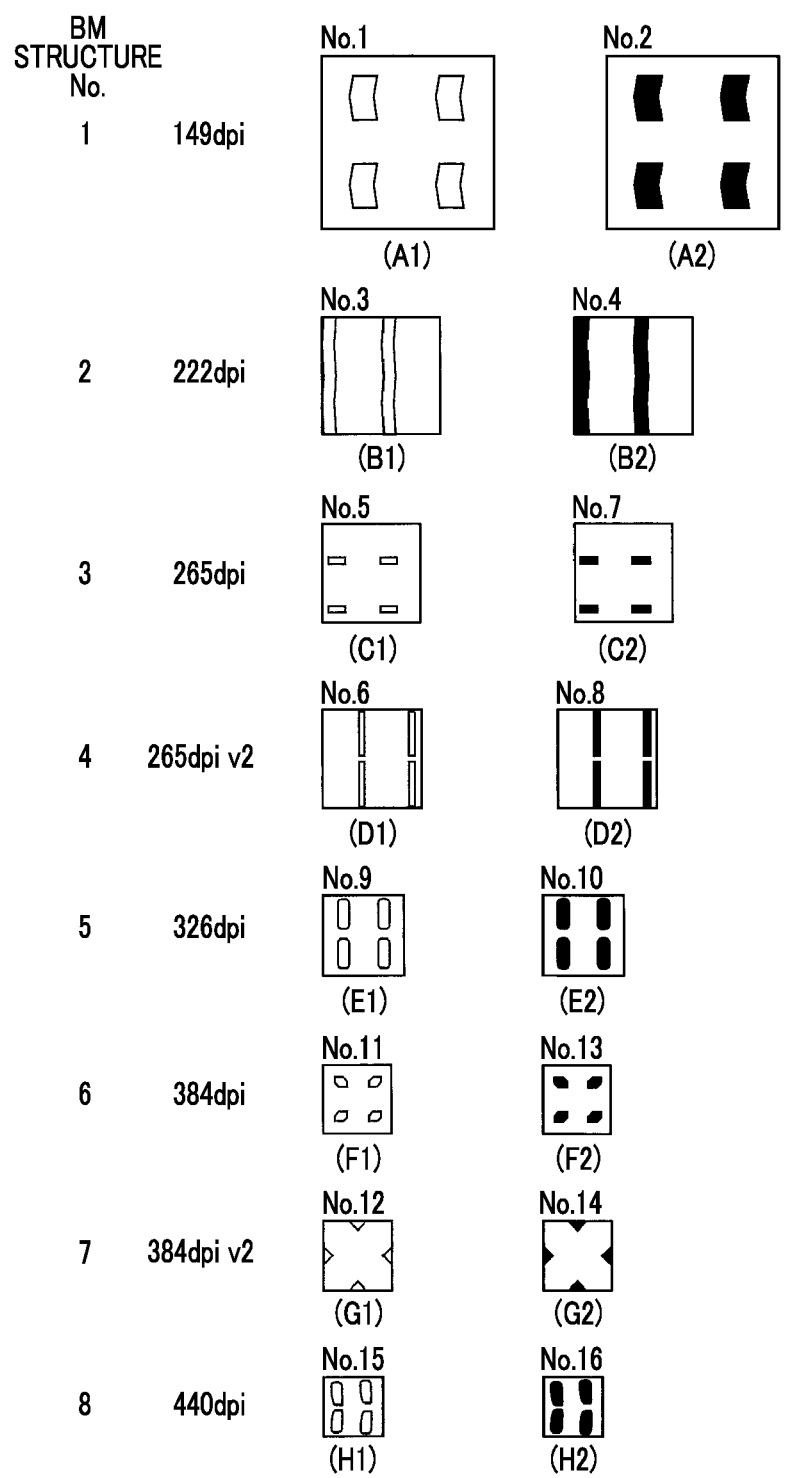
FIGS. 35(A1) to 35(H2) are schematic diagrams illustrating examples of repetition units each having 2×2 pixels of representative sub-pixels of pixel array patterns of display units of which resolutions, shapes, and intensities are different.

The resolutions and intensities of the BMs each having, 2×2 pixels of the display used in the present invention are shown in FIGS. 35(A1) to 35(H2). Resolutions, shapes, or intensities (luminances) of the respective BMs shown in FIGS. 35(A1) to 35(H2) are different. FIGS. 35(A1) to 35(H2) show only the G channel (G sub-pixels), and do not show the B channel (B sub-pixels) and the R channel (R sub-pixels), but it is apparent that the resolutions and the shapes thereof are the same.

FIGS. 35(A1) and 35(A2) each show a BM structure of BM structure No. 1 represented by four G sub-pixels having reed shapes, which are curved toward the center and the left side in the drawing, at a resolution of 149 dpi. Here, when intensities of the reference display are normalized, the intensities thereof are 0.5(64) and 1.0(128), and correspond to BM condition Nos. 1 and 2 used in examples to be described later.

FIGS. 35(B1) and 35(B2) each show a BM structure of BM structure No. 2 represented by two G sub-pixels having band shapes, which are vertically continuous in the drawing, at a resolution of 222 dpi. Here, when intensities of the reference display are normalized, the intensities thereof are 0.5(64) and 1.0(128), and correspond to BM condition Nos. 3 and 4 used in examples to be described later.

FIGS. 35(C1) and 35(C2) each show a BM structure of BM structure No. 3 represented by four G sub-pixels having flat plate shapes, which are arranged in the horizontal direction in the drawing, at a resolution of 265 dpi. Here, when intensities of the reference display are normalized, the intensities thereof are 0.5(64) and 1.0(128), and correspond to BM condition Nos. 5 and 7 used in examples to be described later.

FIGS. 35(D1) and 35(D2) each show a BM structure of BM structure No. 4 (265 dpi v2) represented by four G sub-pixels having band shapes, which are arranged in the vertical direction in the drawing, at a resolution of 265 dpi. Here, when intensities of the reference display are normalized, the intensities thereof are 0.5(64) and 1.0(128), and correspond to BM condition Nos. 6 and 8 used in examples to be described later.

FIGS. 35(E1) and 35(E2) each show a BM structure of BM structure No. 5 represented by four G sub-pixels having rectangular shapes, which are arranged in the horizontal direction in the drawing, at a resolution of 326 dpi. Here, when intensities of the reference display are normalized, the intensities thereof are 0.5(64) and 1.0(128), and correspond to BM condition Nos. 9 and 10 used in examples to be described later.

FIGS. 35(F1) and 35(F2) each show a BM structure of BM structure No. 6 represented by four G sub-pixels having small rectangular shapes, which are arranged toward respective four corners in the drawing, at a resolution of 384 dpi. Here, when intensities of the reference display are normalized, the intensities thereof are 0.5(64) and 1.0(128), and correspond to BM condition Nos. 11 and 13 used in examples to be described later.

FIGS. 35(G1) and 35(G2) each show a BM structure of BM structure No. 7 (384 dpi v2) represented by four G sub-pixels having small triangular shapes, which are arranged toward respective four sides in the drawing, at a resolution of 384 dpi. Here, when intensities of the reference display are normalized, the intensities thereof are 0.5(64) and 1.0(128), and correspond to BM condition Nos. 12 and 14 used in examples to be described later.

FIGS. 35(H1) and 35(H2) each show a BM structure of BM structure No. 8 represented by four G sub-pixels having rectangular shapes, which are arranged in the vertical direction in the drawing, at a resolution of 440 dpi. Here, when intensities of the reference display are normalized, the intensities thereof are 0.5(64) and 1.0(128), and correspond to BM condition Nos. 15 and 16 used in examples to be described later.

It should be noted that an example of the reference display is a display LP101WX1(SL) (n3) (manufactured by LG Display Corp.) used in examples.

For example, the conductive film 10, 11, or 11A may be disposed on a display panel of the display unit 30 having the BM pattern 38 formed by the BMs 34 that defines the above-mentioned sub-pixel array pattern of RGB. In this case, the wiring pattern 24 is a regular typical wiring pattern, which is optimized as a combined wiring pattern in terms of visibility of noise with respect to the luminance value of the BM (pixel array) pattern 38 including the sub-pixel array patterns of RGB, or a random pattern or a random mesh pattern which is obtained by making the typical wiring pattern irregular. Therefore, there is weak interference or almost no interference in spatial frequency between the array cycle or the intensity of the pixels 32 of the display unit 30 and the wiring array of the thin metal lines 14 of the conductive film 10, 11, or 11A, and occurrence of moiré and/or noise is suppressed.

However, the pixel array pattern of the display, which is used when optimization of moiré and/or noise is performed, is precisely defined by each sub-pixel array pattern of the plurality of colors such as RGB, for example, repetition frequencies and shapes of the sub-pixels. Therefore, it is necessary to accurately define a resolution of the sub-pixels with respect to the resolution of the display. However, in the present invention, it is necessary to use the light intensity of the pixel array pattern of the display, for example, the luminance value (luminance image data). Therefore, in terms of the intensity frequency, it can be said that it is not necessary to clearly divide RGB since a problem arises in that sub-pixels (indicate a single channel) with a certain intensity are arranged in a certain manner. Consequently, in order to design a regular typical wiring pattern, which is optimal for the display, or the random pattern or the random mesh pattern, which is obtained by making the typical wiring pattern irregular, when indicators, that is, quantitative values of evaluation of moirés or noises are calculated, a worst value thereof at the time of lighting on for each color of RGB may be used.

Next, in the present invention, processes of performing optimization and randomization in terms of visibility of moiré or visibility of noise on a wiring pattern of the conductive film with respect to a predetermined pixel array (BM) pattern of the display device having a predetermined intensity (luminance value) will be described. That is, in the conductive film of the present invention, a description will be given of processes of evaluating and determining a typical wiring pattern, which is optimized such that moiré is not perceived by human visual sensation with respect to the predetermined pixel array (BM) pattern of the display device at the predetermined intensity, a wiring pattern, which is optimized and randomized, and a wiring pattern, which is optimized and randomized such that noise is not perceived by human visual sensation, from at least one point of view.

First, the processes of performing optimization and randomization in terms of visibility of moiré of the wiring pattern of the conductive film will be described.

Figure 36:
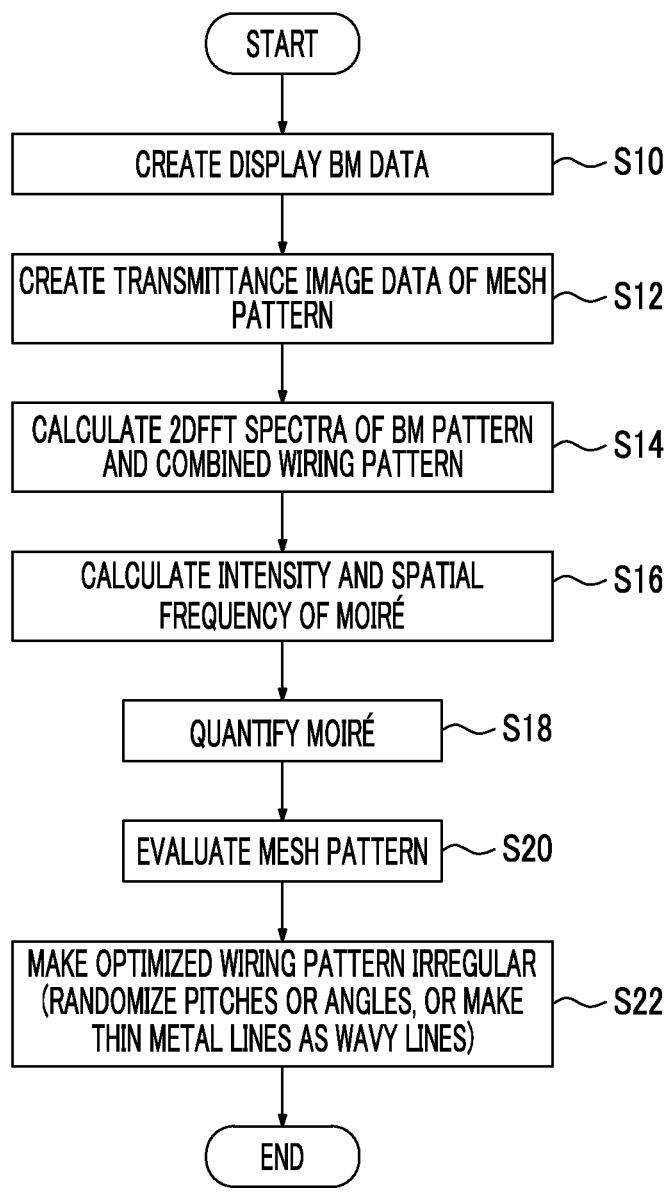
FIG. 36 is a flowchart illustrating an example of a method of evaluating wiring on the conductive film according to the present invention.

FIG. 36 is a flowchart illustrating an example of a method of evaluating a conductive film of an embodiment of the present invention.

In the method of evaluating the wiring pattern of the conductive film of the present embodiment, first, luminance image data of the BM (pixel array) patterns at the time of lighting on for each color of the plurality of colors (for example, RGB) of the display unit of the display device is acquired. Further, transmittance image data of the combined wiring pattern which is formed of the upper and lower rhomboid wiring patterns of the conductive film is acquired.

Next, on the basis of the frequencies and the intensities of moirés which are obtained through frequency analysis using fast Fourier transforms (FFT) of the transmittance image data of the combined wiring pattern and the BM pattern, moirés (frequencies and intensities) of the respective colors with frequencies equal to or less than a highest frequency of moirés and predetermined intensities defined in accordance with a display resolution of the display unit are collected.

Subsequently, evaluation values of moirés of the respective colors are obtained by applying human visual response characteristics to intensities of moirés at the frequencies of the collected moirés of the respective colors in accordance with the observation distance, and an indicator of evaluation (quantitative value) of moirés is calculated on the basis of evaluation values of a plurality of moirés.

Next, a rhomboid wiring pattern, which constitutes a combined wiring pattern satisfying conditions where the calculated indicator of evaluation of moiré is set in advance, is evaluated as a typical wiring pattern optimized such that moiré is not visually perceived, and determined as the optimized typical wiring pattern. Alternatively, the rhomboid wiring pattern is evaluated as a qualified typical wiring pattern which is optimized by making irregularity in a predetermined range, and the evaluated qualified typical wiring pattern is made to be irregular. For example, pitches or angles of shapes of cells of the qualified typical wiring pattern are made to be irregular in a predetermined range. Alternatively, the irregularity in the predetermined range is made by making sides constituting the cells of the qualified typical wiring pattern as wavy lines. Thereby, the rhomboid wiring pattern is determined as a random pattern (random pitch pattern, random angle pattern, random wavy pattern) which is made to be irregular in a predetermined range. In the method according to the present invention, FFT is generally used for the frequencies and intensities of moirés, and the following processes are defined because the frequency and intensities of a target may greatly vary depending on the way of usage.

One of the upper and lower wiring portions 16a and 16b of the conductive film may be formed of the plurality of thin metal lines 14 having the polygonal wiring pattern, and the other wiring portion may be formed as a transparent conductive layer such as ITO having the polygonal wiring pattern. In this case, transmittance image data of the combined wiring pattern of both wiring patterns is indicated by transmittance image data of one polygonal wiring pattern forming of the plurality of thin metal lines 14. However, hereinafter, even in this case, the above-mentioned transmittance image data is treated as transmittance image data of the combined wiring pattern of both polygonal wiring patterns.

In the present invention, first, it is preferable that the following is considered: the display screen of the display unit of the display device is observed from the point of view a on the front as one point of view. In this case, the present invention is not limited to this, but the display screen may be observed from any point of view if visibility of moiré can be improved in a case where observation is performed from at least one point of view.

As might be expected, in the present invention, it is preferable that the following cases are considered: a case where the display screen is observed from the front (a case of front observation); and a case where the display screen is obliquely observed (a case of oblique observation).

Hereinafter, the following item will be described: imaging is performed for each color on the BM (pixel array) pattern which has sub-pixels with three colors such as RGB.

In the method according to the present invention, as shown in FIG. 36, first, in step S10 as process 1, display BM data of the displayed BM, which is projected onto the plane perpendicular to the point of view a, is created.

Figure 37:
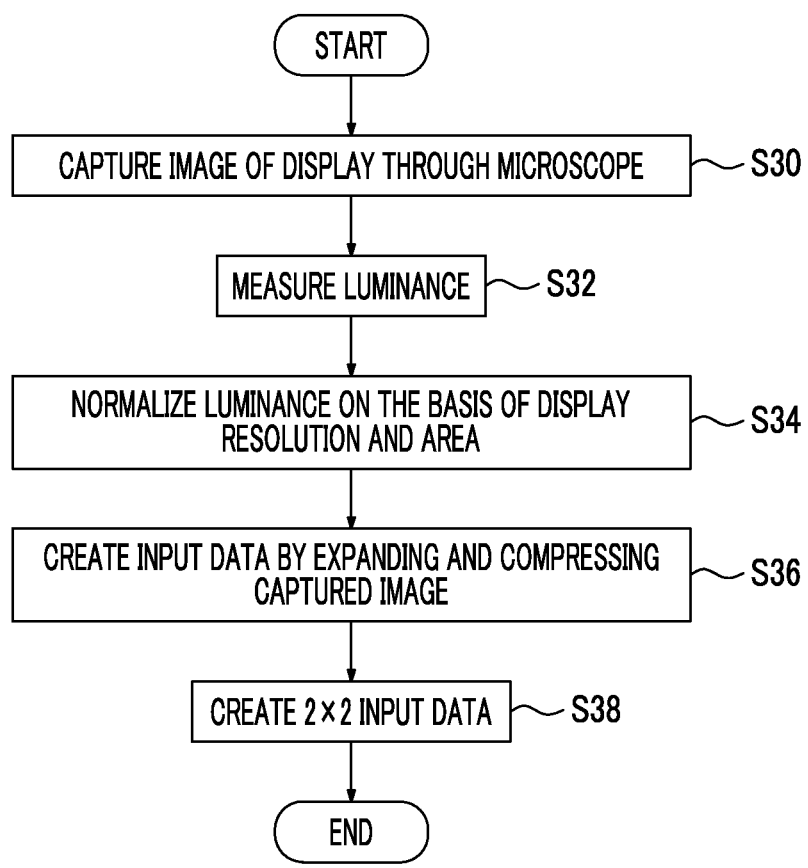
FIG. 37 is a flowchart illustrating a specific example of a method of creating display BM data for a method of evaluating the conductive film of the present invention.

Here, a method of creating display BM data in step S10 is shown in detail in FIG. 37.

FIG. 37 is a flowchart illustrating a specific example of the method of creating the display BM data in the method of evaluating the conductive film of the present embodiment.

As shown in FIG. 37, first, in step S30, imaging of the display is performed using a microscope. That is, in step S30, an image of the display screen (an image of the sub-pixel array pattern of each color) of the display unit of the display device is captured for each color of RGB. At this time, as shown in each of FIGS. 6C, 9C, and 11C, it is preferable that an image of a portion, which is three-dimensionally closest to the plane at the center of the display surface of the three-dimensionally shaped display unit 30 shown in each of FIGS. 6A, 9A, and 11A, is captured, and luminance data of each sub-pixel of the pixels is acquired. The reason for this is that, in the display unit 30, a planar portion has a highest luminance, thus evaluation is performed at the luminance, and thereby it is possible to evaluate moiré and noise of the worst visibility.

In step S30, first, the display unit 30 of the display device 40 is turned on for each color of RGB. At this time, it is preferable that the luminance is maximized in a range in which it can be obtained through setting change of a light emitting side (display device 40).

Subsequently, an image of the sub-pixels is captured in a state where the sub-pixels of each color of RGB are lit on. For example, an image of transmitted light of each of the sub-pixels (RGB color filters) 32r, 32g, and 32b of the pixel array patterns 38 (38a to 38c) of the display unit 30 shown in FIGS. 2, 32B, and 33A to 33C is captured by using a microscope. In the imaging, it is preferable that white balance of a microscope is adjusted to white color of Macbeth chart.

A target display, and a microscope, a lens, and a camera used in imaging are not particularly limited, but, for example, LP101 WX1(SL) (n3) (manufactured by LG DISPLAY Corp.) can be used as the display, STM6 (manufactured by OLYMPUS Corp.) can be used as the microscope, UMPlanFl10x (manufactured by OLYMPUS Corp.) can be used as the lens, and QIC-F-CLR-12-C (manufactured by QIMAGING Corp.) can be used as the camera.

In the example of the present invention, the LP101 WX1(SL) (n3) is used as the display, first, only the G channel is lit on with a maximum (MAX) intensity, the STM6 manufactured by OLYMPUS Corp. is used as the microscope, the UMPlanFl10x manufactured by OLYMPUS Corp. is used as the objective lens, and thereby imaging is performed.

Here, as the imaging conditions, for example, an exposure time period can be set to 12 ms, a gain can be set to 1.0, and white balance (G, R, B) can be set to (1.00, 2.17, 1.12). In addition, it is preferable that the captured image is subjected to shading correction.

Figure 38A:
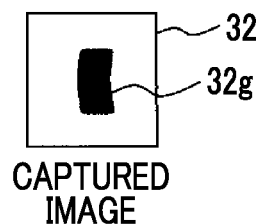
FIG. 38A is a schematic diagram illustrating an example of a captured image of a G sub-pixel of the display unit using the conductive film according to the present invention.

As a result, it is possible to acquire an image of one pixel of a G channel sub-pixel shown in FIG. 38A.

Here, in the present invention, the display is not limited, and any display may be used as a reference display, but it is preferable that the LP101 WX1(SL) (n3) is used as a reference of the display.

Further, the BM pattern of the display LP101 WX1(SL) (n3) has the BM patterns shown in FIGS. 35(A1) and 35(A2). It should be noted that FIGS. 35(A1) and 35(A2) show only G channel patterns but the same configuration is applied to the RB channels.

An image of one pixel of each sub-pixel of the RB channels can also be captured in the same manner as an image of one pixel of the G channel sub-pixel.

Next, after imaging, RGB luminance pixel information (luminance image data) is acquired by measuring spectra of the sub-pixel images through a spectrometer (small fiber optical spectrometer) and performing luminance conversion on the basis of the measured spectrum data.

For example, as described below, RGB sub-pixel (BM) input data may be created using the spectrometer.

Figure 38B:
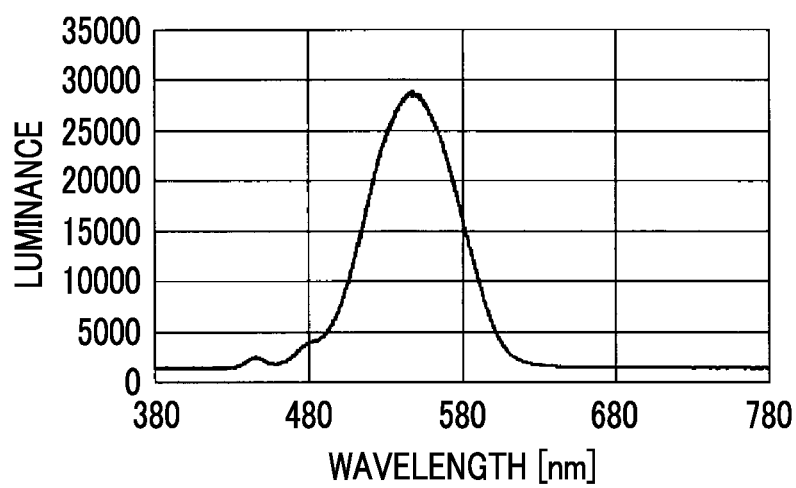
FIG. 38B is a graph illustrating an example of a spectrum of the G sub-pixel.

1. First, in step S32, measurement of the luminances is performed. The sub-pixels of the G channel of the display unit 30 are lit on in a single color, and the G sub-pixels of several pixels, for example, 4 to 16 pixels of the planar portion at the center of the display surface of the display unit 30 are measured by the spectrometer. As a result, for example, spectrum data shown in FIG. 38B can be obtained from the G sub-pixels. Spectrum data can be obtained from the RB sub-pixels in the same manner as the G sub-pixels.

In luminance measurement, a spectrometer USB2000+ manufactured by OCEAN OPTICS Inc. is used, a diffuser plate (CC-3-UV-S manufactured by OCEAN OPTICS Inc.) at the leading end of a fiber of the spectrometer is used, and an integration time period is set to 250 ms.

2. Next, in step S34, the image, which is captured through the microscope in step S30, is masked and binarized, and a mask image is created from image data of the captured image. In a method of creating the mask image, in a case of the G channel, an average value of pixel sizes of the light-on BMs is calculated, and mask data is acquired when the average value is set to a threshold value. Then, the mask image is created. The threshold value is an average value of only the G channel of an image corresponding to one pixel in the captured image. Also in a case of RB channel, in a manner similar to that of the G channel, the mask image is created from the image data of the captured image.

3. Subsequently, the luminance data, which is normalized by a resolution×an area having a mask image value, is given to the obtained mask image, and is set as input data.

Figure 39:
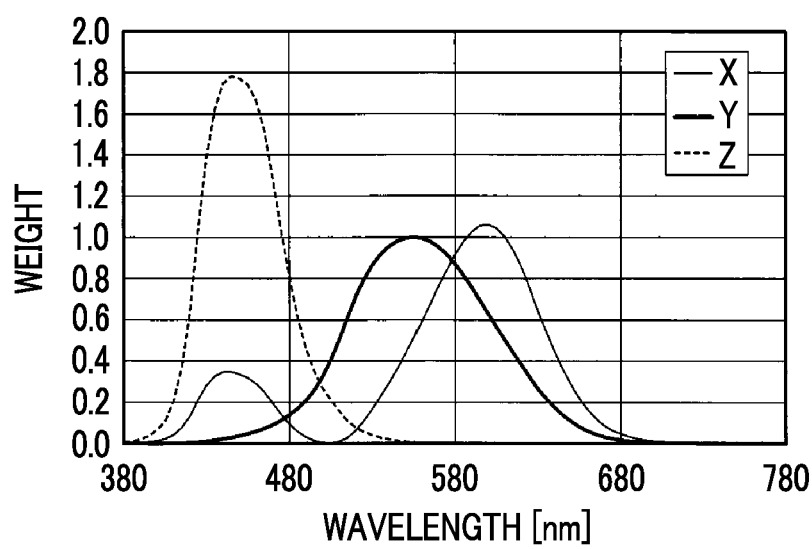
FIG. 39 is a graph illustrating an example of XYZ color matching functions applied to the present invention.

That is, a location of 1 of (0, 1) mask data of the mask image obtained in the section 2 is replaced with an integral value through the XYZ color matching functions shown in FIG. 39 in the spectrum data obtained in the section 1. For example, if the input data of the G sub-pixel is intended to be created, a product (G×Y) between the spectrum data G of G shown in FIG. 38B and the spectrum data Y of the luminance Y of the XYZ color matching function shown in FIG. 39 may be acquired. In addition, if the input data of the B sub-pixel is intended to be created, a product (B×Y) between the spectrum data B of B and the spectrum data Y of the luminance Y of the XYZ color matching function shown in FIG. 39 may be acquired. Likewise, the input data of the R sub-pixel may be created. At this time, the calculated luminance value (luminance data) Y is proportional to an opening area (area having the mask image value) of the sub-pixels and the number of pixels (resolution) included in a sensor of the spectrometer, and is therefore normalized by the number of pixels×the opening area, that is, the resolution×the area having the mask image value. The reason for this is that a macro luminance can be regarded as a value which is obtained by multiplying the opening area of the sub-pixels by the number of pixels included in the sensor in a case where the sub-pixels are regarded as a set of infinitesimal light sources.

Figure 38C:
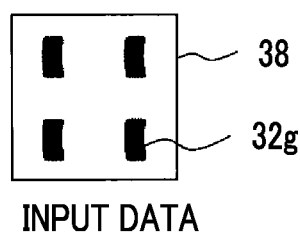
FIG. 38C is a schematic diagram illustrating an example of input data of 2×2 pixels.

Subsequently, in step S36, the resolution of the microscope image is different from desired input data (12700 dpi). Therefore, the input data pieces of the RGB sub-pixels obtained in step S34 each are expanded and compressed (reduced) in a bicubic method, the display luminance of the present example is normalized to 1.0 in step S38, and display BM data (normalized luminance image data) is created as input data of 2 pixels×2 pixels shown in FIG. 38C.

In such a manner, t is possible to acquire the display BM data.

The display BM data, which is obtained in such a manner, becomes normalized luminance image data which is normalized on the basis of the luminance of the reference display. Therefore, even compared with another display, the comparison can be performed on the basis of absolute values.

The display BM data acquired in such a manner is projected onto the plane perpendicular to the point of view a, and thereby the projected display BM data can be acquired.

Meanwhile, before the two-dimensional fast Fourier transform (2DFFT (base 2)) is performed on the display BM data, it is preferable that input data of 2 pixels×2 pixels is repeatedly copied by an integer multiple approximate to an image size of 20000 pix×20000 pix, and thereby the normalized luminance image data is created as input data for moiré evaluation.

It should be noted that the input data pieces of the RGB sub-pixels obtained in step S34 each may be set at a resolution of 12700 dpi which is a high resolution through bilinear interpolation, without creation of the input data of 2 pixels×2 pixels, and an image size thereof may be bicubic-converted into 109 pix (pixels)×109 pix (pixels). It should be noted that, if the resolution of the optical imaging system is given, it is possible to calculate the values in accordance with the resolution.

Subsequently, the normalized luminance image, of which the image size is 109 pix×109 pix, with the resolution of 12700 dpi is repeatedly copied by an integer multiple (183 times) approximate to an image size of 20000 pix×20000 pix for each color of RGB, and thereby the normalized luminance image data as input data for moiré evaluation may be created.

The method of acquiring the display BM data (normalized luminance image data) indicating the RGB luminance pixel information by capturing images of the RGB sub-pixel array patterns of the display unit 30 is not limited to the method of measuring spectra of the respective sub-pixel images through the above-mentioned spectrometer and performing luminance conversion on the basis of the measured spectrum data. The captured image data may be directly converted into luminance values of the respective colors (RGB).

For example, on the basis of captured image data of the captured image of the sub-pixel array pattern of each color, a luminance value of each color (RGB) is converted, and luminance data (total three data pieces) of RGB is created on the basis of a luminance of the display=1.0.

Assuming that red image data is R, green image data is G, blue image data is B, and the luminance value is Y, for conversion from the captured image into the luminance value, Y (luminance value) is calculated through the following conversion Expression (2), and R, G, and B color filter images (luminance ratio images) are created.

$$Y=0.300R+0.590G+0.110B \qquad (2)$$

The maximum value of the G sub-pixel (color filter) image (luminance ratio image) obtained in such a manner is 1.0 (=0.25*255), that is, the luminance images of the R, G, and B sub-pixels as references are normalized. Thereby, a normalized luminance image (image data) of each of the RGB sub-pixels can be created.

Next, in process 2, an image (transmittance image data) of a combined mesh pattern of the upper and lower mesh-shaped wiring patterns 24a and 24b projected onto the plane perpendicular to the point of view a is created. In addition, as described above, in a case where one side surface has the mesh-shaped wiring pattern and the other side surface has a wiring pattern using a transparent conductive layer such as ITO, an image of a combined mesh pattern of both of those is an image of the mesh-shaped wiring pattern on one side surface. Consequently, in this case, the transmittance image data of the combined wiring pattern is created such that values of the transmittance image data of the wiring pattern using the transparent conductive layer are 1.0 as a whole.

As shown in FIG. 36, in step S12, the transmittance image data of the projected combined mesh pattern is created. That is, the transmittance image data of the regular typical polygonal wiring patterns, for example, typical rhomboid wiring patterns 25 (thin metal lines 14) (refer to FIG. 14) projected as the upper and lower mesh-shaped wiring patterns 24a and 24b is created and acquired, and synthetic transmittance image data of a combined wiring (mesh) pattern, in which the upper and lower mesh-shaped wiring patterns 24a and 24b overlap with each other, is created on the basis of the respective acquired transmittance image data pieces. In addition, at least one transmittance image data piece of the combined mesh pattern, that is, the mesh-shaped wiring patterns 24a and 24b may be provided or stored in advance. In this case, transmittance image data may be acquired from the provided or stored transmittance image data. Hereinafter, as a typical example of the typical wiring pattern, the regular typical rhomboid wiring pattern 25 will be described.

The regular rhomboid mesh pattern 25 is, for example, as shown in FIG. 14, a rhomboid pattern in which a predetermined angle of the thin metal lines 14 as wiring with respect to the horizontal line is set. For example, the angle may be set to be less than 45° [deg].

Further, when the transmittance image data of the rhomboid mesh pattern and the transmittance image data of the combined mesh pattern are created, a resolution thereof is set to, for example, 25400 dpi. In addition, the size of the transmittance image data is defined such that the pixel size is set as, for example, an integer multiple of the size (for example, 109 pix×109 pix) of a cyclic unit approximate to 20000 pix×20000 pix, similarly to the BM pattern 38. In such a manner, the transmittance image data can be created with the defined size.

Next, in process 3, by performing two-dimensional fast Fourier transform (2DFFT (base 2)) on each of the normalized luminance image data of the sub-pixels created in process 1 (step S10) and the transmittance image data of the combined mesh pattern created in process 2 (step S12), a spatial frequency of the spectrum peak and a peak spectrum intensity are calculated.

That is, as shown in FIG. 36, in step S14, first, by performing 2DFFT (the image size is 20000 pix×20000 pix) on the transmittance image data of the combined mesh pattern and the luminance image data of the sub-pixel array pattern (BM pattern) of each color of the BM pattern 38 for each color of RGB, Fourier spectra are calculated. Here, it is preferable that normalization is performed such that an intensity of a DC (direct current) component is an average value of an image.

First, the peak frequency and the peak intensity are obtained by performing 2DFFT on the luminance image data for moiré evaluation obtained in step S10. Here, the peak intensity is treated as an absolute value of the Fourier spectrum.

This process is repeatedly performed for each color of RGB. At this time, if all small intensities not contributing to moiré are used, there is concern that calculation may become complicated and accuracy thereof may not be correctly evaluated. Therefore, it is preferable to provide a threshold value on the basis of the intensity. For example, in a case where the absolute value of the spectrum intensity is represented as a common logarithm, it is preferable to employ only a value which is larger than $-2.2$ ($\log_{10}$(intensity)$>-2.2$).

Figure 40A:
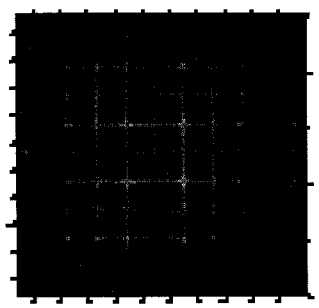
FIGS. 40A and 40B are respectively diagrams illustrating intensity characteristics of two-dimensional Fourier spectra of respective transmittance image data pieces of the pixel array pattern shown in FIG. 35(A1) and the wiring pattern shown in FIG. 14.

FIG. 40A shows an example of intensity characteristics of two-dimensional Fourier spectrum of the luminance image data of the G color (sub-pixel array pattern) obtained in such a manner.

Subsequently, by performing the 2DFFT on the respective transmittance image data pieces of the combined mesh pattern created in such a manner, the peak frequency and the peak intensity of the plurality of spectrum peaks of the two-dimensional Fourier spectra of the respective transmittance image data pieces of the combined mesh pattern are calculated. Here, the peak intensity is treated as an absolute value. For simplification of calculation, for example, in a case where the absolute value of the spectrum intensity is represented as a common logarithm, it is preferable that, only a threshold value of the intensity greater than $-2.0$ is treated.

Figure 40B:
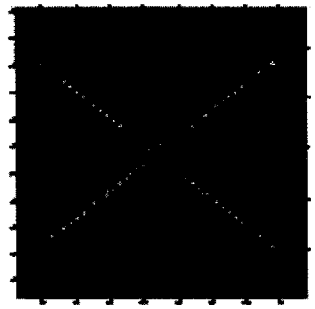

FIG. 40B shows an example of intensity characteristics of the two-dimensional Fourier spectra of the respective transmittance image data pieces of the combined mesh pattern obtained in such a manner.

In a case of changing a point of view, a spatial frequency of the mesh of the combined mesh pattern, an intensity thereof, and a spectrum intensity of the BM are different from those in the front view. For example, if the point of view for the combined mesh pattern is set at 30°, it is preferable that an amount of deviation between the upper mesh pattern and the lower mesh pattern is set in consideration of a substrate thickness (for example, PET: 100 μm). It is preferable that the spectrum intensity of the BM is 0.9 times the intensity thereof in the front view.

As described above, FIGS. 40A and 40B are respectively diagrams illustrating the intensity characteristics of the two-dimensional Fourier spectra of the respective transmittance image data pieces of the combined mesh pattern and the luminance image data of the G color (sub-pixel array pattern) of the BM pattern 38.

In FIGS. 40A and 40B, white portions have high intensities, and indicate spectrum peaks. Therefore, from the results shown in FIGS. 40A and 40B, the peak frequencies and the peak intensities of spectrum peaks are calculated respectively for the transmittance image data of the combined mesh pattern and the luminance data of the BM pattern 38 at the time of lighting on for each color depending on the sub-pixel array patterns of three colors such as RGB of the BM pattern 38. In other words, positions of the spectrum peaks on frequency coordinates in the intensity characteristics of the two-dimensional Fourier spectra of the transmittance image data of the combined mesh pattern and the luminance data of the BM pattern 38 (the sub-pixel array pattern of each color) respectively shown in FIGS. 40A and 40B, that is, the peak positions indicate peak frequencies. The intensities of the two-dimensional Fourier spectra at the peak positions indicate peak intensities.

Here, the peak frequencies and the peak intensities of the spectrum peaks of the combined mesh pattern and each sub-pixel array pattern of the BM pattern 38 are calculated and acquired in a manner similar to that of the following description. Hereinafter, summary thereof will be described. In addition, hereinafter, the luminance data of the BM pattern 38 (the sub-pixel array pattern of each color) at the time of lighting on for each color is simply referred to as each sub-pixel array pattern of the BM pattern 38 represented as the luminance data. The transmittance image data of the combined mesh pattern is simply referred to as the combined mesh pattern represented as the transmittance image data.

Figure 41:
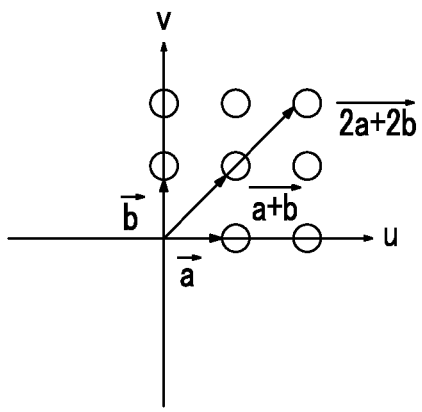
FIG. 41 is a graph illustrating a frequency peak position of the pixel array pattern of the display unit shown in FIG. 35(A1).

First, for peak calculation, the frequency peaks are obtained from basic frequencies of the combined mesh pattern and the sub-pixel array patterns of the BM pattern 38. The reason for this is that, since the luminance image data and the transmittance image data for performing the 2DFFT processing are discrete values, the peak frequency depends on an inverse of the image size. As shown in FIG. 41, each frequency peak position can be represented by combination based on a bar and b bar as independent two-dimensional fundamental frequency vector components. Consequently, it is apparent that the obtained peak positions have a lattice shape.

Figure 42A:
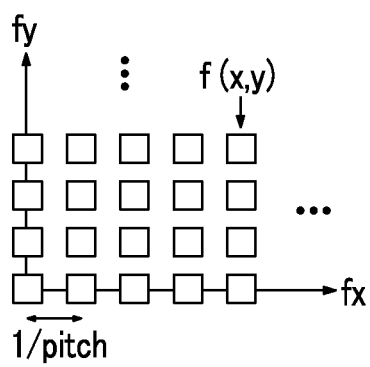
FIG. 42A is a graph illustrating a frequency peak position of an input pattern image.
Figure 42B:
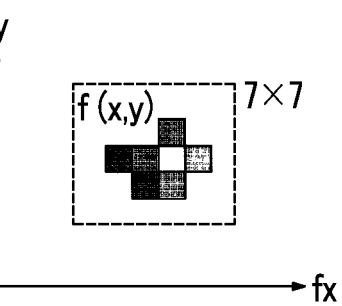
FIG. 42B is a graph illustrating calculation of a peak intensity at the frequency peak position.
Figure 43A:
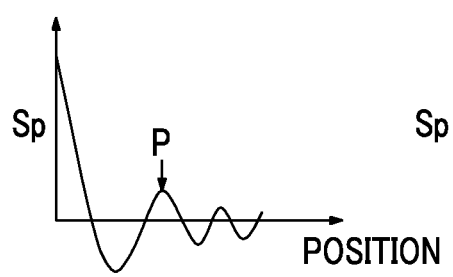
FIGS. 43A and 43B are respectively a graph in which exemplary intensity characteristics of two-dimensional Fourier spectrum are represented by a curve and a bargraph in which the intensity characteristics are represented by bars.
Figure 43B:
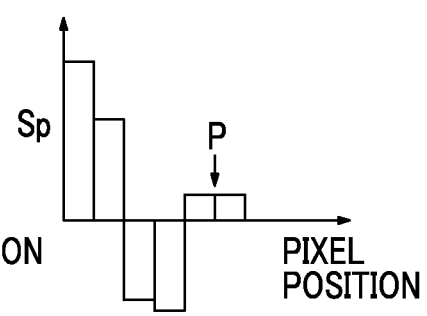

That is, as shown in FIG. 42A, the positions of the spectrum peaks of the combined mesh pattern and the sub-pixel array patterns of the BM pattern 38 on the frequency coordinates fxfy, that is, the peak positions are given as positions of points having a lattice shape on the frequency coordinates fxfy in which an inverse (1/p (pitch)) of the pattern pitch is set as a lattice interval.

In addition, FIG. 41 is a graph illustrating the frequency peak positions in the case of the sub-pixel array pattern of the G color in the BM pattern 38 at the time of emitting G-color light, and the frequency peak positions in a case of the combined mesh pattern can also be obtained in a manner similar to that in the above description.

In contrast, in the process of acquiring the peak intensities, the peak positions are obtained by acquiring the peak frequencies, and thus the intensities (absolute values) of the two-dimensional Fourier spectra at the peak positions are obtained.

Here, it is preferable that the obtained peak intensity is normalized by the image area (image size). For example, it is preferable that the intensity is normalized by the above-mentioned image size (Parseval's theorem).

Next, in process 4, a spatial frequency and an intensity of moiré are calculated from the peak frequencies and the peak intensities of the transmittance image data of the combined mesh pattern and the peak frequencies and the peak intensities of the luminance data of the BM pattern 38 at the time of lighting on for each color of RGB obtained in process 3 (step S14).

Specifically, as shown in FIG. 36, in step S16, the frequencies and the intensities of moirés for respective colors are calculated from the peak frequencies and the peak intensities of both two-dimensional Fourier spectra of the mesh pattern and the sub-pixel array patterns of the respective RGB colors of the BM pattern 38 respectively calculated in step S14. Here, the peak intensities and the intensities of moirés are also treated as absolute values.

Here, spatial frequencies and intensities of moirés can be calculated through a convolution operation of the peak frequencies and the peak intensities of the sub-pixel array patterns of the respective RGB colors and the peak frequency and the peak intensity of the mesh pattern 24.

In real space, moiré is caused by multiplication of the image data pieces (the transmittance image data and the luminance image data) of the combined mesh pattern of the conductive film 10 and the sub-pixel array pattern of the BM pattern 38 at the time of lighting on for each color. Thus, in frequency space, both image data pieces are subjected to convolution integration (convolution). However, in steps S14 and S16, the peak frequencies and the peak intensities of both two-dimensional Fourier spectra of the combined mesh pattern and the sub-pixel array pattern of each color of the BM pattern 38 are calculated. Therefore, a difference (an absolute value of a difference) between both frequency peaks of the combined mesh pattern and the sub-pixel array pattern of a single color of RGB is obtained, the obtained difference is set as a frequency of moiré, a product between two sets of vector intensities obtained by combining both is obtained, and the obtained product is set as an intensity (absolute value) of moiré.

The frequency of moiré and the intensity of moiré are obtained for each color of RGB.

Here, the difference between the frequency peaks of the intensity characteristics of both two-dimensional Fourier spectra of the combined mesh pattern and the sub-pixel array pattern of each color of the BM pattern 38 respectively shown in FIGS. 40A and 40B corresponds to a relative distance between the peak positions of both frequency peaks on the frequency coordinates, in intensity characteristics obtained by superimposing the intensity characteristics of both two-dimensional Fourier spectra for each color.

A plurality of spectrum peaks of both two-dimensional Fourier spectra between the combined mesh pattern and the sub-pixel array pattern of each color of the BM pattern 38 is present for each color. Therefore, a plurality of the differences between the frequency peaks which are values of the relative distances, that is, a plurality of the frequencies of moiré is obtained. Consequently, if there are multiple spectrum peaks of both two-dimensional Fourier spectra, there are multiple obtained frequencies of moiré, and thus there are multiple obtained intensities of moiré.

However, in a case where the intensities of moiré at the obtained frequencies of moiré are weak, moiré is not visually perceived. Thus, it is preferable to deal with only moiré of which the intensity of moiré is regarded to be weak and is equal to or greater than a predetermined value, for example, moiré of which the intensity is equal to or greater than −4.5.

Here, in the display device, the display resolution is determined, thus the highest frequency, at which display can be performed on the display device, is determined depending on the resolution thereof. Hence, moiré having a frequency higher than the highest frequency is not displayed on the display device, and therefore it is not necessary to set the moiré as an evaluation target in the present invention. Accordingly, the highest frequency of moiré can be defined in accordance with the display resolution. Here, the highest frequency of moiré, which has to be considered in the present invention, can be set to 1000/Pd (cycle/mm) when the pixel pitch of the pixel array pattern of the display is Pd (μm).

From the above description, in the present invention, in the frequencies and the intensities of moiré obtained from the spectrum peaks of both two-dimensional Fourier spectra, moiré as the evaluation (quantification) target in the present invention is moiré, of which a frequency is equal to or less than the highest frequency of moiré of 1000/Pd defined in accordance with the target display resolution (for example, 151 dpi in the present example), and moiré of which an intensity of moiré is equal to or greater than −4.5. In the present invention, the reason why moiré having the intensity of moiré equal to or greater than −4.5 is set as a target is as follows. If multiple moirés of which the intensity is less than −4.5 occur and thus the sum thereof is used, even originally invisible moiré may have to be scored. For this reason, in the present invention, a threshold value, which is equal to or greater than −4.5, is provided from an empirical visibility limit.

Next, in process 5, moiré is quantified using the frequency and the intensity of moiré for each sub-pixel of each color of RGB calculated in process 4 (step S16), and a quantitative value as an indicator of evaluation of moiré is obtained.

That is, as shown in FIG. 36, in step S18, convolution of the visual transfer function (VTF) and the spectrum peaks for moiré evaluation remaining in step S16 is performed, and quantified.

Before quantification of moiré, if there are multiple spectrum peaks of both two-dimensional Fourier spectra, there are multiple obtained frequencies of moiré, and thus it takes time to perform calculation processing. In such a case, the spectrum peaks of both two-dimensional Fourier spectra are provided in advance, spectrum peaks having weak peak intensities may be excluded, and only spectrum peaks having certain strong intensities may be selected. In that case, only the differences between the selected peaks are obtained, and thus it is possible to shorten the calculation time.

For example, as a target, convolution of the moiré spectrum and a visual transfer function (VTF: refer to the following expression (1)) (the VTF is set to 1.0 in a low frequency region less than a frequency at which the VTF has the maximum value, but the 0 frequency component is set to 0) at the observation distance of 400 mm is performed, and thereafter it is possible to deal with only moirés with an intensity of −3.8 or more.

Here, in order to extract only moirés which are visually perceived through human eyes, the VTF corresponding to the observation distance of 400 mm is used on the basis of scattering effects in a system.

The spectrum peaks, which remain in such a manner, can be set as spectrum peaks for moiré evaluation. At this time, it is preferable that only peaks equal to or greater than −3.8 as a common logarithm are used as the spectrum intensities. Thereby, it is possible to extract perceived moirés.

Figure 44:
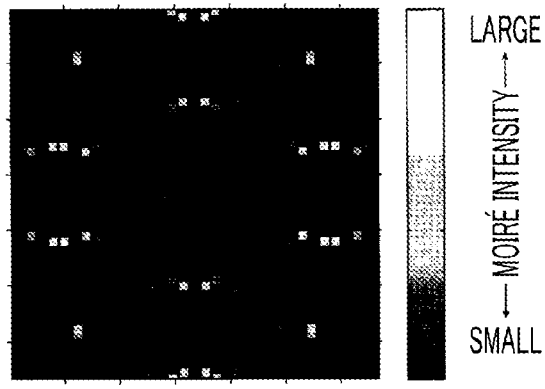
FIG. 44 is a schematic explanatory diagram schematically illustrating frequencies of moiré and intensities of moiré caused by interference between the pixel array pattern shown in FIG. 35(A1) and the wiring pattern shown in FIG. 14.

FIG. 44 shows frequencies of moiré and intensities of moiré obtained in such a manner. FIG. 44 is a schematic explanatory diagram schematically illustrating the frequencies of moiré and the intensities of moiré caused by interference between the pixel array pattern shown in FIG. 35(A1) and the typical wiring pattern shown in FIG. 14. Those may be results of convolution integration of intensity characteristics of the two-dimensional Fourier spectra shown in FIGS. 40A and 40B.

In FIG. 44, the frequencies of moiré are represented by position on the vertical and lateral axes, and the intensities of moiré are represented by gray (achromatic color) density, where as the thickness of the color decreases and the color becomes white, the frequency increases.

In the quantification of moiré, specifically, in step S18, in the frequencies and the intensities (absolute values) of moirés for the sub-pixels of the respective colors of RGB obtained in step S16, a plurality of evaluation values of moirés of the respective colors is calculated by applying human visual response characteristics (VTF) corresponding to the observation distance of 750 mm as an example of human visual response characteristics represented by the following Expression (1), that is, by performing convolution integration. Here, in order to score moiré, the VTF corresponding to the observation distance of 750 mm is used.

$$VTF = 5.05 e^{-0.138\,k}(1 - e^{0.1\,k}) \quad (1)$$

$$k = \pi du / 180$$

Here, k is a spatial frequency (cycle/deg) defined by a solid angle, u shown in the above-mentioned Expression (1) is a spatial frequency (cycle/mm) defined by a length, and d is defined by an observation distance (mm).

The visual transfer function represented in the above-mentioned Expression (1) is called a Dooley-Shaw function, and is obtained with reference to description of a reference (R. P. Dooley, R. Shaw: Noise Perception in Electrophotography, J. Appl. Photogn. Eng., 5, 4 (1979), pp. 190-196.).

In such a manner, it is possible to obtain the evaluation value of moiré using a common logarithm of the intensity for each color of RGB.

Here, the above-mentioned steps S10 to S18 are repeated for each color of RGB, and the evaluation values of moirés of RGB may be obtained. However, in each step of the above-mentioned steps S10 to S18, the calculation may be performed for each color of RGB.

A worst value, that is, a maximum value among the evaluation values of moirés of RGB obtained in such a manner is set as the indicator of evaluation (quantitative value) of moiré. A value of the indicator of evaluation of moirés is obtained as a value (common logarithm value) of a common logarithm of the indicator of evaluation of moirés represented by a common logarithm is obtained. It is preferable that evaluation is also performed by combining an evaluation image with RGB display in accordance with calculation of the worst value.

It can be said that the quantitative value of moiré, which is the indicator of evaluation of moiré, is a value of quantification of moiré and noise in the related art. In the present invention, noise is defined as a state in which a lot of moirés are present. Accordingly, in the present invention, if there is a peak in a single frequency, it is determined that moiré is present. In contrast, if there is a plurality of peaks in the vicinity of a single frequency, it is determined that noise is present.

The above-mentioned indicator of evaluation of moiré is obtained in a case where the conductive film 10 laminated on the display screen of the display unit 30 of the display 40 is observed from the front of the display screen. However, the present invention is not limited to this, and the indicator of evaluation of moiré in a case where observation is performed in a direction oblique to the front may be obtained.

In the case where the indicator of evaluation of moiré is obtained in a case where observation is performed in a direction oblique to the front, the intensities of RGB of the display 40 at the time of oblique observation are calculated at 90% of the luminance at the time of front observation, the process returns to step S14, and the peak frequencies and the peak intensities of the Fourier spectra of the respective colors are calculated again. Thereafter, steps S16 to S18 are repeated in a similar manner, and the indicator of evaluation of moiré at the time of oblique observation is calculated.

In such a manner, if the indicators of evaluation of moiré are calculated at the time of front observation and oblique observation, a large value (worst value) among the indicators of evaluation of moiré at the time of front observation and oblique observation is calculated as the indicator of evaluation of moiré to be provided for moiré evaluation.

In a case where only one of the front observation and the oblique observation is not performed, the indicator of evaluation of moiré at the front observation or the oblique observation is set as the indicator of evaluation of moiré to be directly provided for moiré evaluation.

Next, in process 6, evaluation of the wiring pattern is performed on the basis of the indicator of evaluation (quantitative value: worst value) of moiré calculated in process 5 (step S18).

That is, as shown in FIG. 36, in step S20, if a common logarithm value of the indicator of evaluation of moiré of the current combined mesh pattern obtained in step S18 is equal to or less than a predetermined evaluation threshold value, it is evaluated that the typical rhomboid mesh patterns constituting the current combined mesh pattern are optimized typical rhomboid mesh patterns applied to the conductive film 10 of the present invention, and the typical rhomboid mesh patterns are set as typical wiring patterns 25 having the optimized rhomboid mesh shapes shown in FIG. 14.

In contrast, if a common logarithm value of the indicator of evaluation of moiré is equal to or less than a predetermined evaluation threshold value appropriate for randomization, the typical rhomboid mesh patterns constituting the current combined mesh pattern are randomized, and are evaluated as typical rhomboid mesh patterns appropriate for randomization through which the patterns are formed as random patterns optimized to be applied to the conductive film 10 of the present invention. As a result, the typical rhomboid mesh patterns are set as qualified typical rhomboid mesh patterns.

It should be noted that the reason why the value of the indicator of evaluation of moiré is limited to be equal to or less than the predetermined evaluation threshold value as a common logarithm is as follows. If the value is greater than the predetermined evaluation threshold value, when the optimized typical rhomboid mesh patterns 25 are used as the wiring patterns, and when the random patterns 25a, 25b, and 25c shown in FIGS. 15, 16, and 17 are used as wiring patterns, moiré, which is caused by interference between each sub-pixel array pattern of the BM pattern and the wiring pattern overlapping with each other, is visually perceived, and the visually perceived moiré is recognized as deterioration by a user who observes the moiré, and offers a sense of discomfort to the user. Here, the random patterns 25a, 25b, and 25c are obtained by providing a degree of randomicity equal to or less than the predetermined threshold value to the qualified typical rhomboid mesh pattern (by making the pitches and the angles irregular and by making the lines as wavy lines). In a case where the value of the indicator of evaluation of moiré is equal to or less than the predetermined evaluation threshold value, the moiré does not matter even when recognized as deterioration.

Here, the predetermined evaluation threshold value is appropriately set in accordance with shapes and properties of the conductive film and the display device. The shapes and properties includes a line width of the thin metal line 14 of the typical mesh pattern 25, a shape, an angle, and a size (such a pitch) of the opening portion 22, a phase angle (a rotation angle, and a deviation angle) of the wiring pattern of two wiring layers, a shape, a size (such a pitch), and an arrangement angle of the BM pattern 38, and the like. However, in a case where the typical mesh patterns 25 are optimized such that moiré is not visually perceived, for example, the predetermined value is preferably equal to or less than $-3.17$ ($10^{-3.17}$ as an antilogarithm) as a common logarithm. That is, for example, the indicator of evaluation of moiré is preferably equal to or less than $-3.17$ ($10^{-3.17}$ as an antilogarithm) as a common logarithm.

It should be noted that, in a case where the random pattern randomized by making the typical mesh pattern 25 irregular is optimized such that moiré is not visually perceived, for example, the indicator is preferably equal to or less than $-2.80$ ($10^{-2.80}$ as an antilogarithm) as a common logarithm, more preferably equal to or less than $-3.17$ ($10^{-3.17}$ as an antilogarithm) as a common logarithm, and yet more preferably equal to or less than $-4.00$ ($10^{-4.00}$ as an antilogarithm) as a common logarithm. Consequently, the indicator of evaluation of moiré is preferably equal to or less than $-2.80$ ($10^{-2.80}$ as an antilogarithm) as a common logarithm, more preferably equal to or less than $-3.17$ ($10^{3.17}$ as an antilogarithm) as a common logarithm, and yet more preferably equal to or less than $-4.00$ ($10^{-4.00}$ as an antilogarithm) as a common logarithm.

Although described in detail later, the indicator of evaluation of moiré is obtained for each of the multiple combined mesh patterns, each of which is formed by overlapping various regular typical rhomboid mesh patterns 25, by using simulation samples and real samples. Thereafter, a randomized combined mesh pattern is formed by using a random mesh pattern 25a or 25b, which is obtained by providing a degree of randomicity equal to or less than the predetermined threshold value to pitches or angles of the cells 22 of at least one typical mesh pattern 25, or by using a mesh pattern 25c which is obtained by making the sides of the cells 22 as wavy lines such that a degree of randomicity equal to or less than the predetermined threshold value is provided thereto. Three functional evaluators perform functional evaluation on moiré, which is caused by interference between the sub-pixel array pattern of each color of three colors such as RGB of the BM pattern and the randomized combined mesh pattern and the combined mesh pattern (not randomized) obtained by overlapping the typical mesh patterns 25, with their own eyes. If the indicator of evaluation of moiré is equal to or less than $-3.17$ as a common logarithm in a case where randomicity is not provided, and if the indicator is equal to or less than $-2.80$ as a common logarithm in a case where randomicity is provided, in a state where the display is lit on, in terms of visibility of moiré which is caused by interference between the superposed combined mesh pattern and the sub-pixel array pattern of each color of three colors such as RGB of the BM pattern, a level of the moiré is better than a level of moiré which does not matter even when recognized as deterioration.

Consequently, in the combined mesh pattern optimized in the present invention and the typical rhomboid mesh patterns 25 as components thereof, the indicator of evaluation of moiré is preferably specified to be equal to or less than $-3.17$ ($10^{-3.17}$ as an antilogarithm) as a common logarithm in a case where randomicity is not provided, and specified to be equal to or less than $-2.80$ ($10^{-2.80}$ as an antilogarithm) as a common logarithm in a case where randomicity is provided.

It is apparent that a plurality of optimized mesh patterns 25 in cases where randomicity is provided and not provided is obtained in accordance with the line width of the thin metal line 14 of the typical mesh pattern 25, the shape of the opening portion 22, the size (pitch and angle), a phase angle (a rotation angle, and a deviation angle) of the typical mesh pattern 25 of two wiring layers, and the like in cases where randomicity is provided and not provided. Here, a typical mesh pattern 25 having a small common logarithm value of the indicator of evaluation of moiré may be a best typical mesh pattern 25, and the plurality of optimized typical mesh patterns 25 may be prioritized.

It should be noted that, in a case where the following indicator of evaluation of moiré is specified to be equal to or less than $-3.17$ as a common logarithm, the specified typical mesh pattern 25 is determined and evaluated as an optimized wiring pattern of the conductive film of the present invention.

Meanwhile, in a case where the qualified typical mesh pattern having rhomboids is set in process 6 (step S20), a qualified typical mesh pattern set in process 7 is made to be irregular.

As shown in FIG. 36, in step S22, angles and pitches of cells 22 of the rhomboid shapes of the qualified typical mesh (wiring) pattern 25 which is set in step S20 and shown in FIG. 14 are made to be irregular in a predetermined range, or sides of the cells 22 are made as wavy lines so as to be irregular, whereby the wiring patterns 25a, 25b, and 25c shown in FIGS. 15, 16, and 17 are obtained, and are determined and evaluated as wiring patterns on the conductive film of the present invention.

Here, application of predetermined irregularity in step S22 can be performed as follows.

First, a description will be given of the following case: in the qualified wiring pattern 25 shown in FIG. 14, the pitches of the rhomboid shapes of the cell 22 are made to be irregular in a predetermined range, whereby a random parallelogram pattern 25a shown in FIG. 15 is created.

That is, in the rhomboid shape of the regular typical wiring pattern 25 shown in FIG. 14, a pitch P of the rhomboid shape is made to be irregular in a predetermined manner by shifting some thin metal lines by a predetermined distance in parallel with two sides of the rhomboid facing each other. As a result, it is possible to obtain the randomized parallelogram wiring pattern 25a shown FIG. 15.

At this time, the two sides facing each other are maintained to be parallel with each other, and an angle θ is maintained. Therefore, the rhomboid shape of each cell 22 is changed to a parallelogram shape. In a case where one line constituting the rhomboid is shifted in such a manner, the angle θ of the rhomboid is maintained before and after the pitch is made to be irregular. Consequently, the pitch P of the rhomboid is randomly changed, and the angle θ is maintained. Therefore, the pattern can be regarded as an angle maintenance pattern in which the pitch P of the rhomboid is randomly changed and the angle θ is kept constant.

In the present invention, irregularity is defined by a distribution of the pitches of the parallelograms made to be irregular to the pitches of the rhomboids which are not made to be irregular in the regular typical wiring pattern 25, for example, an average proportion based on a normal distribution or a uniform distribution.

In the present invention, a predetermined limit range of the irregularity defined as described above is preferably greater than 0% and equal to or less than 10%, more preferably in range of 2% to 10%, and yet more preferably in a range of 2% to 8%.

Here, the reason why the irregularity is limited in the predetermined limit range is as follows. In the limit range, occurrence of moiré is suppressed, and image quality can be improved in terms of visibility of moiré, and occurrence of moiré can be further suppressed even in a case where the overlapping BM patterns are slightly changed. As a result, it is possible to maintain excellent performance in terms of visibility of moiré. However, if the irregularity is out of the limit range, it is not possible to obtain the effect of application of the irregularity.

The method of making the pitches of the cells of the regular typical mesh pattern irregular in the predetermined range can be performed as described above.

Next, a description will be given of the following case: in the qualified wiring pattern 25 shown in FIG. 14, the angles of the rhomboid shapes of the cell 22 are made to be irregular in a predetermined range, whereby a random quadrilateral pattern 25b shown in FIG. 16 is created.

First, in the rhomboid shapes of the qualified wiring pattern 25 shown in FIG. 14, one side of two sides of each rhomboid facing each other is inclined at a predetermined angle so as not to be parallel with the other side thereof. Thereby, the angles θ of the rhomboid shapes are made to be irregular in a predetermined manner. As a result, it is possible to obtain the random wiring pattern 25b which is randomized as shown in FIG. 16.

At this time, each angle formed between two sides facing each other is changed and is not kept parallel with each other, and thereby the rhomboid shape of each opening portion is changed to a quadrilateral. In a case where one line constituting the rhomboid is inclined to the other one line facing the line in such a manner, before and after application of irregularity, the angle of the rhomboid, such as the angle formed between the adjacent sides or the angle formed between one straight line and the side of the rhomboid intersecting therewith, is changed. Accordingly, the angles θ are randomly changed, and the pitches p of the rhomboids are changed in accordance with changes in angles θ. That is, the angles θ of the rhomboids are randomly changed, and as a result, a pattern, in which the pitches p are changed in accordance with changes in angles θ, can be formed.

In the present invention, irregularity is defined by an average proportion based on a normal distribution of the pitches of the quadrilaterals made to be irregular to the pitches of the rhomboids not made to be irregular in the typical wiring pattern 25.

In the present invention, a predetermined limit range of the irregularity defined as described above is preferably greater than 0% and equal to or less than 3%, more preferably in range of 0.2% to 3%, and yet more preferably in a range of 0.5% to 3%.

Here, the reason why the irregularity is limited in the predetermined limit range is as follows. In the limit range, occurrence of moiré is further suppressed, and image quality can be further improved in terms of visibility of moiré, and occurrence of moiré can be further suppressed even in a case where the overlapping BM patterns are slightly changed. As a result, it is possible to maintain excellent performance in terms of visibility of moiré. However, if the irregularity is out of the limit range, it is not possible to obtain the effect of application of the irregularity.

The method of making the angles of the cells of the regular typical mesh pattern irregular in the predetermined range can be performed as described above.

Next, a description will be given of the following case: in the qualified typical wiring pattern 25 shown in FIG. 14, by making the sides of the rhomboid shapes of the cells 22 as wavy lines, the rhomboid shapes of the cells 22 are made to be irregular in a predetermined range, whereby a random wavy wiring pattern 25c shown in FIG. 17 is created.

First, the typical wiring pattern 25 shown in FIG. 14 is made to be irregular in a predetermined manner by deforming thin metal lines 14 constituting the sides of the cells 22 in a shape of wavy lines with a predetermined amplitude $A_0$, a predetermined wavelength λ, and a predetermined phase α. As a result, it is possible to obtain a random wavy pattern 25c which is randomized as shown in FIG. 17.

At this time, each center line of the wavy lines of the thin metal lines 14, which constitute the random wavy pattern 25c shown in FIG. 17, coincides with each straight line of the thin metal lines 14 of the typical wiring pattern 25 shown in FIG. 14. Accordingly, the opening portions (cells), which are formed by the center lines of the wavy lines of the random wavy pattern 25c, coincide with the cells 22 of the rhomboid shapes of the typical wiring pattern 25 shown in FIG. 14. Therefore, the cells 22 of the random wavy pattern 25c have shapes the same as shapes of the respective sides of the cells 22 having the rhomboid shapes made as wavy lines.

In the present invention, irregularity is defined by proportions (%) of the amplitude $A_0$, the wavelength λ, and the phase α of each wavy line of the random wavy pattern 25c, which is made to be irregular, to the pitch of each rhomboid shape of the cell 22 of the typical rhomboid wiring pattern 25, that is, the rhomboid shape which is not made to be irregular.

In the present invention, a predetermined limit range of the irregularity defined as described above is preferably a range in which the amplitude $A_0$ of the wavy line is equal to or greater than 2.0% and equal to or less than 20% of the pitch of the cell 22 of the rhomboid of the typical rhomboid wiring pattern 25.

Here, the reason why the irregularity is limited in the predetermined limit range is as follows. In the limit range, occurrence of moiré is further suppressed, and image quality can be further improved in terms of visibility of moiré, and occurrence of moiré can be further suppressed even in a case where the overlapping BM patterns are slightly changed. As a result, it is possible to maintain excellent performance in terms of visibility of moiré. However, if the irregularity is out of the limit range, it is not possible to obtain the effect of application of the irregularity.

The application of the predetermined irregularity in step S22 can be performed as described above.

In such a manner, the method of evaluating wiring patterns on the conductive film of the present invention is terminated, and the evaluated typical wiring pattern and random wiring pattern can be evaluated and determined as wiring patterns on the conductive film of the present invention.

As a result, the BM pattern of the display unit of the display device in a state of lighting on is superposed such that occurrence of moiré is suppressed. Thus, also for the display device with a different resolution, it is possible to provide the conductive film of the present invention which is excellent in visibility of moiré regardless of the observation distance and has the optimized typical wiring pattern and the optimized irregular wiring pattern.

In the present invention, the typical wiring pattern, which is optimized with respect to the predetermined BM pattern, is evaluated, and the typical wiring pattern, which is qualified with respect to the predetermined BM pattern, is made to be irregular in the above-mentioned predetermined range. Therefore, occurrence of moiré is suppressed, and image quality becomes excellent in terms of visibility of moiré. Further, in a case where the optimized typical wiring pattern is further made to be irregular in the above-mentioned predetermined range, occurrence of moiré is further suppressed, and image quality becomes further excellent in terms of visibility of moiré. Even in a case where the BM patterns overlapping each other slightly change, it is possible to suppress occurrence of moiré, and it is possible to maintain excellent performance in terms of visibility of moiré.

Next, a description will be given of processes of performing optimization and randomization in terms of visibility of noise on a wiring pattern of the conductive film with respect to a predetermined pixel array (BM) pattern of the display device having a predetermined intensity (luminance value) in a state where projection is performed on the plane perpendicular to the point of view a in the present invention.

That is, a description will be given of the processes of evaluating and determining an irregular (random) wiring pattern which is optimized such that noise with respect to a predetermined projected pixel array (BM) pattern of the display device with a predetermined intensity is not perceived by human visual sensation, from at least one point of view, in the conductive film according to the present invention.

Figure 45:
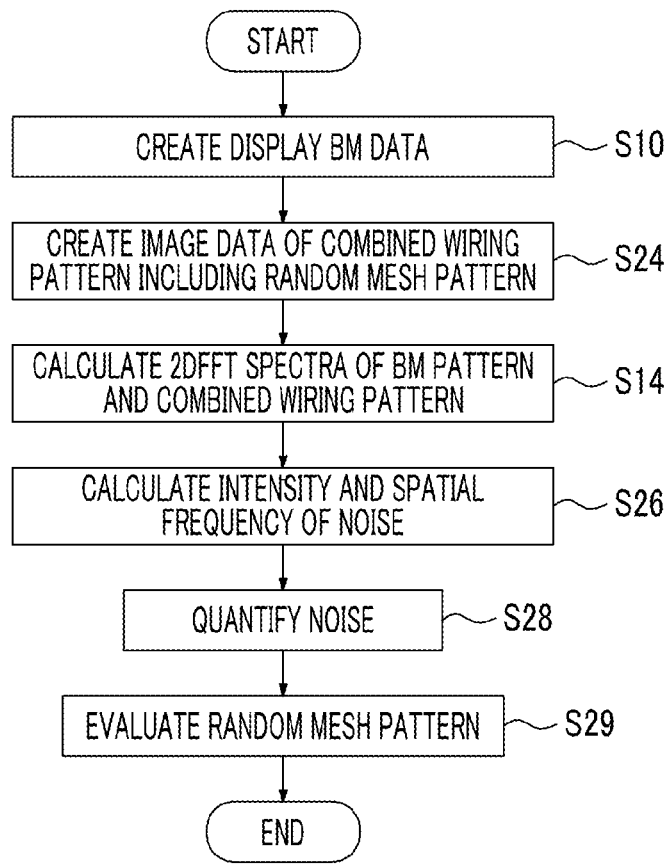
FIG. 45 is a flowchart illustrating an example of a method of evaluating wiring on the conductive film according to the present invention.
Figure 48:
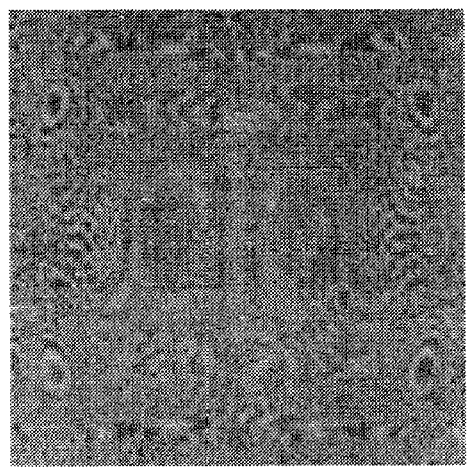
FIG. 48 is a schematic diagram of moiré which is visually perceived through the conductive film having a three-dimensionally projected wiring pattern in a used state shown in FIG. 47B.

FIG. 45 is a flowchart illustrating an example of a method of evaluating a conductive film of another embodiment of the present invention.

The method of evaluating the conductive film of the present embodiment shown in 45 is different from the method of evaluating the conductive film of the above-mentioned embodiment shown in FIG. 36 in terms of following points: instead of evaluating the typical wiring pattern by calculating the indicator of evaluation of moiré, the random mesh pattern is evaluated by calculating the indicator of evaluation of noise; and instead of creating the combined wiring pattern of the typical wiring patterns and providing randomicity after evaluation using the indicator of evaluation of moiré, the random mesh pattern is created in advance, and the combined wiring pattern is created. However, the step of creating the BM data of the display in step S10 is exactly the same as that in the above-mentioned method, and the step of calculating a two-dimensional fast Fourier transform (2DFFT) spectrum of the combined wiring pattern and the BM pattern of step S14 is similar thereto, and some other parts are also similar thereto. Therefore, hereinafter, detailed description of similar parts will be omitted.

In the method of evaluating the wiring pattern of the conductive film of the present embodiment, first, luminance image data of the BM (pixel array) patterns at the time of lighting on for each color of the plurality of colors (for example, RGB) of the display unit of the display device is acquired. Further, the irregular wiring pattern used in one of the upper and lower sides of the conductive film and the wiring pattern used in the other are generated, whereby the transmittance image data is acquired, and the transmittance image data of the combined wiring pattern is acquired. Here, the wiring pattern used in the other may be the irregular wiring pattern, and may be the regular wiring pattern.

Next, on the basis of the frequencies and the intensities of noises which are obtained through frequency analysis using fast Fourier transforms (FFT) of the transmittance image data of the combined wiring pattern and the BM pattern, noises (frequencies and intensities) of the respective colors with frequencies equal to or less than a highest frequency of noises and predetermined intensities defined in accordance with a display resolution of the display unit are collected.

Subsequently, evaluation values of noises of the respective colors are obtained by applying human visual response characteristics to intensities of noises at the frequencies of the collected noises of the respective colors in accordance with the observation distance, and an indicator of evaluation (quantitative value) of noises is calculated on the basis of obtained quantitative values of the plurality of noises.

Next, an irregular wiring pattern, which constitutes a combined wiring pattern satisfying conditions where the calculated indicator of evaluation of noise is set in advance, is evaluated as a wiring pattern optimized such that noise is not visually perceived, and determined as the optimized wiring pattern.

In the method according to the present invention, as shown in FIG. 45, first, in step S10 as process 1, in order to deal with display quantitatively, transmittance image data (BM data) of the display is created.

Here, the method of creating the display BM data performed in step S10 is different from the method of evaluating wiring patterns of the conductive film of the above-mentioned embodiment in terms of evaluation of moiré and evaluation of noise, but otherwise those are exactly the same. Accordingly, the method may be performed in exactly the same way in accordance with the flow of the method of creating the display BM data shown in FIG. 37.

Next, in process 2, in order to quantify the mesh-shaped wiring pattern 24 of the conductive film 10, an image (transmittance image data) of a combined wiring pattern of the upper and lower wiring patterns 24a and 24b of the conductive film 10 is created. It should be noted that at least one of the wiring patterns 24a and 24b is an irregular mesh pattern (hereinafter referred to as a random mesh pattern). As described above, the random mesh pattern may be on one single side, and a wiring pattern using the transparent conductive layer such as ITO may be on the other single side. In this case, an image (transmittance image data) of a combined wiring pattern of both is indicated by an image (transmittance image data) of the random mesh pattern on the single side.

As shown in FIG. 45, in step S24, the transmittance image data of the combined wiring pattern including the random mesh pattern is created.

Here, the transmittance image (data) of the random mesh pattern 25d used as at least one of the upper and lower wiring patterns 24a and 24b is created. In the process, first, as shown in FIG. 28 mentioned above, it is preferable that dots are generated at a plurality of positions randomly selected with arbitrary intervals in a planar region 100 and the dots are set as a plurality of seed points p. Next, as shown in FIG. 27, it is preferable that the random mesh pattern 25d having Voronoi polygons, which are determined in accordance with the Voronoi diagram (Voronoi division method) on the basis of dot data of the obtained plurality of seed points, as the opening portions 22 is created, and the transmittance image data is acquired. In addition, as described above, it should be noted that the method of creating the random mesh pattern may be any method using Delaunay triangles.

In a case where the random mesh pattern 25d is used as the upper and lower wiring patterns 24a and 24b, transmittance image data of a combined wiring pattern in a state where the two random mesh patterns 25d overlaps on the basis of the transmittance image data of both patterns is created.

In a case where the random mesh pattern 25d is used in only one of the upper and lower wiring patterns 24a and 24b, separately transmittance image data of the other wiring pattern is acquired, and the transmittance image data of the combined wiring pattern in a state where both patterns overlap on the basis of the transmittance image data of both patterns is created. At this time, in a case where the other wiring pattern is a wiring pattern of the transparent conductive layer such as ITO, the transmittance image data of the combined wiring pattern is created such that values of the transmittance image data are 1.0 as a whole.

It should be noted that at least one transmittance image data piece of the combined wiring pattern, the random mesh pattern 25d, and the other wiring pattern of the mesh-shaped wiring patterns 24a and 24b may be provided or stored in advance. In this case, transmittance image data may be acquired from the provided or stored transmittance image data.

In addition, in the present example, dot data of the seed points p randomly generated is as follows.

First, for example, a canvas having a planar region 100 corresponding to 10 mm (5000 pix×5000 pix) at a resolution of 12700 dpi (2 μm/pix) is prepared. In the canvas, the pitch of a mesh is assumed, and the required number of dots are arranged. For example, regarding the number of dots, assuming that the pitch is 50 μm, since the canvas size is 5000 pix×5000 pix, if the size is divided by 25 pix, 50 μm corresponds to 25 pix, 200×200=40000 dots are required. Those are randomly arranged. For example, a combination (a pitch, a dot number) of the assumed pitch and dot number has totally four types of (50 μm, 40000 dots), (100 μm, 10000 dots), (200 μm, 2500 dots), and (300 pin, 1111 dots). For example, 2 μm and 4 μm are used as line widths at the time of rendering the random mesh pattern.

Further, when the transmittance image data of the random mesh pattern and the transmittance image data of the combined wiring pattern are created, a resolution thereof is set to, for example, 25400 dpi. In addition, the size of the transmittance image data is defined such that the pixel size is set as, for example, an integer multiple of the size (for example, 109 pix×109 pix) of a cyclic unit approximate to 20000 pix×20000 pix, similarly to the case of the BM pattern 38. In such a manner, the transmittance image data can be created with the defined size.

Next, in process 3, by performing two-dimensional fast Fourier transform (2DFFT (base 2)) on each of the normalized luminance image data of the sub-pixels created in process 1 (step S10) and the transmittance image data of the combined wiring pattern created in process 2 (step S24) and by quantifying both transmittance image data pieces, a spatial frequency of the spectrum peak and a peak spectrum intensity are calculated.

That is, as shown in FIG. 45, in step S14, first, by performing 2DFFT (the image size is 5000 pix×5000 pix) on the transmittance image data of the combined wiring pattern and the luminance image data of the sub-pixel array pattern (BM pattern) of each color of the BM pattern 38 for each color of RGB, Fourier spectra are calculated. Here, it is preferable that normalization is performed such that an intensity of a DC (direct current) component is an average value of an image.

First, as described above, the peak frequency and the peak intensity are obtained by performing 2DFFT on the luminance image data for noise evaluation obtained in step S10.

FIG. 46A shows an example of intensity characteristics of two-dimensional Fourier spectrum of the luminance image data of the G color (sub-pixel array pattern) obtained in such a manner. It should be noted that intensity characteristics of the two-dimensional Fourier spectrum of the G-color luminance image data shown in FIG. 46A is as shown in FIG. 40A.

Subsequently, by performing the 2DFFT on the transmittance image data of the combined wiring pattern created in step S24, the peak frequency and the peak intensity of the plurality of spectrum peaks of the two-dimensional Fourier spectra of the transmittance image data of the combined wiring pattern are calculated. Here, the peak intensity is treated as an absolute value. For simplification of calculation, for example, in a case where the absolute value of the spectrum intensity is represented as a common logarithm, it is preferable that, only a threshold value of the intensity greater than −3.0 is treated.

FIG. 46B shows an example of intensity characteristics of the two-dimensional Fourier spectra of the transmittance image data of the combined wiring pattern obtained in such a manner. In the present invention, the visibility of noise is set as the evaluation target. For this reason, regarding the intensity threshold value of the spectrum peak considered in the evaluation, contrary to the case of the moiré which has discretely present strong (high) peak intensities as the evaluation target, it is necessary to evaluate the distribution state. Therefore, it is necessary to consider even weaker (lower) peak intensities in the evaluation, and as a result, a smaller threshold value is used.

In the drawing showing distribution of intensities of the two-dimensional Fourier spectrum shown in FIG. 46B, the horizontal axis and the vertical axis indicate spatial frequencies (cycle/mm) in respective two-dimensional axes, for example, the X axis and Y axis directions. The center of this distribution diagram, that is, the origin indicates that the spatial frequency is 0 cycle/mm, and the radius r as a distance from the center indicates the spatial frequency (cycle/mm). Further, in the same drawing, the intensity level (spectrum value) decreases as the display density becomes thicker (black) for each spatial frequency band, and the intensity level increases as the display density becomes thinner (white). In the example of the drawing, the intensity distribution characteristics of the two-dimensional spectrum shows that there is a single isotropic and annular peak, and shows that spectral peaks having approximately the same spatial frequency, for example, spatial frequencies of around 15 cycle/mm are isotropically distributed. That is, the random mesh pattern indicates that the average pitch of the cells (opening portions 22) is around 67 μm.

In a case of changing a point of view, a spatial frequency of the mesh of the combined wiring pattern, an intensity thereof, and a spectrum intensity of the BM are different from those in the front view. For example, if the point of view for the combined wiring pattern is set at 30°, it is preferable that an amount of deviation between the upper mesh pattern and the lower mesh pattern is set in consideration of a substrate thickness (for example, PET: 100 μm). It is preferable that the spectrum intensity of the BM is 0.9 times the intensity thereof in the front view.

As described above, FIGS. 46A and 46B are respectively diagrams illustrating the intensity characteristics of the two-dimensional Fourier spectra of the transmittance image data of the combined wiring pattern and the luminance image data of the G color (sub-pixel array pattern) of the BM pattern 38.

In FIGS. 46A and 46B, white portions have high intensities, and indicate spectrum peaks. Therefore, from the results shown in FIGS. 46A and 46B, the peak frequencies and the peak intensities of spectrum peaks are calculated respectively for the transmittance image of the combined wiring pattern and the luminance data of the BM pattern 38 at the time of lighting on for each color depending on the sub-pixel array patterns of three colors such as RGB of the BM pattern 38. In other words, positions of the spectrum peaks on frequency coordinates in the intensity characteristics of the two-dimensional Fourier spectra of the transmittance image data of the combined wiring pattern and the luminance data of the BM pattern 38 (the sub-pixel array pattern of each color) respectively shown in FIGS. 46A and 46B, that is, the peak positions indicate peak frequencies. The intensities of the two-dimensional Fourier spectra at the peak positions indicate peak intensities.

Here, the peak frequencies and the peak intensities of the spectrum peaks of the combined wiring pattern and each sub-pixel array pattern of the BM pattern 38 are calculated and acquired in a manner similar to step S14 in the case of the calculation example of the above-mentioned indicator of evaluation of moiré shown in FIG. 36. As compared with the above-mentioned example, the values of the transmittance image data of the combined wiring pattern are different. However, the transmittance image data of the combined wiring pattern is the same, and the luminance data of the BM pattern 38 (the sub-pixel array pattern of each color) at the time of lighting on for each color is exactly the same. Therefore, detailed description thereof will be omitted.

Next, in process 4, a spatial frequency and an intensity of noise are calculated from the peak frequencies and the peak intensities of the transmittance image of the combined wiring pattern and the peak frequencies and the peak intensities of the luminance data of the BM pattern 38 at the time of lighting on for each color of RGB obtained in process 3 (step S14), and estimation thereof is performed.

Specifically, as shown in FIG. 45, in step S26, the frequencies and the intensities of noises for respective colors are calculated from the peak frequencies and the peak intensities of both two-dimensional Fourier spectra of the mesh pattern and the sub-pixel array patterns of the respective RGB colors of the BM pattern 38 respectively calculated in step S14. Here, the peak intensities and the intensities of noises are also treated as absolute values.

Here, spatial frequencies and intensities of noises can be calculated through a convolution operation of the peak frequencies and the peak intensities of the sub-pixel array patterns of the respective RGB colors of the peak frequency and the peak intensity of the mesh pattern 24.

In real space, noise is caused by multiplication of the image data pieces (the transmittance image data and the luminance image data) of the combined wiring pattern of the conductive film 10 and the sub-pixel array pattern of the BM pattern 38 at the time of lighting on for each color. Thus, in frequency space, both image data pieces are subjected to convolution integration (convolution). However, in steps S14 and S26, the peak frequencies and the peak intensities of both two-dimensional Fourier spectra of the combined wiring pattern and the sub-pixel array pattern of each color of the BM pattern 38 are calculated. Therefore, a difference (an absolute value of a difference) between both frequency peaks of the combined wiring pattern and the sub-pixel array pattern of a single color of RGB is obtained, the obtained difference is set as a frequency of noise, a product between two sets of vector intensities obtained by combining both is obtained, and the obtained product is set as an intensity (absolute value) of noise.

The frequency of noise and the intensity of noise are obtained for each color of RGB.

Here, the difference between the frequency peaks of the intensity characteristics of both two-dimensional Fourier spectra of the combined wiring pattern and the sub-pixel array pattern of each color of the BM pattern 38 respectively shown in FIGS. 46A and 46B corresponds to a relative distance between the peak positions of both frequency peaks on the frequency coordinates, in intensity characteristics obtained by superimposing the intensity characteristics of both two-dimensional Fourier spectra for each color.

A plurality of spectrum peaks of both two-dimensional Fourier spectra between the combined wiring pattern and the sub-pixel array pattern of each color of the BM pattern 38 is present for each color. Therefore, a plurality of the differences between the frequency peaks which are values of the relative distances, that is, a plurality of the frequencies of noise is obtained. Consequently, if there are multiple spectrum peaks of both two-dimensional Fourier spectra, there are multiple obtained frequencies of noise, and thus there are multiple obtained intensities of noise.

However, in a case where the intensities of noise at the obtained frequencies of noise are weak, noise is not visually perceived. Thus, it is preferable to deal with only noise of which the intensity of noise is regarded to be weak and is equal to or greater than a predetermined value, for example, noise of which the intensity is equal to or greater than −4.5.

Here, in the display device, the display resolution is determined, thus the highest frequency, at which display can be performed on the display device, is determined depending on the resolution thereof. Hence, noise having a frequency higher than the highest frequency is not displayed on the display device, and therefore it is not necessary to set the noise as an evaluation target in the present invention. Accordingly, the highest frequency of noise can be defined in accordance with the display resolution. Here, the highest frequency of noise, which has to be considered in the present invention, can be set to 1000/Pd (cycle/mm) when the pixel pitch of the pixel array pattern of the display is Pd (μm).

From the above description, in the present invention, in the frequencies and the intensities of noise obtained from the spectrum peaks of both two-dimensional Fourier spectra, noise as the evaluation (quantification) target in the present invention is noise, of which a frequency is equal to or less than the highest frequency of noise of 1000/Pd (for example, 10 cycle/mm in the present example), for example, 8 cycle/mm defined in accordance with the target display resolution (for example, 264 dpi in the present example) and noise of which an intensity of noise is equal to or greater than −4.5. In the present invention, the reason why noise having the intensity of noise equal to or greater than −4.5 is set as a target is as follows. If multiple noises of which the intensity is less than −4.5 occur and thus the sum thereof is used, even originally invisible noise may have to be scored. For this reason, in the present invention, a threshold value, which is equal to or greater than −4.5, is provided from an empirical visibility limit.

Next, in process 5, noise is quantified using the frequency and the intensity of noise for each sub-pixel of each color of RGB calculated in process 4 (step S26), and a quantitative value as an indicator of evaluation of noise is obtained.

That is, as shown in FIG. 45, in step S28, convolution of the visual transfer function (VTF) and the spectrum peaks for noise evaluation remaining in step S26 is performed, and quantified.

In the quantification of noise, specifically, in step S28, in the frequencies and the intensities (absolute values) of noises for the sub-pixels of the respective colors of RGB obtained in step S26, a plurality of evaluation values of noises of the respective colors is calculated by applying human visual response characteristics (VTF) corresponding to the observation distance of 750 mm as an example of human visual response characteristics represented by the following Expression (1), that is, by performing convolution integration. Here, in order to score noise, the VTF corresponding to the observation distance of 750 mm is used.

In such a manner, it is possible to obtain the evaluation value of noise using a common logarithm of the intensity for each color of RGB.

Here, the above-mentioned steps S10 to S28 are repeated for each color of RGB, and the evaluation values of noises of RGB may be obtained. However, in each step of the above-mentioned steps S10 to S28, the calculation may be performed for each color of RGB.

A worst value, that is, a maximum value among the evaluation values of noises of RGB obtained in such a manner is set as the indicator of evaluation (quantitative value) of noise. A value of the indicator of evaluation of noises is obtained as a value (common logarithm value) of a common logarithm of the indicator of evaluation of noises represented by a common logarithm is obtained. It is preferable that evaluation is also performed by combining an evaluation image with RGB display in accordance with calculation of the worst value.

It can be said that the quantitative value of noise, which is the indicator of evaluation of noise, is a value of quantification of moiré and noise in the related art. In the present invention, noise is defined as a state in which a lot of moirés are present. Accordingly, in the present invention, if there is a peak in a single frequency, it is determined that moiré is present. In contrast, if there is a plurality of peaks in the vicinity of a single frequency, it is determined that noise is present.

The above-mentioned indicator of evaluation of noise is obtained in a case where the conductive film 10 laminated on the display screen of the display unit 30 of the display 40 is observed from the front of the display screen. However, the present invention is not limited to this, and the indicator of evaluation of noise in a case where observation is performed in a direction oblique to the front may be obtained.

In the case where the indicator of evaluation of noise is obtained in a case where observation is performed in a direction oblique to the front, the intensities of RGB of the display 40 at the time of oblique observation are calculated at 90% of the luminance at the time of front observation, the process returns to step S14, and the peak frequencies and the peak intensities of the Fourier spectra of the respective colors are calculated again. Thereafter, steps S26 to S28 are repeated in a similar manner, and the indicator of evaluation of noise at the time of oblique observation is calculated.

In such a manner, if the indicators of evaluation of noise are calculated at the time of front observation and oblique observation, a large value (worst value) among the indicators of evaluation of noise at the time of front observation and oblique observation is calculated as the indicator of evaluation of noise to be provided for noise evaluation.

In a case where only one of the front observation and the oblique observation is not performed, the indicator of evaluation of noise at the front observation or the oblique observation is set as the indicator of evaluation of noise to be directly provided for noise evaluation.

Next, in process 6, the combined wiring pattern and the random mesh pattern are evaluated and determined on the basis of the indicator of evaluation (quantitative value: worst value) of noise calculated in process 5 (step S28).

That is, as shown in FIG. 45, in step S29, if a common logarithm value of the indicator of evaluation of noise of the current combined wiring pattern obtained in step S28 is equal to or less than a predetermined evaluation threshold value, it is evaluated that each of the random mesh patterns constituting the current combined wiring pattern, a random mesh pattern on one side corresponding to the other wiring pattern, or a random mesh pattern on the other side as the transparent conductive layer is an optimized random mesh pattern applied to the conductive film 10 of the present invention, and the random mesh pattern is set as a random mesh pattern 25d optimized as shown in FIG. 27.

The reason why the value of the indicator of evaluation of noise is limited to be equal to or less than the predetermined evaluation threshold value as a common logarithm is as follows. If the value is greater than the predetermined evaluation threshold value, noise, which is caused by interference between each sub-pixel array pattern of the BM pattern and the combined wiring pattern overlapping with each other, is visually perceived, and the visually perceived noise offers a sense of discomfort to a user who observes the noise. In a case where the value of the indicator of evaluation of noise is equal to or less than the predetermined evaluation threshold value, the noise may slightly offer a sense of discomfort, but does not matter.

Here, the predetermined evaluation threshold value is appropriately set in accordance with shapes and properties of the conductive film and the display device. Specifically, the shapes and properties includes a line width of the thin metal line 14 of the random mesh pattern 25d, a shape, an angle, and a size (such a pitch) of the cell (opening portion 22), a phase angle (a rotation angle, and a deviation angle) of the wiring pattern of two wiring layers 28, a shape, a size (such a pitch), and arrangement and an angle of the BM pattern 38, and the like. However, for example, the predetermined value is preferably equal to or less than −2.80 ($10^{-2.80}$ as an antilogarithm) as a common logarithm. That is, for example, the indicator of evaluation of noise is preferably equal to or less than −2.80 ($10^{-2.80}$ as an antilogarithm) as a common logarithm.

Although described in detail later, the indicator of evaluation of noise is obtained for each of the multiple combined wiring patterns, each of which is formed by overlapping various random mesh patterns 25d, by using simulation samples. Three functional evaluators perform functional evaluation on noise, which is caused by interference between the sub-pixel array pattern of each color of three colors such as RGB of the BM pattern and the combined wiring pattern, with their own eyes. If the indicator of evaluation of noise is equal to or less than −2.80 as a common logarithm, in a state where the display is lit on, in terms of visibility of noise which is caused by interference between the sub-pixel array pattern of each color of three colors such as RGB of the BM pattern and the combined wiring pattern overlapping each other, a level of the noise is better than a level of noise which does not matter even when recognized as deterioration.

Consequently, in the combined wiring pattern optimized in the present invention and the random mesh patterns 25d as components thereof, the indicator of evaluation of noise is preferably specified to be equal to or less than −2.80 ($10^{-2.80}$ as an antilogarithm) as a common logarithm.

It is apparent that a plurality of optimized random mesh patterns 25d is obtained in accordance with the line width of the thin metal line 14 of the random mesh pattern 25d, the shape of the opening portion 22, the size (pitch and angle), an overlapped state of the random mesh patterns 25d of two wiring layers, and the like. Here, a random mesh pattern 25d having a small common logarithm value of the indicator of evaluation of noise may be a best random mesh pattern 25d, and the plurality of optimized random mesh patterns 25d may be prioritized.

The random mesh pattern 25d, which is evaluated in such a manner and is shown in FIG. 27, is determined and evaluated as a wiring pattern of the conductive film of the present invention.

In such a manner, the method of evaluating the wiring patterns on the conductive film of the present invention is terminated, and the evaluated random mesh patterns can be evaluated as wiring patterns on the conductive film of the present invention.

As a result, the BM pattern of the display unit of the display device in a state of lighting on is superposed such that occurrence of noise is suppressed. Thus, also for the display device with a different resolution, it is possible to provide the conductive film of the present invention which is excellent in visibility of noise regardless of the observation distance and has the optimized random mesh pattern.

In the present invention, the optimized random mesh pattern, which is optimized with respect to the predetermined BM pattern, is used. Therefore, occurrence of noise is further suppressed, and image quality becomes further excellent in terms of visibility of noise. Even in a case where the BM patterns overlapping each other slightly change, it is possible to suppress occurrence of noise, and it is possible to maintain excellent performance in terms of visibility of noise.

Hereinbefore, the conductive film according to the present invention, the display device comprising the conductive film, and the method of evaluating the wiring patterns of the conductive film have been described with reference to various embodiments and examples. However, it is apparent that the present invention is not limited to the embodiments and the examples and may be improved or modified in various forms without departing from the scope of the present invention.

EXAMPLES

Hereinafter, the present invention will be described in detail on the basis of examples.

Example I

In the present example, in accordance with the flow of the method of evaluating the conductive film of the present invention shown in FIGS. 36 and 37, in a manner similar to the above description, an experiment was performed as follows.

In the pixel array (BM) patterns 38 of the display that have different resolutions, emission intensities, and sub-pixel shapes typified by the G sub-pixel array patterns shown in FIGS. 35(A1) to 35(H2), multiple typical mesh patterns 25 that have rhomboid pattern shapes shown in FIG. 14, have the different shapes and sizes (pitches P and angles θ) of the opening portions, and have different line widths of the thin metal lines (mesh) are provided as simulation samples, and the combined mesh pattern and the BM pattern of each color overlap with each other. Before and after irregularity was provided, the quantitative value of moiré of the indicator of evaluation of moiré was obtained, the same multiple mesh patterns before and after different randomicities were provided overlap with the BM patterns of respective colors, and the three functional evaluators performed functional evaluation on moiré, which is caused by interference between both overlapping patterns in a simulation image of moiré, with their eyes.

It should be noted that irregularity was provided such that values equal to or less than a predetermined threshold value were set to the pitches or the angles of the cells 22 of the typical mesh pattern 25.

Here, as shown in FIG. 36, regarding evaluation of moiré, functional evaluation was performed in the following manner: the transmittance image data of the combined mesh pattern was superposed on the luminance image data of the sub-pixel array pattern of each color of the pixel array (BM) pattern used in step S14; a simulation image of moiré, in which a transmittance image is superposed on a luminance image, was created, and was displayed on the display; and the three functional evaluators observed the displayed simulation image.

As shown in FIG. 35, BM structure numbers of Nos. 1 to 8 are assigned to eight types of the BM structures of the display, and 16 combinations of different resolutions of the display and different emission intensities of the display in the BM structure are represented by BM condition Nos. 1 to 16. Table 1 shows the BM structures, the BM conditions, the resolutions of the display, and the emission intensities of the display.

Tables 2 and 3 show the BM conditions, the angles, the pitches, and the line widths of the mesh pattern, the quantitative values of moiré, and the functional evaluation results of respective experiment examples.

Table 2 shows results obtained when the pitches of the cells 22 of the typical mesh pattern 25 are made to be irregular in a range of, for example, 10% of the predetermined threshold value or less.

Table 3 shows results obtained when the angles of the cells 22 of the typical mesh pattern 25 are made to be irregular in a range of, for example, 3.0% of the predetermined threshold value or less.

Here, the functional evaluation results were obtained in the following manner. The moiré is evaluated on 5 levels of 1 to 5. In a case where deterioration of visibility of moiré is observed and offers a strong sense of discomfort, the evaluation level is set to 1. In a case where deterioration of visibility of moiré is observed and offers a sense of discomfort, the evaluation level is set to 2. In a case where deterioration of visibility of moiré is observed and offers a weak sense of discomfort, the evaluation level is set to 3. In a case where deterioration of visibility of moiré is observed but does not offer a sense of discomfort, the evaluation level is set to 4. In a case where deterioration of visibility of moiré is not observed, the evaluation level is set to 5.

In terms of visibility of moiré, moiré is allowable if the evaluation level is equal to or greater than 3. However, it is preferable that the evaluation level is equal to or greater than 4, and it is most preferable that the evaluation level is 5.

In the present example, the shape of the opening portion 22 of the typical mesh pattern 25 was changed such that the pitch P was changed to 150 µm and 200 µm and the angle θ was fixed to 35°.

Further, the line width of the typical mesh pattern 25 was changed to 2 µm and 4 µm.

In addition, the resolutions of the displays using 8 types of the BM patterns shown in FIGS. 35(A1) to 35(H2) respectively were 149 dpi, 222 dpi, 265 dpi, 265 dpi (v2), 326 dpi, 384 dpi, 384 dpi (v2), and 440 dpi.

Furthermore, the emission intensity of the display was normalized by the display LP101WX1(SL) (n3) (manufactured by LG Display Corp.), and was changed to 64 (luminance 1) and 128 (luminance 2), even in any display, when the entire range of the intensity was given as a range of 0 to 255.

The randomicity provided to the pitches was 0.0% (not applied), and was changed to 2.0%, 4.0%, 6.0%, 8.0%, and 10.0%.

The randomicity provided to the angles was 0.0% (not applied), and was changed to 0.2%, 0.5%, 0.8%, 1.0%, and 3.0%.

For imaging the sub-pixel array pattern of each color of the pixel array (BM) pattern 38, only the G channel of the display LP101WX1(SL) (n3) (manufactured by LG Display Corp.) was turned on at a MAX intensity, and then imaging was performed. Here, STM6 (manufactured by OLYMPUS Corp.) was used as the microscope, UMPlanFl10× (manufactured by OLYMPUS Corp.) was used as the lens, and QIC-F-CLR-12-C (manufactured by QIMAGING Corp.) was used as the camera. Here, as the imaging conditions, for example, a gain was set to 1.0, and white balance (G, R, B) was set to (1.00, 2.17, 1.12). Further, the captured image was subjected to shading correction.

For measuring luminance, a USB2000+ manufactured by Ocean Optics and a diffuser plate (CC-3-UV-S manufactured by the same company) at the tip of the fiber were used, and the integration time period was set to 250 ms.

Calculation of the indicator of evaluation of moiré was performed as described above in the method shown in FIG. 36.

TABLE 1

| BM Structure Number (No.) | BM Condition Number (No.) | Display Resolution (dpi) | Display Emission Intensity (0-255) |
|---|---|---|---|
| 1 | 1 | 149 | 64 |
| 1 | 2 | 149 | 128 |
| 2 | 3 | 222 | 64 |
| 2 | 4 | 222 | 128 |
| 3 | 5 | 265 | 64 |
| 3 | 6 | 265 | 64 |
| 4 | 7 | 265 | 128 |
| 4 | 8 | 265 | 128 |
| 5 | 9 | 326 | 64 |
| 5 | 10 | 326 | 128 |
| 6 | 11 | 384 | 64 |
| 6 | 12 | 384 | 64 |
| 7 | 13 | 384 | 128 |
| 7 | 14 | 384 | 128 |
| 8 | 15 | 440 | 64 |
| 8 | 16 | 440 | 128 |

TABLE 2

| Experiment Number (No.) | BM Condition Number (No.) | Mesh Pattern Angle (°) | Mesh Pattern Pitch (µm) | Mesh Pattern Line Width (µm) | Evaluation Value of Moiré Quantitative Value | Functional Evaluation Result Pitch, Randomicity (%) 0.0 | 2.0 | 4.0 | 6.0 | 8.0 | 10.0 | |
|---|---|---|---|---|---|---|---|---|---|---|---|---|
| 1 | 1 | 35 | 200 | 2 | −3.03 | 3 | 4 | 4 | 4 | 4 | 4 | Example |
| 2 | 1 | 35 | 150 | 2 | −2.74 | 2 | 2 | 2 | 2 | 3 | 3 | Comparative Example |
| 3 | 2 | 35 | 200 | 2 | −2.69 | 2 | 2 | 2 | 2 | 3 | 3 | Comparative Example |
| 4 | 2 | 35 | 150 | 2 | −2.44 | 1 | 1 | 1 | 2 | 2 | 2 | Comparative Example |
| 5 | 3 | 35 | 150 | 2 | NaN | 5 | 5 | 5 | 5 | 5 | 5 | Example |
| 6 | 3 | 35 | 200 | 2 | NaN | 5 | 5 | 5 | 5 | 5 | 5 | Example |
| 7 | 4 | 35 | 150 | 2 | NaN | 5 | 5 | 5 | 5 | 5 | 5 | Example |
| 8 | 4 | 35 | 200 | 2 | NaN | 5 | 5 | 5 | 5 | 5 | 5 | Example |
| 9 | 5 | 35 | 150 | 2 | NaN | 5 | 5 | 5 | 5 | 5 | 5 | Example |
| 10 | 5 | 35 | 200 | 2 | NaN | 5 | 5 | 5 | 5 | 5 | 5 | Example |
| 11 | 6 | 35 | 200 | 2 | NaN | 5 | 5 | 5 | 5 | 5 | 5 | Example |
| 12 | 6 | 35 | 150 | 2 | −3.98 | 4 | 4 | 5 | 5 | 5 | 5 | Example |
| 13 | 7 | 35 | 150 | 2 | −4.01 | 4 | 5 | 5 | 5 | 5 | 5 | Example |
| 14 | 7 | 35 | 200 | 2 | −3.02 | 3 | 4 | 4 | 4 | 4 | 4 | Example |
| 15 | 8 | 35 | 150 | 2 | −3.68 | 4 | 4 | 5 | 5 | 5 | 5 | Example |
| 16 | 8 | 35 | 200 | 2 | −2.86 | 3 | 4 | 4 | 4 | 4 | 4 | Example |

TABLE 2-continued

| Experiment Number (No.) | BM Condition Number (No.) | Mesh Pattern Angle (°) | Mesh Pattern Pitch (μm) | Mesh Pattern Line Width (μm) | Evaluation Value of Moiré Quantitative Value | Functional Evaluation Result Pitch, Randomicity (%) 0.0 | 2.0 | 4.0 | 6.0 | 8.0 | 10.0 | |
|---|---|---|---|---|---|---|---|---|---|---|---|---|
| 17 | 9  | 35 | 200 | 2 | NaN   | 5 | 5 | 5 | 5 | 5 | 5 | Example |
| 18 | 9  | 35 | 150 | 2 | −4.22 | 4 | 5 | 5 | 5 | 5 | 5 | Example |
| 19 | 10 | 35 | 200 | 2 | −3.66 | 4 | 4 | 5 | 5 | 5 | 5 | Example |
| 20 | 10 | 35 | 150 | 2 | −3.12 | 3 | 4 | 4 | 4 | 4 | 4 | Example |
| 21 | 11 | 35 | 200 | 2 | −3.40 | 4 | 4 | 5 | 5 | 5 | 5 | Example |
| 22 | 11 | 35 | 150 | 2 | −3.29 | 4 | 4 | 5 | 5 | 5 | 5 | Example |
| 23 | 12 | 35 | 150 | 2 | NaN   | 5 | 5 | 5 | 5 | 5 | 5 | Example |
| 24 | 12 | 35 | 200 | 2 | NaN   | 5 | 5 | 5 | 5 | 5 | 5 | Example |
| 25 | 13 | 35 | 200 | 2 | −3.10 | 3 | 4 | 4 | 4 | 4 | 4 | Example |
| 26 | 13 | 35 | 150 | 2 | −2.99 | 3 | 4 | 4 | 4 | 4 | 4 | Example |
| 27 | 14 | 35 | 200 | 2 | NaN   | 5 | 5 | 5 | 5 | 5 | 5 | Example |
| 28 | 14 | 35 | 150 | 2 | −4.43 | 4 | 5 | 5 | 5 | 5 | 5 | Example |
| 29 | 15 | 35 | 150 | 2 | NaN   | 5 | 5 | 5 | 5 | 5 | 5 | Example |
| 30 | 15 | 35 | 200 | 2 | NaN   | 5 | 5 | 5 | 5 | 5 | 5 | Example |
| 31 | 16 | 35 | 150 | 2 | −4.33 | 4 | 5 | 5 | 5 | 5 | 5 | Example |
| 32 | 16 | 35 | 200 | 2 | −3.35 | 4 | 4 | 5 | 5 | 5 | 5 | Example |
| 33 | 1  | 35 | 200 | 4 | −2.69 | 2 | 2 | 2 | 2 | 3 | 3 | Comparative Example |
| 34 | 1  | 35 | 150 | 4 | −2.45 | 1 | 1 | 1 | 2 | 2 | 2 | Comparative Example |
| 35 | 2  | 35 | 200 | 4 | −2.34 | 1 | 1 | 1 | 2 | 2 | 2 | Comparative Example |
| 36 | 2  | 35 | 150 | 4 | −2.12 | 1 | 1 | 1 | 2 | 2 | 2 | Comparative Example |
| 37 | 3  | 35 | 150 | 4 | NaN   | 5 | 5 | 5 | 5 | 5 | 5 | Example |
| 38 | 3  | 35 | 200 | 4 | NaN   | 5 | 5 | 5 | 5 | 5 | 5 | Example |
| 39 | 4  | 35 | 150 | 4 | −4.40 | 4 | 5 | 5 | 5 | 5 | 5 | Example |
| 40 | 4  | 35 | 200 | 4 | −4.29 | 4 | 5 | 5 | 5 | 5 | 5 | Example |
| 41 | 5  | 35 | 150 | 4 | −3.99 | 4 | 5 | 5 | 5 | 5 | 5 | Example |
| 42 | 5  | 35 | 200 | 4 | −3.05 | 3 | 4 | 4 | 4 | 4 | 4 | Example |
| 43 | 6  | 35 | 150 | 4 | −3.68 | 4 | 4 | 5 | 5 | 5 | 5 | Example |
| 44 | 6  | 35 | 200 | 4 | −3.02 | 3 | 4 | 4 | 4 | 4 | 4 | Example |
| 45 | 7  | 35 | 150 | 4 | −3.30 | 4 | 4 | 5 | 5 | 5 | 5 | Example |
| 46 | 7  | 35 | 200 | 4 | −2.73 | 2 | 2 | 2 | 1 | 3 | 3 | Comparative Example |
| 47 | 8  | 35 | 150 | 4 | −3.07 | 3 | 4 | 4 | 4 | 4 | 4 | Example |
| 48 | 8  | 35 | 200 | 4 | −2.57 | 1 | 1 | 1 | 2 | 2 | 2 | Comparative Example |
| 49 | 9  | 35 | 200 | 4 | −4.18 | 4 | 5 | 5 | 5 | 5 | 5 | Example |
| 50 | 9  | 35 | 150 | 4 | −3.19 | 4 | 4 | 5 | 5 | 5 | 5 | Example |
| 51 | 10 | 35 | 200 | 4 | −3.24 | 4 | 4 | 5 | 5 | 5 | 5 | Example |
| 52 | 10 | 35 | 150 | 4 | −2.89 | 3 | 4 | 4 | 4 | 4 | 4 | Example |
| 53 | 11 | 35 | 200 | 4 | −3.10 | 3 | 4 | 4 | 4 | 4 | 4 | Example |
| 54 | 11 | 35 | 150 | 4 | −3.04 | 3 | 4 | 4 | 4 | 4 | 4 | Example |
| 55 | 12 | 35 | 200 | 4 | NaN   | 5 | 5 | 5 | 5 | 5 | 5 | Example |
| 56 | 12 | 35 | 150 | 4 | −4.44 | 4 | 5 | 5 | 5 | 5 | 5 | Example |
| 57 | 13 | 35 | 200 | 4 | −2.79 | 2 | 2 | 2 | 2 | 3 | 3 | Comparative Example |
| 58 | 13 | 35 | 150 | 4 | −2.73 | 2 | 2 | 2 | 2 | 3 | 3 | Comparative Example |
| 59 | 14 | 35 | 150 | 4 | −3.54 | 4 | 4 | 5 | 5 | 5 | 5 | Example |
| 60 | 14 | 35 | 200 | 4 | −3.37 | 4 | 4 | 5 | 5 | 5 | 5 | Example |
| 61 | 15 | 35 | 150 | 4 | NaN   | 5 | 5 | 5 | 5 | 5 | 5 | Example |
| 62 | 15 | 35 | 200 | 4 | −3.62 | 4 | 4 | 5 | 5 | 5 | 5 | Example |
| 63 | 16 | 35 | 150 | 4 | −3.29 | 4 | 4 | 5 | 5 | 5 | 5 | Example |
| 64 | 16 | 35 | 200 | 4 | −2.92 | 3 | 4 | 4 | 4 | 4 | 4 | Example |

It should be noted that, in Table 2, "NaN" in items of quantitative values of moiré means that since an intensity is small and elements which do not contribute to occurrence of moiré are removed through threshold processing, a quantitative value of moiré is not obtained, moiré does not occur, and moiré is not visually perceived.

Table 2 shows Experiment Examples 1 to 64. In Experiment Examples 5 to 13, Experiment Example 15, Experiment Examples 17 to 19, Experiment Examples 21 to 24, Experiment Examples 27 to 32, Experiment Examples 37 to 41, Experiment Example 43, Experiment Example 45, Experiment Examples 49 to 51, Experiment Examples 55 to 56, and Experiment Examples 59 to 63, indicators (evaluation values) of evaluation thereof were equal to or less than −3.17, and all evaluation results of visibility are equal to or greater than 4 when the randomicities were 0%. The above-mentioned experiment examples were examples of the present invention which are excellent in visibility of moiré even in the regular typical wiring pattern.

In Experiment Example 1, Experiment Examples 5 to 32, Experiment Examples 37 to 45, Experiment Example 47, Experiment Examples 49 to 56, and Experiment Examples 59 to 64, indicators (evaluation values) of evaluation thereof were equal to or less than −2.80, and all evaluation results of visibility are equal to or greater than 4 when the randomicities were in a range of 2.0% to 10%. The above-mentioned experiment examples were examples of the present invention.

In contrast, in Experiment Examples 2 to 4, Experiment Examples 33 to 36, Experiment Example 46, Experiment Example 48, and Experiment Examples 57 to 58, indicators (evaluation values) of evaluation thereof were greater than −2.80, and the evaluation results of visibility were equal to or less than 2 when the randomicities were in a range of 2.0% to 10.0%. The above-mentioned experiment examples were comparative examples.

In addition, when the randomicities of all the experiment examples were in a range of 0.0% to 10.0%, a moiré improvement effect could be seen.

From the above description, regarding the quantitative value (indicator of evaluation) of moiré, the conductive film of the present invention has the combined quadrilateral wiring pattern which is obtained by randomizing the combined rhomboid wiring pattern for allowing the indicator of evaluation (evaluation value) of moiré to satisfy the range of −3.17 or less and the combined rhomboid wiring pattern for allowing the indicator of evaluation (evaluation value) of moiré to satisfy the range of −2.80. In the conductive film, even if the cycles and the intensities of the BM patterns of the display, the emission intensity of the display, and the like are different, even at the time of front observation, and even at the time of oblique observation, it is possible to suppress occurrence of moiré, and it is possible to greatly improve visibility.

From the above description, effects of the present invention are clarified.

TABLE 3-1

| Experiment Number (No.) | BM Condition Number (No.) | Mesh Pattern Angle (°) | Pitch (μm) | Line Width (μm) | Evaluation Value of Moiré Quantitative Value | Functional Evaluation Result Pitch, Randomicity (%) 0.0 | 0.2 | 0.5 | 0.8 | 1.0 | 3.0 | |
|---|---|---|---|---|---|---|---|---|---|---|---|---|
| 101 | 1 | 35 | 200 | 2 | −3.03 | 3 | 4 | 4 | 4 | 4 | 4 | Example |
| 102 | 1 | 35 | 150 | 2 | −2.74 | 2 | 2 | 2 | 2 | 3 | 3 | Comparative Example |
| 103 | 2 | 35 | 200 | 2 | −2.69 | 2 | 2 | 2 | 2 | 3 | 3 | Comparative Example |
| 104 | 2 | 35 | 150 | 2 | −2.44 | 1 | 1 | 1 | 2 | 2 | 2 | Comparative Example |
| 105 | 3 | 35 | 150 | 2 | NaN | 5 | 5 | 5 | 5 | 5 | 5 | Example |
| 106 | 3 | 35 | 200 | 2 | NaN | 5 | 5 | 5 | 5 | 5 | 5 | Example |
| 107 | 4 | 35 | 150 | 2 | NaN | 5 | 5 | 5 | 5 | 5 | 5 | Example |
| 108 | 4 | 35 | 200 | 2 | NaN | 5 | 5 | 5 | 5 | 5 | 5 | Example |
| 109 | 5 | 35 | 150 | 2 | NaN | 5 | 5 | 5 | 5 | 5 | 5 | Example |
| 110 | 5 | 35 | 200 | 2 | NaN | 5 | 5 | 5 | 5 | 5 | 5 | Example |
| 111 | 6 | 35 | 200 | 2 | NaN | 5 | 5 | 5 | 5 | 5 | 5 | Example |
| 112 | 6 | 35 | 150 | 2 | −3.98 | 4 | 4 | 5 | 5 | 5 | 5 | Example |
| 113 | 7 | 35 | 150 | 2 | −4.01 | 4 | 5 | 5 | 5 | 5 | 5 | Example |
| 114 | 7 | 35 | 200 | 2 | −3.02 | 3 | 4 | 4 | 4 | 4 | 4 | Example |
| 115 | 8 | 35 | 150 | 2 | −3.68 | 4 | 4 | 5 | 5 | 5 | 5 | Example |
| 116 | 8 | 35 | 200 | 2 | −2.86 | 3 | 4 | 4 | 4 | 4 | 4 | Example |
| 117 | 9 | 35 | 200 | 2 | NaN | 5 | 5 | 5 | 5 | 5 | 5 | Example |
| 118 | 9 | 35 | 150 | 2 | −4.22 | 4 | 5 | 5 | 5 | 5 | 5 | Example |
| 119 | 10 | 35 | 200 | 2 | −3.66 | 4 | 4 | 5 | 5 | 5 | 5 | Example |
| 120 | 10 | 35 | 150 | 2 | −3.12 | 3 | 4 | 4 | 4 | 4 | 4 | Example |
| 121 | 11 | 35 | 200 | 2 | −3.40 | 4 | 4 | 5 | 5 | 5 | 5 | Example |
| 122 | 11 | 35 | 150 | 2 | −3.29 | 4 | 4 | 5 | 5 | 5 | 5 | Example |
| 123 | 12 | 35 | 150 | 2 | NaN | 5 | 5 | 5 | 5 | 5 | 5 | Example |
| 124 | 12 | 35 | 200 | 2 | NaN | 5 | 5 | 5 | 5 | 5 | 5 | Example |
| 125 | 13 | 35 | 200 | 2 | −3.10 | 3 | 4 | 4 | 4 | 4 | 4 | Example |
| 126 | 13 | 35 | 150 | 2 | −2.99 | 3 | 4 | 4 | 4 | 4 | 4 | Example |
| 127 | 14 | 35 | 200 | 2 | NaN | 5 | 5 | 5 | 5 | 5 | 5 | Example |
| 128 | 14 | 35 | 150 | 2 | −4.43 | 4 | 5 | 5 | 5 | 5 | 5 | Example |
| 129 | 15 | 35 | 150 | 2 | NaN | 5 | 5 | 5 | 5 | 5 | 5 | Example |
| 130 | 15 | 35 | 200 | 2 | NaN | 5 | 5 | 5 | 5 | 5 | 5 | Example |
| 131 | 16 | 35 | 150 | 2 | −4.33 | 4 | 5 | 5 | 5 | 5 | 5 | Example |
| 132 | 16 | 35 | 200 | 2 | −3.35 | 4 | 4 | 5 | 5 | 5 | 5 | Example |
| 133 | 1 | 35 | 200 | 4 | −2.69 | 2 | 2 | 2 | 2 | 3 | 3 | Comparative Example |
| 134 | 1 | 35 | 150 | 4 | −2.45 | 1 | 1 | 1 | 2 | 2 | 2 | Comparative Example |
| 135 | 2 | 35 | 200 | 4 | −2.34 | 1 | 1 | 1 | 2 | 2 | 2 | Comparative Example |
| 136 | 2 | 35 | 150 | 4 | −2.12 | 1 | 1 | 1 | 2 | 2 | 2 | Comparative Example |
| 137 | 3 | 35 | 150 | 4 | NaN | 5 | 5 | 5 | 5 | 5 | 5 | Example |
| 135 | 3 | 35 | 200 | 1 | NaN | 5 | 5 | 5 | 5 | 5 | 5 | Example |
| 139 | 4 | 35 | 150 | 4 | −4.40 | 4 | 5 | 5 | 5 | 5 | 5 | Example |
| 140 | 4 | 35 | 200 | 4 | −4.29 | 4 | 5 | 5 | 5 | 5 | 5 | Example |
| 141 | 5 | 35 | 150 | 4 | −3.99 | 4 | 5 | 5 | 5 | 5 | 5 | Example |
| 142 | 5 | 35 | 200 | 4 | −3.05 | 3 | 4 | 4 | 4 | 4 | 4 | Example |
| 143 | 6 | 35 | 150 | 4 | −3.68 | 4 | 4 | 5 | 5 | 5 | 5 | Example |
| 144 | 6 | 35 | 200 | 4 | −3.02 | 3 | 4 | 4 | 4 | 4 | 4 | Example |
| 145 | 7 | 35 | 150 | 4 | −3.30 | 4 | 4 | 5 | 5 | 5 | 5 | Example |
| 146 | 7 | 35 | 200 | 4 | −2.73 | 2 | 2 | 2 | 2 | 3 | 3 | Comparative Example |
| 147 | 8 | 35 | 150 | 4 | −3.07 | 3 | 4 | 4 | 4 | 4 | 4 | Example |
| 148 | 8 | 35 | 200 | 4 | −2.57 | 1 | 1 | 1 | 2 | 2 | 2 | Comparative Example |
| 149 | 9 | 35 | 200 | 4 | −4.18 | 4 | 5 | 5 | 5 | 5 | 5 | Example |
| 150 | 9 | 35 | 150 | 4 | −3.19 | 4 | 4 | 5 | 5 | 5 | 5 | Example |
| 151 | 10 | 35 | 200 | 4 | −3.24 | 4 | 4 | 5 | 5 | 5 | 5 | Example |
| 152 | 10 | 35 | 150 | 4 | −2.89 | 3 | 4 | 4 | 4 | 4 | 4 | Example |
| 153 | 11 | 35 | 200 | 4 | −3.10 | 3 | 4 | 4 | 4 | 4 | 4 | Example |
| 154 | 11 | 35 | 150 | 4 | −3.04 | 3 | 4 | 4 | 4 | 4 | 4 | Example |
| 155 | 12 | 35 | 200 | 4 | NaN | 5 | 5 | 5 | 5 | 5 | 5 | Example |
| 156 | 12 | 35 | 150 | 4 | −4.44 | 4 | 5 | 5 | 5 | 5 | 5 | Example |
| 157 | 13 | 35 | 200 | 4 | −2.79 | 2 | 2 | 2 | 2 | 3 | 3 | Comparative Example |

TABLE 3-1-continued

| Experiment Number (No.) | BM Condition Number (No.) | Mesh Pattern Angle (°) | Pitch (μm) | Line Width (μm) | Evaluation Value of Moiré Quantitative Value | Functional Evaluation Result Pitch, Randomicity (%) | | | | | | |
| --- | --- | --- | --- | --- | --- | --- | --- | --- | --- | --- | --- | --- |
| | | | | | | 0.0 | 0.2 | 0.5 | 0.8 | 1.0 | 3.0 | |
| 158 | 13 | 35 | 150 | 4 | −2.73 | 2 | 2 | 2 | 2 | 3 | 3 | Comparative Example |
| 159 | 14 | 35 | 150 | 4 | −3.54 | 4 | 4 | 5 | 5 | 5 | 5 | Example |
| 160 | 14 | 35 | 200 | 4 | −3.37 | 4 | 4 | 5 | 5 | 5 | 5 | Example |
| 161 | 15 | 35 | 150 | 4 | NaN | 5 | 5 | 5 | 5 | 5 | 5 | Example |
| 162 | 15 | 35 | 200 | 4 | −3.62 | 4 | 4 | 5 | 5 | 5 | 5 | Example |
| 163 | 16 | 35 | 150 | 4 | −3.29 | 4 | 4 | 5 | 5 | 5 | 5 | Example |
| 164 | 16 | 35 | 200 | 4 | −2.92 | 3 | 4 | 4 | 4 | 4 | 4 | Example |

Table 3 shows Experiment Examples 101 to 164. In Experiment Examples 105 to 113, Experiment Example 115, Experiment Examples 117 to 119, Experiment Examples 121 to 124, Experiment Examples 127 to 132, Experiment Examples 137 to 141, Experiment Example 143, Experiment Example 145, Experiment Examples 149 to 151, Experiment Examples 155 to 156, and Experiment Examples 159 to 163, indicators (evaluation values) of evaluation thereof were equal to or less than −3.17, and all evaluation results of visibility are equal to or greater than 4 when the randomicities were 0%. The above-mentioned experiment examples were examples of the present invention which are excellent in visibility of moiré even in the regular typical wiring pattern.

In Experiment Example 101, Experiment Examples 105 to 132, Experiment Examples 137 to 145, Experiment Example 147, Experiment Examples 149 to 156, and Experiment Examples 159 to 164, indicators (evaluation values) of evaluation thereof were equal to or less than −2.80, and all evaluation results of visibility are equal to or greater than 4 when the randomicities were in a range of 0.2% to 3.0%. The above-mentioned experiment examples were examples of the present invention.

In contrast, in Experiment Examples 102 to 104, Experiment Examples 133 to 136, Experiment Example 146, Experiment Example 148, Experiment Examples 157 to 158, indicators (evaluation values) of evaluation thereof were greater than −2.80, and the evaluation results of visibility were equal to or less than 2 when the randomicities were in a range of 0.2% to 3.0%. The above-mentioned experiment examples were comparative examples.

In addition, when the randomicities of all the experiment examples were in a range of 0.0% to 3.0%, a moiré improvement effect could be seen.

From the above description, regarding the quantitative value (indicator of evaluation) of moiré, the conductive film of the present invention has the combined quadrilateral wiring pattern which is obtained by randomizing the combined rhomboid wiring pattern for allowing the indicator of evaluation (evaluation value) of moiré to satisfy the range of −3.17 or less and the combined rhomboid wiring pattern for allowing the indicator of evaluation (evaluation value) of moiré to satisfy the range of −2.80. In the conductive film, even if the cycles and the intensities of the BM patterns of the display, the emission intensity of the display, and the like are different, even at the time of front observation, and even at the time of oblique observation, it is possible to suppress occurrence of moiré, and it is possible to greatly improve visibility.

From the above description, effects of the present invention are clarified.

Example II

In the present example, in accordance with the flow of the method of evaluating the conductive film of the present invention shown in FIGS. 36 and 37, in a manner similar to the above description, an experiment was performed as follows.

Before the pixel array (BM) patterns 38 of the display that have BM structures No. 1, Nos. 3 to 6, and No. 8 having different resolutions and different sub-pixel shapes typified by the G sub-pixel array patterns shown in FIGS. 35(A1), 35(C1), 35(D1), 35(E1), and 35(F1) and that emits light with different emission intensities are made to be irregular, multiple typical mesh patterns 25 that have rhomboid pattern shapes shown in FIG. 14, have the different shapes and sizes (pitches p and angles θ) of the opening portions, and have different line widths of the thin metal lines (mesh) are provided as simulation samples and actual samples, and the combined mesh pattern and the BM pattern of each color overlap with each other. With such a configuration, the quantitative values of moirés as the indicators of evaluation of moirés were obtained. Here, the emission intensities were set to 1.0 times, 1.5 times, and 2.0 times the intensity normalized by a specific display to be described later.

In the typical mesh patterns 25 for which the indicators of evaluation of moirés were obtained in such a manner, the thin metal lines 14 were changed into wavy lines having different amplitudes $A_0$, wavelengths $\lambda$, and phases $\alpha$. Accordingly, a combined mesh pattern, which was formed of multiple wavy mesh patterns 25c having different randomicities and which was made to be wavy, and the BM pattern of each color were made to overlap with each other. Then, three functional evaluators performed functional evaluation on moiré, which is caused by interference between both overlapping patterns in a simulation image of moiré, with their eyes.

Here, as shown in FIG. 36, regarding evaluation of moiré, functional evaluation was performed in the following manner: the transmittance image data of the combined mesh pattern, which was made to be wavy, was superposed on the luminance image data of the sub-pixel array pattern of each color of the pixel array (BM) pattern used in step S14; an inverse transform image of moiré, in which a transmittance image is superposed on a luminance image, was created, and was displayed on the display; and the three functional evaluators observed the displayed inverse transform image.

Experiment number Nos. 201 to 224 indicate experiments based on 24 combinations of: the BM structures of the display (6 types of No. 1, Nos. 3 to 6, and No. 8); emission intensities of the display (3 types of 1.0, 1.5, and 2.0 times the standard intensity); meshes and angles (3 types of combinations) of the mesh pattern; line widths (3 types) of the mesh pattern; and phases (3 types), wavelengths (3 types), and amplitudes (7 types) of the wavy lines of metal wires. Table 4 shows results of the above-mentioned experiments of experiment number Nos. 201 to 224.

In the present example, regarding the rhomboid shapes of the opening portions 22 of the typical mesh pattern 25, and accordingly, regarding the rhomboid shapes each formed by the center lines of the wavy lines of the four sides of each opening portion 22 of the wavy mesh pattern 25c, the pitch P was changed to 120 µm, 150 µm, and 180 µm, and the angle θ was changed to 30°, 35°, and 40°.

Further, the line width of the typical mesh pattern 25 and accordingly the wavy mesh pattern 25c was changed to 2 µm, 3 µm, and 4 µm.

For randomicity, the phase of the wavy line was changed to 100 µm, 300 µm, and 500 µm, and the wavelength of the wavy line was changed to 100 µm, 300 µm, and 500 µm. In addition, the amplitude of the wavy line was changed to 10%, 20%, and 30% of the pitch P of the rhomboid shapes of the typical mesh pattern 25 and accordingly the rhomboid shapes of the center lines of the wavy lines of the wavy mesh pattern 25c. Further, for randomicity, the phase and the wavelength of the wavy line was fixed to 100 µm, and only Further, emission intensities of the display were changed to 1.0, 1.5, and 2.0 times the intensity which is normalized by the display LP101WX1(SL) (n3) (manufactured by LG Display Corp.).

For imaging the sub-pixel array pattern of each color of the pixel array (BM) pattern 38, only the G channel of the display LP101WX1(SL) (n3) (manufactured by LG Display Corp.) was turned on at a MAX intensity, and then imaging was performed. Here, STM6 (manufactured by OLYMPUS Corp.) was used as the microscope, UMPlanFI10× (manufactured by OLYMPUS Corp.) was used as the lens, and QIC-F-CLR-12-C (manufactured by QIMAGING Corp.) was used as the camera. Here, as the imaging conditions, for example, a gain was set to 1.0, and white balance (G, R, B) was set to (1.00, 2.17, 1.12). Further, the captured image was subjected to shading correction.

For measuring luminance, a USB2000+ manufactured by Ocean Optics and a diffuser plate (CC-3-UV-S manufactured by the same company) at the tip of the fiber were used, and the integration time period was set to 250 ms.

Calculation of the indicator of evaluation of moiré was performed as described above in the method shown in FIG. 36.

TABLE 4

| | | Factor Column | | | | | | | |
|---|---|---|---|---|---|---|---|---|---|
| | | BM | | | | | | | |
| | BM | | Mesh Pattern | | | | | | |
| Experiment Number | Structure Number | BM | Mesh/ Angle | Line Width | Wavy Line (%) | | | Moiré Quantitative | Functional Evaluation |
| (No.) | (No.) | Intensity | (µm/°) | (µm) | Phase | Wavelength | Amplitude | Value | Result |
| 201 | 1 | 1 | 120/40 | 2 | 500 | 500 | 10 | −2.34 | 2 Comparative Example |
| 202 | 1 | 1.5 | 150/35 | 3 | 300 | 300 | 20 | −2.39 | 2 Comparative Example |
| 203 | 1 | 2 | 180/30 | 4 | 100 | 100 | 30 | −2.47 | 1 Comparative Example |
| 204 | 4 | 1 | 120/40 | 3 | 300 | 100 | 30 | −4.28 | 3 Comparative Example |
| 205 | 4 | 1.5 | 150/35 | 4 | 100 | 500 | 10 | −3.54 | 4 Example |
| 206 | 4 | 2 | 180/30 | 2 | 500 | 300 | 20 | −3.16 | 4 Example |
| 207 | 3 | 1 | 150/35 | 2 | 100 | 300 | 30 | −3.98 | 2 Comparative Example |
| 208 | 3 | 1.5 | 180/30 | 3 | 500 | 100 | 10 | −2.99 | 3 Comparative Example |
| 209 | 3 | 2 | 120/40 | 4 | 300 | 500 | 20 | −2.88 | 3 Comparative Example |
| 210 | 5 | 1 | 180/30 | 4 | 300 | 300 | 10 | −3.34 | 4 Example |
| 211 | 5 | 1.5 | 120/40 | 2 | 100 | 100 | 20 | −3.08 | 4 Example |
| 212 | 5 | 2 | 150/35 | 3 | 500 | 500 | 30 | −2.98 | 3 Comparative Example |
| 213 | 6 | 1 | 150/35 | 4 | 500 | 100 | 20 | −4.44 | 4 Example |
| 214 | 6 | 1.5 | 180/30 | 2 | 300 | 500 | 30 | −3.92 | 3 Comparative Example |
| 215 | 6 | 2 | 120/40 | 3 | 100 | 300 | 10 | −2.99 | 2 Comparative Example |
| 216 | 8 | 1 | 180/30 | 3 | 100 | 500 | 20 | −3.68 | 4 Example |
| 217 | 8 | 1.5 | 120/40 | 4 | 500 | 300 | 30 | −2.53 | 1 Comparative Example |
| 218 | 8 | 2 | 150/35 | 2 | 300 | 100 | 10 | −4.33 | 4 Example |
| 219 | 5 | 1.5 | 120/40 | 2 | 100 | 100 | 0 | −3.08 | 3 Comparative Example |
| 220 | 5 | 1.5 | 120/40 | 2 | 100 | 100 | 2 | −3.08 | 4 Example |
| 221 | 5 | 1.5 | 120/40 | 2 | 100 | 100 | 4 | −3.08 | 4 Example |
| 222 | 5 | 1.5 | 120/40 | 2 | 100 | 100 | 6 | −3.08 | 4 Example |
| 223 | 5 | 1.5 | 120/40 | 2 | 100 | 100 | 8 | −3.08 | 4 Example |
| 224 | 5 | 1.5 | 120/40 | 2 | 100 | 100 | 10 | −3.08 | 4 Example | the amplitude of the wavy line was changed to 0% (no randomicity), 2.0%, 4.0%, 6.0%, 8.0%, and 10.0% of the pitch P.

It should be noted that resolutions of the display were respectively set to 149 dpi, 265 dpi (v2), 265 dpi, 326 dpi, 384 dpi (v2), and 440 dpi, in 6 types of BM patterns having 6 types of BM structures of No. 1, Nos. 3 to 6, and No. 8 shown in FIGS. 35(A1), 35(D1), 35(D1), 35(E1), 35(F1) and 35(H1).

As can be clearly seen from Table 4, the experiments of Nos. 205, 206, 210, 211, 213, 216, 218, and 220 to 224 are examples of the present invention in which the quantitative value of moiré is equal to or less than −3.00 and the amplitude is equal to or greater than 2.0% and equal to or less than 20%. In addition, it can be seen that, since the functional evaluation result as a measure of deterioration is 4, the visibility of moiré is favorable.

In contrast, the experiments of Nos. 201 to 204, 207 to 209, 212, 214, 215, 217, and 219 are comparative examples in which the quantitative value of moiré is greater than −3.00 and/or the amplitude is less than 2.0% and greater than 20%. It can be seen that, since the functional evaluation result as a measure of deterioration is equal to or less than 3, the visibility of moiré is poor, and moiré, which is recognized as deterioration and offers a sense of discomfort, is visually perceived.

As can be seen from the above, in the present example, there is no case where the functional evaluation result is 5, but the measure of deterioration is equal to or greater than 4. However, in cases where image quality is an acceptable level, the quantitative value of moiré is equal to or less than −3.00, and the amplitude is equal to or greater than 2.0% and equal to or less than 20%. It can be seen that, by satisfying such conditions, it is possible to improve image quality.

In the conductive film of the present invention having the combined wavy wiring pattern which is obtained by randomizing the combined rhomboid wiring pattern for allowing the quantitative value (indicator of evaluation) of moiré to satisfy the range, even if the cycles and the intensities of the BM patterns of the display, the emission intensity of the display, and the like are different, even at the time of front observation, and even at the time of oblique observation, it is possible to suppress occurrence of moiré, and it is possible to greatly improve visibility.

From the above description, effects of the present invention are clarified.

Example III

In the present example, in accordance with the flow of the method of evaluating the conductive film of the present invention shown in FIGS. 45 and 36, in a manner similar to the above description, an experiment was performed as follows.

In the pixel array (BM) patterns 38 of the display of BM condition Nos. 1 to 16 that have different resolutions, emission intensities, and sub-pixel shapes typified by the G sub-pixel array patterns shown in FIGS. 35(A1) to 35(H2), multiple random mesh patterns 25d that have random mesh pattern shapes shown in FIG. 27, have the different shapes and sizes (average pitches) of the opening portions, and have different line widths of the thin metal lines (mesh) are provided as simulation samples, and the combined wiring pattern and the BM pattern of each color overlap with each other. Then, the indicator of evaluation of noise was obtained, the multiple random mesh patterns, which are made to be random in different manners, overlap with the BM patterns of respective colors, and the three functional evaluators performed functional evaluation on noise, which is caused by interference between both overlapping patterns in a simulation image of noise, with their eyes.

Results thereof are shown in Table 5.

Here, as shown in FIG. 45, regarding evaluation of noise, functional evaluation was performed in the following manner: the transmittance image data of the combined wiring pattern was superposed on the luminance image data of the sub-pixel array pattern of each color of the pixel array (BM) pattern used in step S14; a simulation image of noise, in which a transmittance image is superposed on a luminance image, was created, and was displayed on the display; and the three functional evaluators observed the displayed simulation image, in a manner similar to that of Example I.

In the present example, the average pitch of the cells (opening portions 22) of the random mesh pattern 25d was changed to 50 μm, 100 μm, 200 μm, and 300 μm.

Further, the line width of the random mesh pattern 25d was changed to 2 μm and 4 μm.

In addition, the resolutions of the display using 8 types of the BM patterns having different BM structures of Nos. 1 to 16 shown in FIGS. 35(A1) to 35(H2) respectively were 149 dpi in Nos. 1 and 2, 222 dpi in Nos. 3 and 4, 265 dpi in Nos. 5 to 8, 326 dpi in Nos. 91 and 10, 384 dpi in Nos. 11 to 14, and 440 dpi in Nos. 15 and 16.

Furthermore, the emission intensity of the display was normalized by the display LP101WX1(SL) (n3) (manufactured by LG Display Corp.). When the entire range of the intensity was given as a range of 0 to 255, even in any display, the emission intensity was changed to 64 (luminance 1) in Nos. 1, 3, 5, 6, 9, 11, 12, and 15, and 128 (luminance 2) in Nos. 2, 4, 7, 8, 10, 13, 14, and 16.

For imaging the sub-pixel array pattern of each color of the pixel array (BM) pattern 38, STM6 (manufactured by OLYMPUS Corp.) was used as the microscope, UMPlanFI10× (manufactured by OLYMPUS Corp.) was used as the lens, and QIC-F-CLR-12-C (manufactured by QIMAGING Corp.) was used as the camera. Here, as the imaging conditions, for experiment example, a gain was set to 1.0, and white balance (G, R, B) was set to (1.00, 2.17, 1.12). Further, the captured image was subjected to shading correction.

For measuring luminance, a USB2000+ manufactured by Ocean Optics and a diffuser plate (CC-3-UV-S manufactured by the same company) at the tip of the fiber were used, and the integration time period was set to 250 ms.

Calculation of the indicator of evaluation of noise was performed as described above in the method shown in FIG. 45.

TABLE 5

| | BM | | Mesh Pattern | | | |
| --- | --- | --- | --- | --- | --- | --- |
| | BM Condition Number | Pixel Size (μm) | Average Pitch (μm) | Line Width (μm) | Noise Quantitative Value | Functional Evaluation Result |
| Example 1 | 15 | 57 | 300 | 4 | NaN | 5 |
| Example 2 | 5 | 96 | 300 | 7 | NaN | 5 |
| Example 3 | 9 | 78 | 200 | 2 | NaN | 5 |
| Example 4 | 9 | 78 | 300 | 2 | NaN | 5 |
| Example 5 | 10 | 78 | 200 | 2 | NaN | 5 |
| Example 6 | 10 | 78 | 300 | 2 | NaN | 5 |
| Example 7 | 12 | 66 | 200 | 2 | NaN | 5 |
| Example 8 | 12 | 66 | 300 | 2 | NaN | 5 |
| Example 9 | 14 | 66 | 200 | 2 | NaN | 5 |
| Example 10 | 14 | 66 | 300 | 2 | NaN | 5 |
| Example 11 | 15 | 57 | 200 | 2 | NaN | 5 |
| Example 12 | 15 | 57 | 300 | 2 | NaN | 5 |

TABLE 5-continued

|  | BM | | Mesh Pattern | | | |
|---|---|---|---|---|---|---|
|  | BM Condition Number | Pixel Size (μm) | Average Pitch (μm) | Line Width (μm) | Noise Quantitative Value | Functional Evaluation Result |
| Example 13 | 16 | 57 | 300 | 2 | NaN | 5 |
| Example 14 | 7 | 96 | 300 | 2 | −9.7 | 4 |
| Example 15 | 6 | 96 | 300 | 2 | −9.5 | 4 |
| Example 16 | 8 | 96 | 300 | 2 | −9.2 | 4 |
| Example 17 | 11 | 66 | 300 | 2 | −9.0 | 4 |
| Example 18 | 13 | 66 | 300 | 2 | −8.7 | 4 |
| Example 19 | 3 | 114 | 300 | 2 | −8.4 | 4 |
| Example 20 | 5 | 96 | 200 | 2 | −8.1 | 4 |
| Example 21 | 4 | 114 | 300 | 2 | −8.1 | 4 |
| Example 22 | 6 | 96 | 200 | 2 | −8.0 | 4 |
| Example 23 | 12 | 66 | 300 | 4 | −7.8 | 4 |
| Example 24 | 7 | 96 | 200 | 2 | −7.8 | 4 |
| Example 25 | 8 | 96 | 200 | 2 | −7.7 | 4 |
| Example 26 | 14 | 66 | 30 | 4 | −7.5 | 4 |
| Example 27 | 16 | 57 | 200 | 2 | −7.3 | 4 |
| Example 28 | 3 | 114 | 200 | 2 | −6.9 | 4 |
| Example 29 | 4 | 114 | 200 | 2 | −6.6 | 4 |
| Example 30 | 15 | 57 | 100 | 2 | −6.2 | 4 |
| Example 31 | 9 | 78 | 300 | 4 | −5.9 | 4 |
| Example 32 | 1 | 170 | 300 | 2 | −5.9 | 4 |
| Example 33 | 11 | 66 | 200 | 2 | −5.8 | 4 |
| Example 34 | 10 | 78 | 300 | 4 | −5.6 | 4 |
| Example 35 | 2 | 170 | 300 | 2 | −5.6 | 4 |
| Example 36 | 13 | 66 | 200 | 2 | −5.5 | 4 |
| Example 37 | 15 | 57 | 200 | 4 | −5.1 | 4 |
| Example 38 | 5 | 96 | 300 | 4 | −4.9 | 4 |
| Example 39 | 12 | 66 | 100 | 2 | −4.9 | 4 |
| Example 40 | 14 | 66 | 100 | 2 | −4.6 | 4 |
| Example 41 | 7 | 96 | 300 | 4 | −4.4 | 4 |
| Example 42 | 6 | 96 | 300 | 4 | −4.2 | 4 |
| Example 43 | 12 | 66 | 200 | 4 | −4.2 | 4 |
| Example 44 | 16 | 57 | 300 | 4 | −4.1 | 4 |
| Example 45 | 1 | 170 | 200 | 2 | −4.0 | 4 |
| Example 46 | 8 | 96 | 300 | 4 | −3.9 | 4 |
| Example 47 | 11 | 66 | 300 | 4 | −3.9 | 4 |
| Example 48 | 14 | 66 | 200 | 4 | −3.9 | 4 |
| Example 49 | 2 | 170 | 200 | 2 | −3.7 | 4 |
| Example 50 | 9 | 78 | 200 | 4 | −3.7 | 4 |
| Example 51 | 3 | 114 | 300 | 4 | −3.6 | 4 |
| Example 52 | 13 | 66 | 300 | 4 | −3.6 | 4 |
| Example 53 | 16 | 57 | 200 | 4 | −3.5 | 4 |
| Example 54 | 16 | 57 | 100 | 2 | −3.5 | 4 |
| Example 55 | 6 | 96 | 50 | 2 | −3.4 | 4 |
| Example 56 | 10 | 78 | 200 | 4 | −3.4 | 4 |
| Example 57 | 4 | 114 | 300 | 4 | −3.3 | 4 |
| Example 58 | 5 | 96 | 200 | 4 | −3.1 | 4 |
| Example 59 | 11 | 66 | 50 | 2 | −3.1 | 4 |
| Example 60 | 12 | 66 | 50 | 2 | −3.1 | 4 |
| Example 61 | 11 | 66 | 200 | 4 | −3.1 | 4 |
| Example 62 | 3 | 114 | 50 | 2 | −3.1 | 4 |
| Example 63 | 6 | 96 | 200 | 4 | −3.0 | 4 |
| Example 64 | 9 | 78 | 100 | 2 | −3.0 | 4 |
| Example 65 | 8 | 96 | 50 | 2 | −3.0 | 4 |
| Example 66 | 5 | 96 | 50 | 2 | −3.0 | 4 |
| Example 67 | 1 | 170 | 50 | 2 | −2.9 | 4 |
| Example 68 | 13 | 66 | 50 | 2 | −2.8 | 4 |
| Example 69 | 14 | 66 | 50 | 2 | −2.8 | 4 |
| Example 70 | 7 | 96 | 200 | 4 | −2.8 | 4 |
| Example 71 | 15 | 57 | 50 | 2 | −2.8 | 4 |
| Example 72 | 9 | 78 | 50 | 2 | −2.8 | 4 |
| Example 73 | 13 | 66 | 200 | 4 | −2.8 | 4 |
| Comparative Example 1 | 8 | 96 | 200 | 4 | −2.7 | 3 |
| Comparative Example 2 | 10 | 78 | 100 | 2 | −2.7 | 3 |
| Comparative Example 3 | 12 | 66 | 100 | 4 | −2.7 | 3 |
| Comparative Example 4 | 7 | 96 | 50 | 2 | −2.6 | 3 |
| Comparative Example 5 | 1 | 170 | 100 | 2 | −2.6 | 3 |
| Comparative Example 6 | 4 | 114 | 50 | 2 | −2.5 | 3 |
| Comparative Example 7 | 15 | 57 | 100 | 4 | −2.5 | 3 |
| Comparative Example 8 | 11 | 66 | 100 | 2 | −2.5 | 3 |
| Comparative Example 9 | 10 | 78 | 50 | 2 | −2.5 | 3 |
| Comparative Example 10 | 5 | 96 | 100 | 2 | −2.4 | 3 |
| Comparative Example 11 | 2 | 170 | 50 | 2 | −2.4 | 3 |
| Comparative Example 12 | 6 | 96 | 100 | 2 | −2.4 | 3 |
| Comparative Example 13 | 3 | 114 | 100 | 2 | −2.4 | 3 |

TABLE 5-continued

|  | BM | | Mesh Pattern | | | |
|---|---|---|---|---|---|---|
|  | BM Condition Number | Pixel Size (μm) | Average Pitch (μm) | Line Width (μm) | Noise Quantitative Value | Functional Evaluation Result |
| Comparative Example 14 | 14 | 66 | 100 | 4 | −2.4 | 3 |
| Comparative Example 15 | 16 | 57 | 50 | 2 | −2.3 | 3 |
| Comparative Example 16 | 2 | 170 | 100 | 2 | −2.3 | 3 |
| Comparative Example 17 | 13 | 66 | 100 | 2 | −2.2 | 3 |
| Comparative Example 18 | 8 | 96 | 100 | 2 | −2.1 | 3 |
| Comparative Example 19 | 4 | 114 | 100 | 2 | −2.1 | 3 |
| Comparative Example 20 | 1 | 170 | 300 | 2 | −2.1 | 3 |
| Comparative Example 21 | 7 | 96 | 100 | 2 | −2.1 | 3 |
| Comparative Example 22 | 3 | 114 | 200 | 4 | −2.0 | 3 |
| Comparative Example 23 | 2 | 170 | 300 | 4 | −1.8 | 3 |
| Comparative Example 24 | 4 | 114 | 200 | 4 | −1.7 | 3 |
| Comparative Example 25 | 16 | 57 | 100 | 4 | −1.7 | 3 |
| Comparative Example 26 | 6 | 96 | 50 | 4 | −1.7 | 3 |
| Comparative Example 27 | 3 | 114 | 50 | 4 | −1.6 | 2 |
| Comparative Example 28 | 5 | 96 | 50 | 4 | −1.6 | 2 |
| Comparative Example 29 | 12 | 66 | 50 | 4 | −1.5 | 2 |
| Comparative Example 30 | 1 | 170 | 50 | 4 | −1.5 | 2 |
| Comparative Example 31 | 9 | 78 | 100 | 4 | −1.5 | 2 |
| Comparative Example 32 | 1 | 170 | 200 | 4 | −1.5 | 2 |
| Comparative Example 33 | 11 | 66 | 50 | 4 | −1.4 | 2 |
| Comparative Example 34 | 9 | 78 | 50 | 4 | −1.3 | 2 |
| Comparative Example 35 | 6 | 96 | 100 | 4 | −1.3 | 2 |
| Comparative Example 36 | 15 | 57 | 50 | 4 | −1.3 | 2 |
| Comparative Example 37 | 1 | 170 | 100 | 4 | −1.3 | 2 |
| Comparative Example 38 | 11 | 66 | 100 | 4 | −1.1 | 2 |
| Comparative Example 39 | 5 | 96 | 100 | 4 | −1.2 | 2 |
| Comparative Example 40 | 14 | 66 | 50 | 4 | −1.2 | 2 |
| Comparative Example 41 | 8 | 96 | 50 | 4 | −1.2 | 2 |
| Comparative Example 42 | 3 | 114 | 100 | 4 | −1.2 | 2 |
| Comparative Example 43 | 10 | 78 | 100 | d | −1.2 | 2 |
| Comparative Example 44 | 7 | 96 | 50 | 4 | −1.2 | 2 |
| Comparative Example 45 | 4 | 114 | 50 | 4 | −1.2 | 2 |
| Comparative Example 46 | 2 | 170 | 200 | 4 | −1.2 | 2 |
| Comparative Example 47 | 13 | 66 | 50 | 4 | −1.1 | 2 |
| Comparative Example 48 | 10 | 78 | 50 | 4 | −1.0 | 1 |
| Comparative Example 49 | 2 | 170 | 50 | 4 | −1.0 | 1 |
| Comparative Example 50 | 8 | 96 | 100 | 4 | −1.0 | 1 |
| Comparative Example 51 | 13 | 66 | 100 | 4 | −0.9 | 1 |
| Comparative Example 52 | 2 | 170 | 100 | 4 | −0.9 | 1 |
| Comparative Example 53 | 16 | 57 | 50 | 4 | −0.9 | 1 |
| Comparative Example 54 | 7 | 96 | 100 | 4 | −0.9 | 1 |
| Comparative Example 55 | 4 | 114 | 100 | 4 | −0.9 | 1 |

It should be noted that, in Table 5, "NaN" in items of quantitative values of noise means that since an intensity is small and elements which do not contribute to occurrence of noise are removed through threshold processing, a quantitative value of noise is not obtained, noise does not occur, and noise is not visually perceived.

In Examples 1 to 73 shown in Table 7, the indicators of evaluation (evaluation values) thereof were equal to or less than −2.80, and all evaluation results of visibility were equal to or greater than 4. The above-mentioned examples are examples of the present invention.

It should be noted that, in Examples 1 to 13 shown in Table 7 as "NaN" in the items of the quantitative values of noise, all evaluation results of visibility were 5. It would appear that there was no occurrence of noise and noise was not visually perceived.

In contrast, in Comparative Examples 1 to 55 shown in Table 5, the indicators of evaluation (evaluation values) were greater than −2.80, and the evaluation results were equal to or less than 3. It would appear that noise, which was likely to offer a sense of discomfort, was visually perceived.

From the above description, in the conductive film of the present invention having the combined wiring pattern which includes at least one random mesh pattern and allows the quantitative value (indicator of evaluation) of noise to satisfy the range, even if the cycles and the intensities of the BM patterns of the display, the emission intensity of the display, and the like are different, even at the time of front observation, and even at the time of oblique observation, it is possible to suppress occurrence of noise, and it is possible to greatly improve visibility.

From the above description, effects of the present invention are clarified.

In the present invention, in a manner similar to that of the above-mentioned experiment examples, wiring patterns having various pattern shapes are provided in advance, and thus it is possible to determine the conductive film that has wiring patterns including a random mesh pattern in which the entirety or a part of at least one of the upper and lower wiring patterns constituting the combined wiring pattern optimized in the evaluation method of the present invention is randomized. However, in a case where the indicator of evaluation of noise for the single wiring pattern is greater than a predetermined value, it is possible to determine the conductive film which has the optimized wiring pattern by repeating the following process: transmittance image data of the random mesh pattern is updated to transmittance image data of a new random mesh pattern, transmittance image data of a new combined wiring pattern is created, and the quantitative value (the indicator of evaluation) of noise is obtained by applying the above-mentioned evaluation method of the present invention.

Here, the updated new random mesh pattern may be provided in advance, and may be newly created. It should be noted that, in the case where the pattern is newly created, any one or more of the rotation angle, the pitch, and the pattern width of the transmittance image data of the random mesh pattern may be changed, and the shape and the size of the opening portion of the wiring pattern may be changed. In the present invention, it is apparent that it is necessary for at least one of the combined wiring patterns to employ the random mesh pattern in at least one part thereof.

As described above in detail, according to the present invention, it is possible to provide a conductive film, a display device having the same, and a method of evaluating wiring patterns of the conductive film. The conductive film has a mesh-shaped wiring pattern (mesh pattern) capable of suppressing occurrence of moiré and noise visually perceived in combination with a display so as to improve visibility, for example, a regular mesh-shaped wiring pattern, a random (irregular) mesh-shaped wiring pattern (referred to as a mesh shape random wiring pattern, a random mesh pattern, or simply a random pattern).

In particular, according to the present invention, there is provided a conductive film having the mesh pattern corresponding to the intensity of the display regardless of the observation distance, even in a case where the pattern overlaps with the pixel array pattern of a display unit (display) having a different emission intensity (luminance). Thereby, it is possible to prevent moiré or noise from occurring, and it is possible to greatly improve visibility.

Further, according to the present invention, the conductive film has a mesh pattern, such as a regular mesh pattern or a random mesh pattern, in which the emission intensity of the display unit is considered, when the conductive film overlaps with a black matrix of a display unit of a display device having a different emission intensity and is visually perceived, in a case where the transparent conductive film having the mesh pattern is used as a touch panel electrode. Thereby, it is possible to suppress occurrence of moiré which greatly disturbs image quality, and it is possible to greatly improve visibility of the display on the touch panel.

Furthermore, according to the present invention, in addition to the above-mentioned effect, also in a design of a mesh pattern of the conductive film in a case where the opening shapes of the RGB sub-pixels of the display have frequencies and intensities (shapes and sizes) different from each other, it is possible to provide best image quality in combination with the pixel array pattern of a display having a different emission intensity.

EXPLANATION OF REFERENCES 10, 11, 11A: conductive film
12: transparent substrate
14: thin line made of metal (thin metal line)
16, 16a, 16b: wiring portion
18, 18a, 18b: adhesive layer
20, 20a, 20b: protective layer
22: opening portion (cell)
23, 23a, 23b, 23c: projected wiring pattern
24, 24a, 24b: wiring pattern
25: typical wiring pattern
25a, 25b, 25c, 25d: random wiring pattern (random pattern)
26: dummy electrode portion
27, 27a, 27b, 27c: three-dimensionally shaped wiring pattern
30: display unit
32, 32r, 32g, 32b: pixel
34: black matrix (BM)
38: BM pattern
40: display device
44: touch panel

What is claimed is:

1. A conductive film that is provided on a display unit of a display device, the conductive film comprising:
   a transparent substrate that has a three-dimensional shape; and
   two wiring portions that have three-dimensional shapes and are arranged on both sides of the transparent substrate or arranged on a single side,
   wherein at least one wiring portion of the two wiring portions has a mesh-shaped wiring pattern in which a plurality of opening portions formed of a plurality of thin metal lines are arranged,
   wherein in the display unit, pixels, which include a plurality of sub-pixels emitting light with a plurality of colors that are at least three colors different from each other, are arranged in pixel array patterns,
   wherein the conductive film is provided on the display unit such that the wiring patterns of the two wiring portions overlap with the pixel array patterns of the display unit,
   wherein a projected wiring pattern, which is obtained when the wiring patterns of the two wiring portions having three-dimensional shapes are projected onto a plane perpendicular to a point of view, includes a regular wiring pattern which has a mesh shape, or an irregular wiring pattern which has mesh shapes and which is formed by making the regular wiring pattern irregular,
   wherein an indicator of evaluation of moirés, which is caused by interference between a combined wiring pattern formed of the regular wiring pattern and projected pixel array patterns obtained when the pixel array patterns are projected onto the same plane, is equal to or less than an evaluation threshold value, and
   wherein from the point of view, in frequencies and intensities of the moirés of respective colors of a plurality of colors calculated from a first peak frequency and a first peak intensity of a plurality of first spectrum peaks of two-dimensional Fourier spectra of transmittance image data of the combined wiring pattern and a second peak frequency and a second peak intensity of a plurality of second spectrum peaks of two-dimensional Fourier spectra of luminance image data of the projected pixel array patterns of the respective colors when light beams with the plurality of colors are respectively emitted, the indicator of evaluation of moirés is calculated from evaluation values of the moirés of the respective colors obtained by applying human visual response characteristics in accordance with an observation distance to intensities of the moirés equal to or greater than a first intensity threshold value among intensities of the moirés at frequencies of the moirés equal to or less than a frequency threshold value defined on the basis of a display resolution of the display unit.

2. The conductive film according to claim 1,
   wherein a display surface of the display unit has a three-dimensional shape, and wherein the pixel array patterns have three-dimensional shapes.

3. The conductive film according to claim 1,
wherein the projected wiring pattern is formed of the single or two regular wiring patterns, and
wherein the regular wiring pattern is a regular rhomboid wiring pattern of which the opening portions have rhomboid shapes,
wherein the evaluation threshold value is −3.17.

4. The conductive film according to claim 1,
wherein the projected wiring pattern is formed of the single or two irregular wiring patterns, or the irregular wiring pattern and the regular wiring pattern,
wherein the regular wiring pattern is a regular rhomboid wiring pattern of which the opening portions have rhomboid shapes, and
wherein the irregular wiring pattern has a degree of irregularity equal to or less than a threshold value of irregularity with respect to the rhomboid shape of the regular wiring pattern.

5. The conductive film according to claim 4,
wherein the evaluation threshold value is −2.80,
wherein the threshold value of irregularity is 10%, and
wherein the irregular wiring pattern has a degree of irregularity which is greater than 0% and equal to or less than 10% of a pitch of the rhomboid shape of the regular wiring pattern.

6. The conductive film according to claim 4,
wherein the evaluation threshold value is −2.80,
wherein the threshold value of irregularity is 3.0%, and
wherein the irregular wiring pattern has a degree of irregularity which is greater than 0% and equal to or less than 3.0% of an angle of the rhomboid shape of the regular wiring pattern.

7. The conductive film according to claim 1,
wherein the projected wiring pattern is formed of the single or two irregular wiring patterns, or the irregular wiring pattern and the regular wiring pattern,
wherein the regular wiring pattern is a regular polygonal wiring pattern of which the opening portions have polygonal shapes, and
wherein the irregular wiring pattern is a wavy wiring pattern which has a degree of irregularity within an amplitude threshold value by making sides of the polygonal shapes of the regular wiring pattern as wavy lines.

8. The conductive film according to claim 7,
wherein the evaluation threshold value is −3.00, and
wherein the amplitude threshold value is equal to or greater than 2.0% and equal to or less than 20% of a pitch of the regular polygonal wiring pattern.

9. The conductive film according to claim 7, wherein the polygonal shape is a rhomboid shape.

10. The conductive film according to claim 1, wherein the projected wiring pattern of the two wiring portions is formed of the two irregular wiring patterns.

11. The conductive film according to claim 1, wherein the projected wiring pattern of the two wiring portions is formed of the irregular wiring pattern and the regular wiring pattern.

12. The conductive film according to claim 1,
wherein at least one wiring portion of the two wiring portions includes an electrode portion and a non-electrode portion, and
wherein one wiring pattern of the electrode portion and the non-electrode portion is the irregular wiring pattern, and the other wiring pattern is the regular wiring pattern.

13. The conductive film according to claim 1,
wherein a wiring pattern of one wiring portion of the two wiring portions is the irregular wiring pattern, and a wiring pattern of the other wiring portion is made of indium tin oxide, and
wherein the projected wiring pattern of the two wiring portions is formed of only one irregular wiring pattern.

14. The conductive film according to claim 1,
wherein the plurality of first spectrum peaks has a peak intensity that is equal to or greater than a first threshold value which is selected from a plurality of spectrum peaks obtained by performing two-dimensional Fourier transform on the transmittance image data of the combined wiring pattern, and
wherein for each of the plurality of colors, the plurality of second spectrum peaks has a peak intensity that is equal to or greater than a second threshold value which is selected from a plurality of spectrum peaks obtained by performing two-dimensional Fourier transform on the luminance image data of the projected pixel array pattern.

15. The conductive film according to claim 1,
wherein a frequency of a moiré corresponding to each color is given as a difference between the first peak frequency and the second peak frequency corresponding to each color, and
wherein an intensity of the moiré corresponding to each color is given as a product between the first peak intensity and the second peak intensity corresponding to each color.

16. The conductive film according to claim 1, wherein an evaluation value of the moiré is calculated by weighting a visual transfer function, which corresponds to the observation distance as the visual response characteristics, to the frequency and the intensity of the moiré through convolution integration.

17. The conductive film according to claim 16, wherein the visual transfer function VTF is given by the following Expression (1), $$\text{VTF}=5.05e^{-0.138\,k}(1-e^{0.1\,k}) \quad (1), \text{ and}$$

$$k=\pi du/180,$$

where k is a spatial frequency (cycle/deg) defined by a solid angle, u shown in the above-mentioned Expression (1) is a spatial frequency (cycle/mm) defined by a length, and d is defined by an observation distance (mm).

18. The conductive film according to claim 1, wherein the indicator of evaluation of the moirés is calculated using a largest evaluation value among the evaluation values of the plurality of the moirés in which a frequency of one of the moirés is weighted in accordance with the observation distance for each color.

19. The conductive film according to claim 18, wherein the indicator of evaluation of the moirés is a largest sum among sums for the plurality of colors, the sums being obtained by adding the frequencies of all the moirés to the largest evaluation value selected with respect to the frequency of one of the moirés for each color.

20. The conductive film according to claim 1,
wherein the first intensity threshold value is −4.5 as a common logarithm, and the frequency threshold value is a spatial frequency which is obtained from the resolution of the display unit, and wherein a moiré, which is selected in order to apply the visual response characteristics, has an intensity which is equal to or greater than −3.8.

21. The conductive film according to claim 20, wherein assuming that a display pixel pitch of the display unit is Pd µm, the spatial frequency obtained from the resolution of the display unit is a highest frequency of the moirés which is given as 1000/Pd cycle/mm.

22. The conductive film according to claim 1, wherein the luminance image data of the projected pixel array patterns of the respective colors is obtained by converting normalized luminance data from the pixel array patterns to the projected pixel array patterns, where the normalized luminance data is obtained by normalizing the luminance image data obtained by converting captured image data of the colors, which is obtained by capturing images of the pixel array patterns of the respective colors displayed on a display screen of the display unit, into luminance values, when the light beams with the plurality of colors are separately emitted.

23. The conductive film according to claim 22, wherein images of the pixel array patterns of the respective colors displayed on the display screen of the display unit are displayed on the display unit when the light beams with the plurality of colors are separately emitted at a maximum intensity which is settable for each color.

24. The conductive film according to claim 23, wherein when the plurality of colors is three colors such as red, green, and blue, the captured image data of the images of the pixel array patterns of the respective colors such as red, green, and blue is image data that is obtained through imaging performed through white balance adjustment based on a white color of a Macbeth chart.

25. The conductive film according to claim 1,
wherein the luminance image data of the images of the projected pixel array patterns of the respective colors of the plurality of colors is obtained by converting data, which is obtained by giving the luminance data in which a measured luminance value is normalized through a product between a resolution of the display unit and an area having a value of a mask image, from the pixel array patterns to the projected pixel array patterns, where the mask image is created from the captured image data which is obtained by capturing the image of the pixel array pattern of a current color displayed on the display screen of the display unit through a microscope, when the light beams of the respective colors of the plurality of colors are separately emitted in the display unit, and
wherein the luminance image data is obtained by normalizing a reference luminance of the display unit of the display device to 1.0.

26. The conductive film according to claim 25,
wherein when the plurality of colors is three colors such as red, green, and blue, the measured luminance value is a luminance value which is obtained from spectrum data of each color of red, green, and blue by separately performing display for each color of red, green, and blue and performing measurement through a spectrometer, and
wherein the mask image is an image that is obtained by binarizing the captured image data which is obtained through imaging of the microscope.

27. The conductive film according to claim 1, wherein the two wiring portions are respectively formed on both side surfaces of the transparent substrate.

28. The conductive film according to claim 1, further comprising a second transparent substrate that is different from a first transparent substrate when the transparent substrate is defined as the first transparent substrate,
wherein one wiring portion of the two wiring portions is formed on one surface of the first transparent substrate, and
wherein the other wiring portion of the two wiring portions is formed on one surface of the second transparent substrate, on the other surface side of the first transparent substrate.

29. The conductive film according to claim 1, wherein the two wiring portions are respectively formed with insulation layers interposed therebetween on single sides of the transparent substrates.

30. The conductive film according to claim 1,
wherein from at least two points of view of front observation and oblique observation, the evaluation value is obtained for each color of the plurality of colors, and
wherein the indicator of evaluation is a largest evaluation value among evaluation values of respective colors obtained in the at least two points of view.

31. The conductive film according to claim 1, wherein the pixel array patterns are black matrix patterns.

32. A display device comprising:
a display unit in which pixels, which include a plurality of sub-pixels emitting light with a plurality of colors that are different from each other, are arranged in pixel array patterns which are repeated in a certain direction and a direction perpendicular to the certain direction; and
the conductive film according to claim 1, the conductive film being provided on the display unit.

33. A conductive film that is provided on a display unit of a display device, the conductive film comprising:
a transparent substrate that has a three-dimensional shape; and
two wiring portions that have three-dimensional shapes and are arranged on both sides of the transparent substrate or arranged on a single side,
wherein at least one wiring portion of the two wiring portions has a mesh-shaped wiring pattern in which a plurality of opening portions formed of a plurality of thin metal lines are arranged,
wherein in the display unit, pixels, which include a plurality of sub-pixels emitting light with a plurality of colors that are at least three colors different from each other, are arranged in pixel array patterns,
wherein the conductive film is provided on the display unit such that the wiring patterns of the two wiring portions overlap with the pixel array patterns of the display unit,
wherein a projected wiring pattern, which is obtained when the wiring patterns of the two wiring portions having three-dimensional shapes are projected onto a plane perpendicular to a point of view, is a combined wiring pattern including an irregular wiring pattern which has mesh shapes and has irregularity such that at least shapes of the opening portions thereof are two or more types of different opening shapes and polygonal shapes having two or more types of different numbers of vertices of the opening shapes,
wherein an indicator of evaluation of noises, which is caused by interference between the combined wiring pattern and projected pixel array patterns obtained when the pixel array patterns are projected onto the same plane, is equal to or less than an evaluation threshold value, and
wherein from the point of view, in frequencies and intensities of the noises of respective colors of a plurality of colors calculated from a first peak frequency and a first peak intensity of a plurality of first spectrum peaks of two-dimensional Fourier spectra of transmittance image data of the combined wiring pattern and a second peak frequency and a second peak intensity of a plurality of second spectrum peaks of two-dimensional Fourier spectra of luminance image data of the projected pixel array patterns of the respective colors when light beams with the plurality of colors are respectively emitted, the indicator of evaluation of noises is calculated from evaluation values of the noises of the respective colors obtained by applying human visual response characteristics in accordance with an observation distance to intensities of the noises equal to or greater than a first intensity threshold value among intensities of the noises at frequencies of the noises equal to or less than a frequency threshold value defined on the basis of a display resolution of the display unit.

34. The conductive film according to claim 33, wherein the evaluation threshold value is −2.80.

35. The conductive film according to claim 33, wherein the projected wiring pattern of the two wiring portions is formed of the two irregular wiring patterns.

36. The conductive film according to claim 33, wherein the projected wiring pattern of the two wiring portions is formed of the irregular wiring pattern and the regular polygonal wiring pattern of which the opening portions have polygonal shapes.

37. The conductive film according to claim 33,
wherein at least one wiring portion of the two wiring portions includes an electrode portion and a non-electrode portion, and
wherein one wiring pattern of the electrode portion and the non-electrode portion is the irregular wiring pattern, and the other wiring pattern is a regular wiring pattern of which the opening portions have polygonal shapes.

38. The conductive film according to claim 33,
wherein a wiring pattern of one wiring portion of the two wiring portions is the irregular wiring pattern, and a wiring pattern of the other wiring portion is made of indium tin oxide, and
wherein the projected wiring pattern of the two wiring portions is formed of only one irregular wiring pattern.

39. The conductive film according to claim 33,
wherein the plurality of first spectrum peaks has a peak intensity that is equal to or greater than a first threshold value which is selected from a plurality of spectrum peaks obtained by performing two-dimensional Fourier transform on the transmittance image data of the combined wiring pattern, and
wherein for each of the plurality of colors, the plurality of second spectrum peaks has a peak intensity that is equal to or greater than a second threshold value which is selected from a plurality of spectrum peaks obtained by performing two-dimensional Fourier transform on the luminance image data of the projected pixel array pattern.

40. The conductive film according to claim 33, wherein a frequency and an intensity of a noise corresponding to each color is calculated through convolution operation of the first peak frequency and the first peak intensity and the second peak frequency and the second peak intensity corresponding to each color.

41. The conductive film according to claim 33,
wherein the frequency of the noise corresponding to each color is given as a difference between the first peak frequency and the second peak frequency corresponding to each color, and
wherein the intensity of the noise corresponding to each color is given as a product between the first peak intensity and the second peak intensity corresponding to each color.

42. The conductive film according to claim 33, wherein an evaluation value of the noise is calculated by weighting a visual transfer function, which corresponds to the observation distance as the visual response characteristics, to the frequency and the intensity of the noise through convolution integration.

43. The conductive film according to claim 42, wherein the visual transfer function VTF is given by the following Expression (1), $$\text{VTF}=5.05e^{-0.138\,k}(1-e^{0.1\,k}) \qquad (1), \text{ and}$$

$$k=\pi du/180,$$

where k is a spatial frequency (cycle/deg) defined by a solid angle, u shown in the above-mentioned Expression (1) is a spatial frequency (cycle/mm) defined by a length, and d is defined by an observation distance (mm).

44. The conductive film according to claim 33, wherein the indicator of evaluation of the noises is calculated using a largest evaluation value among the evaluation values of the plurality of the noises in which a frequency of one of the noises is weighted in accordance with the observation distance for each color.

45. The conductive film according to claim 44, wherein the indicator of evaluation of the noises is a largest sum among sums for the plurality of colors, the sums being obtained by adding the frequencies of all the noises to the largest evaluation value selected with respect to the frequency of one of the noises for each color.

46. The conductive film according to claim 33, wherein the first intensity threshold value is −4.5 as a common logarithm, and the frequency threshold value is a spatial frequency which is obtained from the resolution of the display unit.

47. The conductive film according to claim 46, wherein assuming that a display pixel pitch of the display unit is Pd μm, the spatial frequency obtained from the resolution of the display unit is a highest frequency of the noises which is given as 1000/Pd cycle/mm.

* * * * *